US012185189B2

(12) United States Patent
Qiao et al.

(10) Patent No.: US 12,185,189 B2
(45) Date of Patent: Dec. 31, 2024

(54) WIRELESS DEVICE LOCATION DETERMINATION

(71) Applicant: Comcast Cable Communications, LLC, Philadelphia, PA (US)

(72) Inventors: Weihua Qiao, Herndon, VA (US); Esmael Dinan, McLean, VA (US); Kyungmin Park, Vienna, VA (US); Jinsook Ryu, Herndon, VA (US); Peyman Talebi Fard, Sterling, VA (US); Taehun Kim, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/339,154

(22) Filed: Jun. 4, 2021

(65) Prior Publication Data
US 2021/0385625 A1 Dec. 9, 2021

Related U.S. Application Data

(60) Provisional application No. 63/034,512, filed on Jun. 4, 2020.

(51) Int. Cl.
*H04W 4/029* (2018.01)
*H04W 24/10* (2009.01)
(52) U.S. Cl.
CPC ........... *H04W 4/029* (2018.02); *H04W 24/10* (2013.01)

(58) Field of Classification Search
CPC ...... H04W 4/029; H04W 24/10; H04W 64/00
See application file for complete search history.

(56) References Cited

U.S. PATENT DOCUMENTS

| | | | |
|---|---|---|---|
| 10,779,256 | B2 | 9/2020 | Edge et al. |
| 2019/0357011 | A1 | 11/2019 | Edge et al. |
| 2020/0196298 | A1* | 6/2020 | Edge ................. H04W 12/0431 |
| 2020/0389759 | A1 | 12/2020 | Wang et al. |

OTHER PUBLICATIONS

"3rd Generation Partnership Project; Technical Specification Group Radio Access Network; Evolved Universal Terrestrial Radio Access Network (EUTRAN); Stage 2 functional specification of User Equipment (UE) positioning in E- UTRAN (Release 16)", 3GPP Standard; Technical Specification; 3GPP TS 36.305, 3rd Generation Partnership Project (3GPP), Mobile Competence Centre ; 650, Route Des Lucioles ; F-06921 Sophia-Antipolis Ce dex ; France; vol. RAN WG2, No. V16.0.0 Apr. 8, 2020.

(Continued)

*Primary Examiner* — Kabir A Timory
(74) *Attorney, Agent, or Firm* — Banner & Witcoff, Ltd.

(57) ABSTRACT

An entity in a wireless communication network may request information regarding a wireless device location. Positioning measurement(s) by a base station may be used for determining the wireless device location. Wireless device location information, based on the positioning measurement(s), may be communicated to a network device, via a user plane transmission, to indicate the location of the wireless device with improved accuracy.

20 Claims, 31 Drawing Sheets

(56) References Cited

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP Standard; Technical Specification; 3GPP TS 38.305, 3rd Generation Partnership Project (3GPP), Mobile Competence Centre ; 650, Route Des Lucioles ; F-06921 Sophia-Antipolis Ce dex ; France, vol. RAN WG2, Apr. 9, 2020.
"3rd Generation Partnership Project; Technical Specification Group Radio Access Network; L TE Positioning Protocol (LPP) (Release 16)", 3GPP Standard; Technical Specification; 3GPP TS 37.355, 3rd Generation Partnership Project (3GPP), Mobile Competence Centre ; 650, Route Des Lucioles ; F-06921 Sophia-Antipolis Ce dex ; France, No. V16.0.0 Apr. 13, 2020.
Oma: 2012 Open Mobile Alliance Ltd. Secure User Plane Location Architecture Open Mobile Alliance OMA-AD-SUPLV2_0-20120417-A, Apr. 17, 2012.
Oma: 2016 Open Mobile Alliance Ltd. UserPlane Location Protocol Open Mobile Alliance OMA-TS-ULP-V2_0_3-20160524-A, May 24, 2016.
"3rd Generation Partnership Project; Technical Specification Group Services and System Aspects; 5G System (5GS) Location Services (LCS); Stage 2 (Release 16)", 3GPP Draft; Interim_Draft _23273-G30+ CRS_Implemented, 3rd Generation Partnership Project (3GPP), Mobile Competence Centre ; 650, Route Des Lucioles ; F-06921 Sophia-Antipolis Cedex ; France, May 19, 2020.
Oct. 26, 2021—European Search Report—EP 21177785.9.
3GPP TS 22.261 V17.2.0 (Mar. 2020); Technical Specification; 3rd Generation Partnership Project; Technical Specification Group Services and System Aspects; Service Requirements for the 5G System; Stage 1 (Release 17).
3GPP TS 22.872 V16.1.0 (Sep. 2018); Technical Report; 3rd Generation Partnership Project; Technical Specification Group Services and System Aspects; Study on positioning use cases; Stage 1 (Release 16).
3GPP TS 23.271 V15.2.0 (Dec. 2019); Technical Specification; 3rd Generation Partnership Project; Technical Specification Group Services and System Aspects; Functional stage 2 description of location services (LCS) (Release 15).
3GPP TS 23.273 V16.3.0 (Mar. 2020); Technical Specification; 3rd Generation Partnership Project; Technical Specification Group Services and System Aspects; 5G system (5GS) location services (LCS); Stage 2 (Release 16).

3GPP TS 23.271 V16.0.0 (Dec. 2018); Technical Report; 3rd Generation Partnership Project; Technical Specification Group Services and System Aspects; Study on enhancement to the 5GC location services (Release 16).
3GPP TS 38.300 V16.0.0 (Dec. 2019) 3rd Generation Partnership Project; Technical Specification Group Radio Access Network; NR; NR and NG-RAN Overall Description; Stage 2 (Release 16).
3GPP TS 38.305 V15.5.0 (Dec. 2019) 3rd Generation Partnership Project; Technical Specification Group Radio Access Network; NG Radio Access Network (NG-RAN); Stage 2 functional specification of user equipment (UE) positioning in NG-RAN (Release 15).
3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15).
3GPP TS 38.413 V16.0.0 (Dec. 2019), Technical Specification; 3rd Generation Partnership Project; Technical Specification Group Radio Access Network; NG-RAN; NG application protocol (NGAP) (Release 16).
3GPP TS 38.423 V16.0.0 (Dec. 2019), Technical Specification, 3rd Generation Partnership Project; Technical Specification Group Radio Access Network; NG-RAN; Xn application protocol (XnAP) (Release 16).
3GPP TS 38.455 V15.2.1 (Jan. 2019), Technical Specification, 3rd Generation Partnership Project; Technical Specification Group Radio Access Network; NG-RAN; NR positioning protocol (NRPPa) (Release 15).
3GPP TS 38.856 V16.0.0 (Dec. 2019); Technical Report; 3rd Generation Partnership Project; Technical Specification Group Radio Access Network; Study on local NR positioning in NG-RAN (Release 16).
User Plane Location Protocol, Candidate Version 3.0—Sep. 20, 2011, Open Mobile Alliance (OMA-TS-ULP-V3_0-20110920-C).
R2-1903949 3GPP TSG RAN WG2 Meeting #105bis, Xi'an, China, Apr. 8-12, 2019, Source: Intel Corporation, Title: Supported positioning methods for NR depedent positioning.
S1-182585 3GPP TSG-SA WG1 Meeting #83, West Palm Beach, USA, Aug. 20-24, 2018, Source: ESA, LG Electronics Mobile Research, Title: KPIs for horizontal and vertical positioning service levels in clause 7.3.2.
S2-1907447 3GPP TSG-SA WG2 Meeting #134, Sapporo, Japan, Jun. 24-28, 2019, Source: Qualcomm Incorporated, Title: DL-only UE-based positioning.
S2-2001812 3GPP SA WG2 Meting #137e, eMeeting, Feb. 24-27, 2020, Source: CATT, Title: New WID: Enhancement to the 5GC Location Services—Phase 2.
SP-190452 3GPP TSG SA Meeting #84, Newport Beach, USA, Jun. 5-7, 2019, Source: SA WG2, Title: New SID: Study on Enhancement to the 5GC Location Services—Phase 2.

* cited by examiner

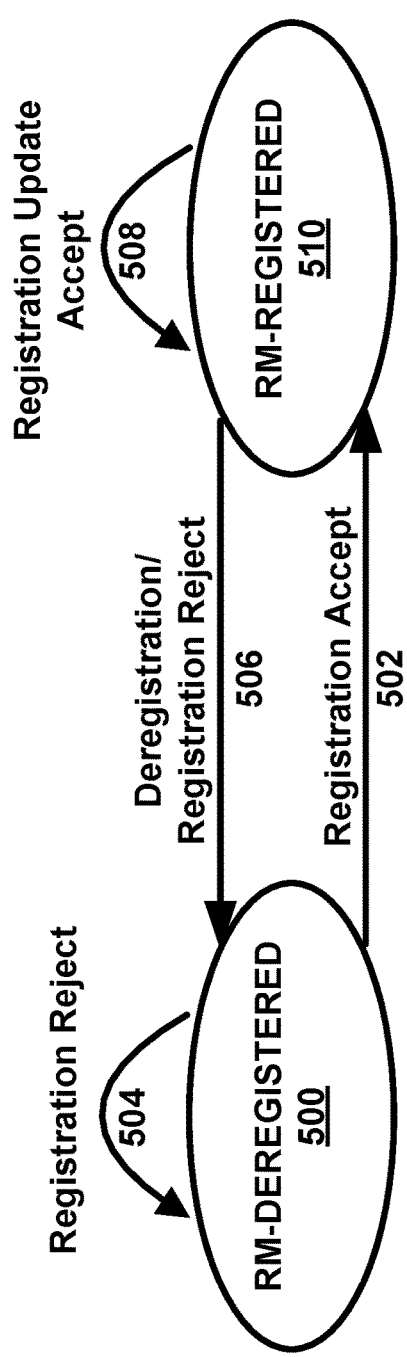

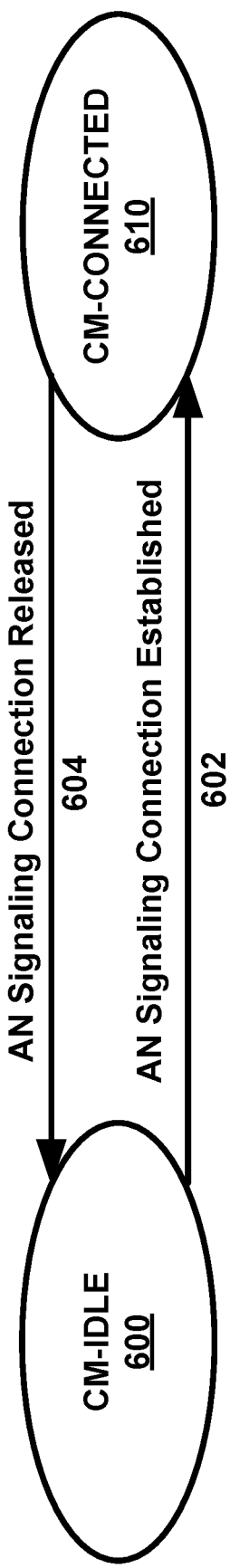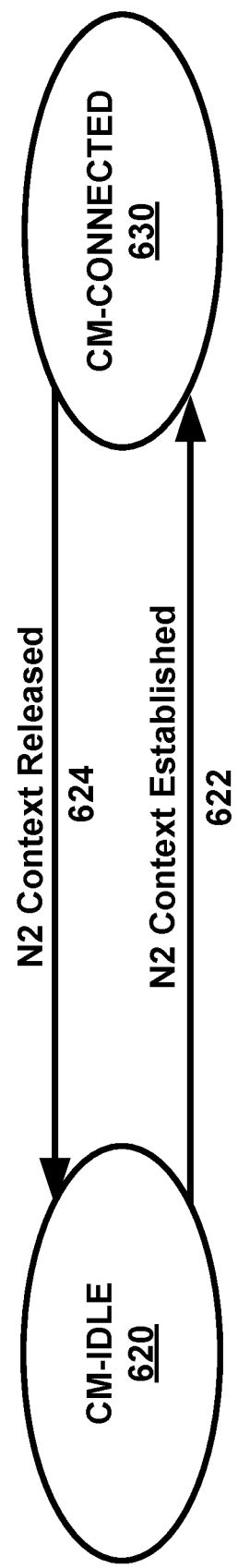

```
SIB ::= SEQUENCE {
    providePositioningCapabilities      ProvidePositioningCapabilities-IEs,
}

ProvidePositioningCapabilities-IEs ::= SEQUENCE {
    otdoa-ProvideCapabilities           OTDOA-ProvideCapabilities           OPTIONAL,
    ecid-ProvideCapabilities            ECID-ProvideCapabilities            OPTIONAL,
    nr-ECID-ProvideCapabilities         NR-ECID-ProvideCapabilities         OPTIONAL,
    nr-Multi-RTT-ProvideCapabilities    NR-Multi-RTT-ProvideCapabilities    OPTIONAL,
    nr-UL-AoD-ProvideCapabilities       NR-UL-AoD-ProvideCapabilities       OPTIONAL,
    nr-UL-TDOA-ProvideCapabilities      NR-UL-TDOA-ProvideCapabilities      OPTIONAL,
    no-Support-Capability               NO-Support-Capability               OPTIONAL
}
```

FIG. 24

```
RRCSetupRequest ::=            SEQUENCE {
    rrcSetupRequest            RRCSetupRequest-IEs
}

RRCSetupRequest-IEs ::=        SEQUENCE {
    ue-Identity                InitialUE-Identity,
    establishmentCause         EstablishmentCause,
    positionMeasure            PositionMeasure        OPTIONAL,
    spare                      BIT STRING (SIZE (1))
}

InitialUE-Identity ::=         CHOICE {
    ng-5G-S-TMSI-Part1         BIT STRING (SIZE (39)),
    randomValue                BIT STRING (SIZE (39))
}

EstablishmentCause ::=         ENUMERATED {
                               emergency, highPriorityAccess, mt-Access, mo-Signalling,
                               mo-Data, mo-VoiceCall, mo-VideoCall, mo-SMS, mps-
                               PriorityAccess, mcs-PriorityAccess, spare6, spare5, spare4,
                               spare3, spare2, spare1}

PositionMeasure ::=            SEQUENCE {
    requestPositionMeasureIndication   ENUMERATED {true}             OPTIONAL,
    userPlaneTransmissionIndication    ENUMERATED {true}             OPTIONAL,
    assistantDataforPositioning        BIT STRING (SIZE (2048))      OPTIONAL,
    requiredQoS                        BIT STRING (SIZE (1024))      OPTIONAL,
    positionMethod             ENUMERATED {ECID, OTDOA}              OPTIONAL,
    positonReportCycle         ENUMERATED {triggered, periodically}  OPTIONAL,
    spare                      BIT STRING (SIZE (1))
}
```

FIG. 25

2700
Receiving, from a wireless device, a first message comprising a requested positioning measurement indication for a positioning of the wireless device 2704
Performing, based on the first message, a positioning measurement for the positioning of the wireless device 2708
Sending, to the wireless device, the positioning measurement 2712
FIG. 27

WIRELESS DEVICE LOCATION DETERMINATION

CROSS-REFERENCE TO RELATED APPLICATIONS

This application claims the benefit of U.S. Provisional Application No. 63/034,512, filed on Jun. 4, 2020. The above-referenced application is hereby incorporated by reference in its entirety.

BACKGROUND

An approximate location of a communication device is determined by one or more entities in a communication network.

SUMMARY

The following summary presents a simplified summary of certain features. The summary is not an extensive overview and is not intended to identify key or critical elements.

A wireless device location may be determined in a communication network. A wireless device may lack sufficient information to indicate its precise location. One or more positioning measurements may be provided (e.g., by a base station) for determining a more precise location of the wireless device. The positioning measurement(s) and/or other information that may be related to the wireless device location may be sent, via a user plane transmission, to a network device (e.g., a gateway mobile location center (GMLC)). User plane transmission may be used to indicate a wireless device location with improved accuracy, reduced latency, and/or reduced signaling overhead.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A and FIG. 5B show example registration management state transitions for a wireless device and an access and mobility management function (AMF).
FIG. 6A and FIG. 6B show example connection management state transitions for a wireless device and an AMF.
FIG. 24 shows an example system information block (SIB) message body.
FIG. 25 shows an example radio resource control (RRC) message body.
FIG. 27 shows an example method for determination of a wireless device location.

DETAILED DESCRIPTION

Figure 1:
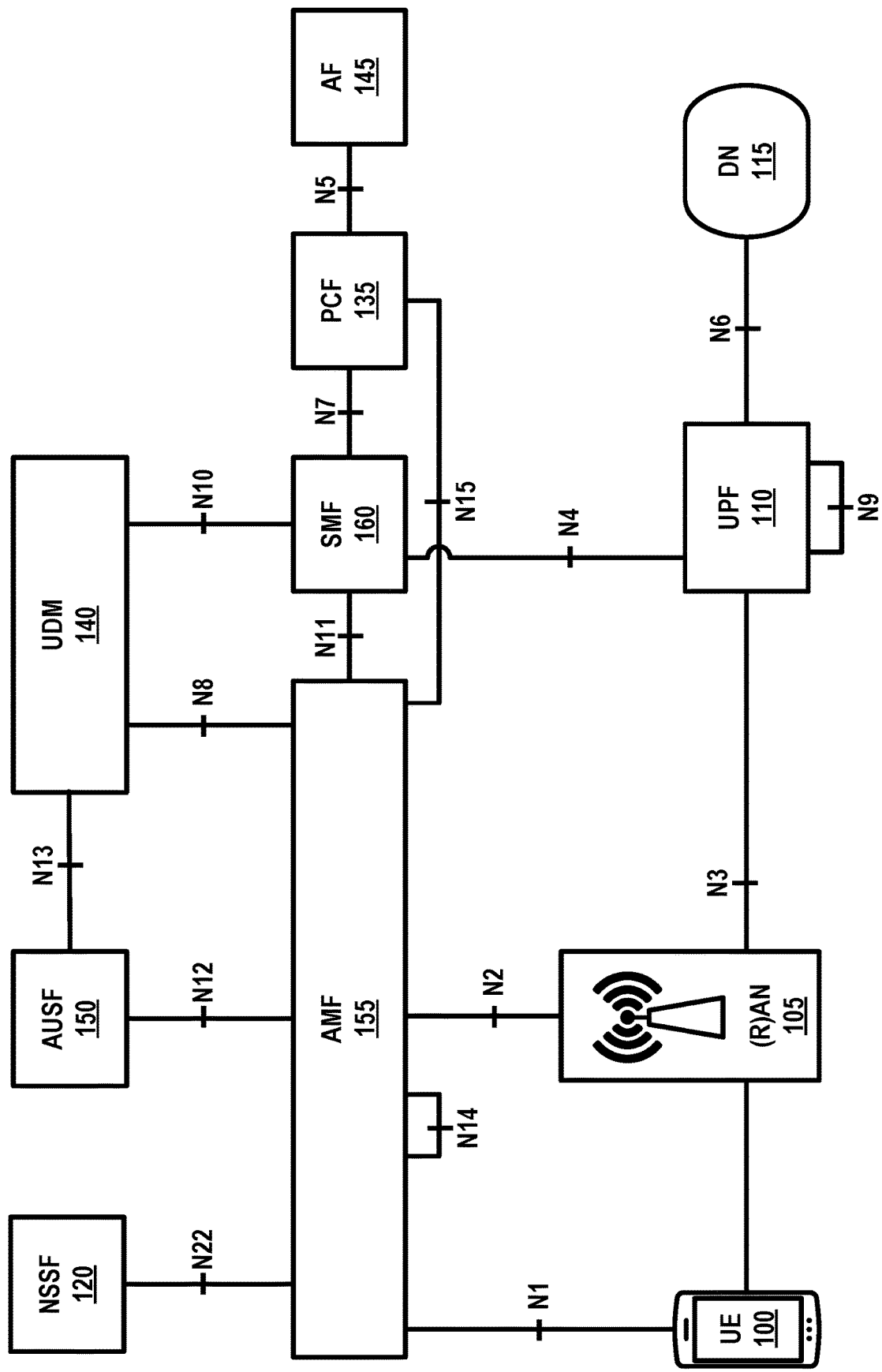
FIG. 1 shows an example 5G system architecture.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to location determination in a wireless network.

Figure 2:
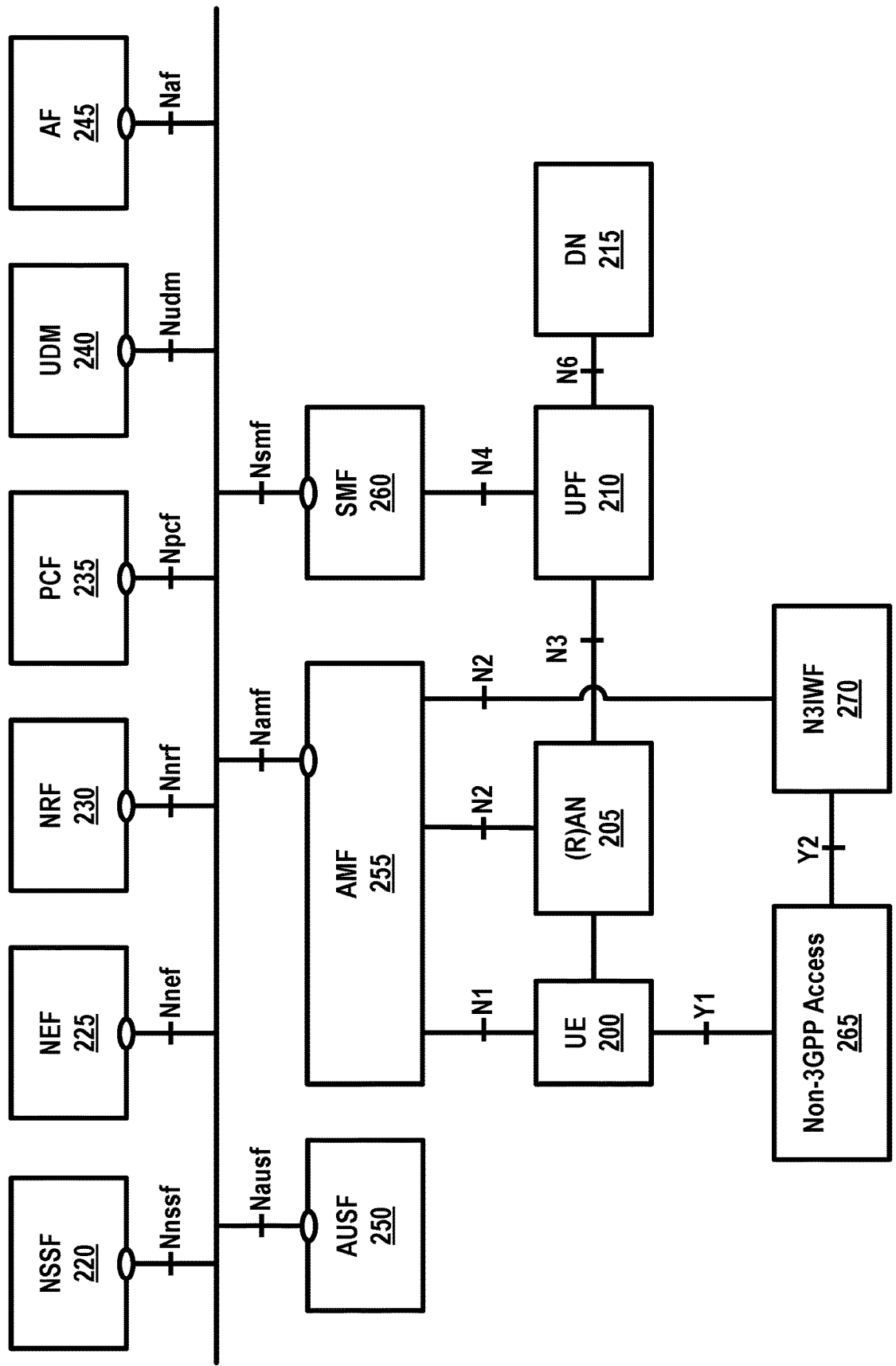
FIG. 2 shows an example 5G system.

The following acronyms are used throughout the present disclosure, provided below for convenience although other acronyms may be introduced in the detailed description:

5G 5th generation mobile networks
5GC 5G Core Network
5GS 5G System
5G-AN 5G Access Network
5QI 5G QoS Indicator
ACK Acknowledgement
AF Application Function
A-GNSS Assisted GNSS
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
BPS Barometric Pressure Sensor
CCNF Common Control Network Functions
CDR Charging Data Record
CHF Charging Function
CIoT Cellular IoT CN Core Network
CP Control Plane
C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization and Accounting
DNN Data Network Name
DTMB Digital Terrestrial Multimedia Broadcast
ECGI E-UTRAN Cell Global Identifier
ECID Enhanced Cell Identity
E-CSCF Emergency Call Session Control Function
eNodeB evolved Node B
EPS Evolved Packet System
E-UTRAN Evolved Universal Terrestrial Radio Access Network
FDD Frequency Division Duplex
FQDN Fully Qualified Domain Name
F-TEID Fully Qualified TEID
GAD Geographical Area Description
GMLC Gateway Mobile Location Centre
gNB Next Generation Node B
gNB-CU-CP gNB Central Unit Control Plane
GNSS Global Navigation Satellite System
GPSI Generic Public Subscription Identifier
GTP GPRS Tunneling Protocol
GUTI Globally Unique Temporary Identifier
GW Gateway
HGMLC Home GMLC
HTTP Hypertext Transfer Protocol
ID Identifier
IMEI International Mobile Equipment Identity
IMEI DB IMEI Database
IMS IP Multimedia Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
LAN local area network
LCS LoCation Services
LI Lawful Intercept
LMC Location Management Component
LMF Location Management Function
LPP LTE Positioning Protocol
LRF location retrieval function
MAC Media Access Control
MEI Mobile Equipment Identifier
MIB Master Information Block
MICO Mobile Initiated Connection Only
MME Mobility Management Entity
MO Mobile Originated
MO-LR Mobile Originated Location Request
MSISDN Mobile Subscriber ISDN
MT Mobile Terminating
MT-LR Mobile Terminated Location Request
N3IWF Non-3GPP InterWorking Function
NAI Network Access Identifier
NAS Non Access Stratum
NAT Network address translation
NB-IoT Narrow Band IoT
NCGI NR Cell Global Identity
NEF Network Exposure Function
NF Network Function
NGAP Next Generation Application Protocol
ng-eNB Next Generation eNB
NG-RAN NR Radio Access Network
NI-LR Network Induced Location Request
NR New Radio
NRF Network Repository Function
NRPPa New Radio Positioning Protocol A
NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
OTDOA Observed Time Difference of Arrival
PCC Policy and Charging Control
PCF Policy Control Function
PCRF Policy and Charging Rules Function
PDN Packet Data Network
PDU Packet Data Unit
PEI Permanent Equipment Identifier
PGW PDN Gateway
PLMN Public Land Mobile Network
ProSe Proximity-based Services
QFI QoS Flow Identifier
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SCM Security Context Management
SEA Security Anchor Function
SET SUPL Enabled Terminal
SGW Serving Gateway
SIB System Information Block
SLP SUPL Location Platform
SM Session Management
SMF Session Management Function
SMSF SMS Function
S-NSSAI Single Network Slice Selection Assistance information
SS Synchronization Signal
SSC Session and Service Continuity
SUCI Served User Correlation ID
SUPI Subscriber Permanent Identifier
SUPL Secure User Plane Location
TA Tracking Area
TAI Tracking Area Identity
TBS Terrestrial Beacon System
TCP Transmission Control Protocol
TEID Tunnel Endpoint Identifier
TMSI Temporary Mobile Subscriber Identity
TNAN Trusted Non-3GPP Access Network
TNGF Trusted Non3GPP Gateway
TRP Transmission and Reception Point
UCMF UE radio Capability Management Function
UDR Unified Data Repository
UDM Unified Data Management
UDP User Datagram Protocol
UE User Equipment
UL Uplink
UL CL Uplink Classifier UP User Plane
UPF User Plane Function
V2X Vehicle-To-Everything
WLAN Wireless Local Area Network
XML Extensible Markup Language FIG. 1 and FIG. 2 show examples of system architecture (e.g., 5G system architecture). A 5G access network may comprise an access network in communication with and/or connecting to and a core network (e.g., a 5G core network). An example access network (e.g., a 5G access network) may comprise an access network connected to a core network (e.g., 5G core network). An access network may comprise a RAN 105 (e.g., NG-RAN) and/or a non-3GPP AN. The core network (e.g., 5G core network) may communicate with one or more access networks (e.g., 5G access networks (5G-AN) and/or RANs 105. The 5GC may comprise functional elements or network functions as in example FIG. 1 and example FIG. 2, where interfaces may be employed for communication among the functional elements and/or network elements. A base station, (Radio) Access Network ((R)AN), Next Generation Radio Access Network (NG-RAN), New radio Node B (gNB), and/or Next Generation eNodeB (ng-eNB) may be used interchangeably. A network function may be a processing function in a network that has a functional behavior and interfaces. A network function may be implemented as a network element on a dedicated hardware, a base station, and/or as a software instance running on a hardware, shared hardware, and/or as a virtualized function instantiated on an appropriate platform.

A wireless device 100 may communicate with the RAN 105. The RAN 105 may comprise an access network. The wireless device 100 may communicate with a first network entity/component (for example and purposes of explanation, an AMF 155) via a second network entity/component (for example and purposes of explanation, a N1 interface). The RAN 105 may communicate with the AMF 155 via a fourth network entity/component (for example and purposes of explanation, an N2 interface). The RAN 105 may communicate with a fifth network entity/component (for example and purposes of explanation, a UPF 110) via a sixth network entity/component (for example and purposes of explanation, an N3 interface). The UPF 110 may communicate with a seventh network entity/component (for example and purposes of explanation, a data network (DN) 115) via an eighth network entity/component (for example and purposes of explanation, an N6 interface). The UPF 110 may communicate with itself and/or another UPF 110 via a ninth network entity/component (for example and purposes of explanation, an N9 interface). The UPF 110 may communicate with a tenth network entity/component (for example and purposes of explanation, an SMF 160) via an eleventh network entity/component (for example and purposes of explanation, an N4 interface).

The AMF 155 may communicate with itself and/or another AMF 155 via a twelfth network entity/component (for example and purposes of explanation, an N14 interface). The AMF 155 may communicate with a thirteenth network entity/component (for example and purposes of explanation, an NSSF 120) via a fourteenth network entity/component (for example and purposes of explanation, an N22 interface. The AMF 155 may communicate with a fifteenth network entity/component (for example and purposes of explanation, a UDM 140) via a sixteenth network entity/component (for example and purposes of explanation, an N8 interface). The AMF 155 may communicate with a seventeenth network entity/component (for example and purposes of explanation, an AUSF 150) via an eighteenth network entity/component (for example and purposes of explanation, an N12 interface). The AMF 155 may communicate with a nineteenth network entity/component (for example and purposes of explanation, a PCF 135) via a twentieth network entity/component (for example and purposes of explanation, an N15 interface). The AMF 155 may communicate with the SMF 160 via a twenty-first network entity/component (for example and purposes of explanation, an N11 interface). The AUSF 150 may communicate with the UDM 140 via a twenty-second network entity/component (for example and purposes of explanation, an N13 interface). The UDM 140 may communicate with the SMF 160 via a twenty-third network entity/component (for example and purposes of explanation, an N10 interface). The SMF may communicate with the PCF 135 via twenty-fourth network entity/component (for example and purposes of explanation, an N7 interface). The PCF 135 may communicate with a twenty-fifth network entity/component (for example and purposes of explanation, an application function (AF) 145 via a twenty-sixth network entity/component (for example and purposes of explanation, an N5 interface).

FIG. 2 shows an example system comprising access networks and a core network. The access network may comprise, for example, a RAN 205 and a non-3GPP access network 265 (e.g., untrusted non-3GPP access network). Elements shown in FIG. 2 may correspond to elements in FIG. 1 with like numerals.

The access and mobility management function AMF 155, 255 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100, 200 and an SMF 160, 260, transparent proxy for routing SM messages, access authentication, access authorization, transport for short message service (SMS) messages between wireless device 100, 200 and an SMS function (SMSF), security anchor function (SEA) interaction with the AUSF 150, 250 and the wireless device 100, 200, receiving an intermediate key established as a result of the wireless device 100, 200 authentication process, security context management (SCM), and/or receiving a key from the SEA to derive access network specific keys. A variety of these functionalities may be supported in a single instance of an AMF 155, 255 and/or in multiple instances of AMF 155, 255 as appropriate.

The AMF 155, 255 may support non-3GPP access networks via an N2 interface with N3IWF 170, 270, NAS signaling with a wireless device 100, 200 over N3IWF 170, 270, authentication of wireless devices connected over N3IWF 170, 270, management of mobility, authentication, and separate security context state(s) of a wireless device 100, 200 connected via non-3GPP access 265 or connected via 3GPP access 105, 205 and non-3GPP accesses 265 simultaneously, support of a coordinated RM context valid over 3GPP access 105, 205 and non-3GPP access 265, and/or support of context management (CM) management contexts for the wireless device 100, 200 for connectivity over non-3GPP access. Some functionalities described above may be supported in an instance of a network slice. An AMF 155, 255 region may comprise of one or multiple AMF 155, 255 sets. AMF 155, 255 set may comprise of some AMFs 155, 255 that serve a given area and/or network slice(s). Multiple AMF 155, 255 sets may be per AMF 155, 255 region and/or network slice(s). Application identifiers may be mapped to one or more specific application traffic detection rules. A configured NSSAI may be a NSSAI that has been provisioned in a wireless device 100, 200. DN 115, 215 access identifier (DNAI), for a DNN, may be an identifier of a user plane access to a DN 115, 215. Initial registration may be related to a wireless device 100, 200 registration in a RM-DEREGISTERED state. N2AP wireless device 100, 200 association may be a logical per wireless device 100, 200 association between a 5G AN node and an AMF 155, 255. Wireless device 100, 200 may comprise a N2AP wireless device-TNLA-binding, which may be a binding between a N2AP wireless device 100, 200 association and a specific transport network layer (TNL) association for a given wireless device 100, 200.

The session management function (SMF) 160, 260 may comprise one or more of the following functionalities: session management (e.g., session establishment, modify and release, comprising tunnel maintain between UPF 110, 210 and an AN such as RAN 105, 205 node), wireless device IP address allocation & management (comprising optional authorization), selection and control of user plane function(s), configuration of traffic steering at UPF 110, 210 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155, 255 over N2 to (R)AN 105, 205, determination of SSC mode of a session, roaming functionality, handling local enforcement to apply QoS SLAs (VPLMN), charging data collection and charging interface (VPLMN), lawful intercept (in VPLMN for SM events and interface to LI system), and/or support for interaction with external DN 115, 215 for transport of signaling for PDU session authorization/authentication by external DN 115, 215. One or more of these functionalities may be supported in a single instance of a SMF 160, 260. One or more of the SMF functionalities may be supported in a single instance of the SMF 160, 260.

The user plane function (UPF) 110, 210 may comprise one or more of the following functionalities: anchor point for Intra-/Inter-RAT mobility (if applicable), external PDU session point of interconnect to DN 115, 215, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. Some of the UPF functionalities may be supported in a single instance of a UPF 110, 210. One or more of functionalities described above may be supported in an instance of a network slice. User plane function(s) (UPF(s) 110, 210) may handle the user plane path of PDU sessions. A UPF 110, 210 that provides the interface to a data network supports the functionality of a PDU session anchor.

IP address management may comprise allocation and release of the wireless device IP address as well as renewal of the allocated IP address. The wireless device 100, 200 sets the requested PDU type during the PDU session establishment procedure based on its IP stack capabilities and configuration. The SMF 160, 260 may select PDU type of a PDU session as follows: if the SMF 160, 260 receives a request with PDU type set to IP, the SMF 160, 260 may select either PDU type IPv4 or IPv6 based on DNN configuration and/or operator policies. The SMF 160, 260 may also provide a cause value to the wireless device 100, 200 to indicate whether the other IP version (e.g., IPv6 if IPv4 is selected and vice versa) may be supported on the DNN. If the other IP versions are supported, wireless device 100, 200 may request another PDU session to the same DNN for the other IP version. If the SMF 160, 260 receives a request for PDU type IPv4 or IPv6 and the requested IP version may be supported by the DNN, the SMF 160, 260 selects the requested PDU type. The 5GC elements and wireless device 100, 200 support the following mechanisms: during PDU session establishment procedure, the SMF 160, 260 may send the IP address to the wireless device 100, 200 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140, 240 or based on the configuration on a per-subscriber, per-DNN basis. User plane function(s) (e.g., UPF 110) may be used for the user plane path of PDU sessions. A UPF 110 that provides the interface to a data network may support functionality of a PDU session anchor.

The policy control function PCF 135, 235 may support unified policy framework to govern network behavior, provide policy rules to control plane function(s) to enforce them, and/or implement a front end to access subscription information relevant for policy decisions in a user data repository (UDR). The unified data management UDM 140, 240 may comprise an application front end (FE) that comprises the UDM-FE that may be in charge of processing credentials, location management, and/or subscription management. The PCF 135, 235 may be in charge of policy control and the user data repository (UDR) that stores data required for functionalities provided by UDM-FE, plus policy profiles required by the PCF 135, 235. The data stored in the UDR may comprise at least user subscription data, comprising at least subscription identifiers, security credentials, access and mobility related subscription data, session related subscription data, and/or policy data. The network exposure function NEF 125, 225 may provide a means to securely expose the services and capabilities provided by the 3GPP network functions, translate between information exchanged with the AF 145, 245 and information exchanged with the internal network functions, and/or receive information from other network functions.

The NF repository function NRF 130, 230 may support a service discovery function that receives NF discovery requests from a NF instance, provides the information of the discovered NF instances to the NF instance, and/or maintains the information of available NF instances and their supported services. An NSSF 120 may select/determine a set of network slice instances serving a wireless device 100. The NSSF 120 may select/determine an NSSAI (e.g., an allowed NSSAI). The NSSF 120 may select/determine the AMF 155, which may be determined to be employed to serve the wireless device 100. The NSSF 120 may determine a list of candidate AMFs (e.g., a plurality of AMF 155), for example, by communicating with (e.g., querying) the NRF 130. A UDR may store/include subscription data (e.g., user subscription data, subscription identifiers, security credentials, access and mobility related subscription data, session related subscription data, policy data, and/or the like). An AUSF 150 may support an authentication server function.

The functionality of non-3GPP interworking function N3IWF 170, 270 for non-3GPP access 265 may comprise at least one or more of the following: supporting of IPsec tunnel establishment with the wireless device, terminating the IKEv2/IPsec protocols with the wireless device 100, 200 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100, 200 and AMF 155, 255, handling of N2 signaling from SMF 160, 260 (which may be relayed by AMF 155, 255) related to PDU sessions and QoS, establishing of IPsec security association (IPsec SA) to support PDU session traffic, relaying uplink and downlink user-plane packets between the wireless device 100, 200 and UPF 110, 210, enforcing QoS corresponding to N3 packet marking, considering QoS requirements associated to such marking received over N2, N3 user-plane packet marking in the uplink, local mobility anchor within untrusted non-3GPP access networks 265 using MOBIKE, and/or supporting AMF 155, 255 selection.

The application function AF 145, 245 may interact with the 3GPP core network to provide a variety of services. Based on operator deployment, AF 145, 245 may be trusted by the operator to interact directly with relevant network functions. Application functions not provided by the operator to access directly the network functions may use the external exposure framework (via the NEF 125, 225) to interact with relevant network functions.

The control plane interface between the (R)AN 105, 205 and the 5GC may support connection of multiple different kinds of ANs, such as 3GPP (R)AN 105, 25 and/or N3IWF 170, 270, to the 5GC via a unique control plane protocol. A single N2 AP protocol may be employed for both the 3GPP access 105, 205 and non-3GPP access 265 and/or for decoupling between AMF 155, 255 and other functions such as SMF 160, 260 that may need to control the services supported by AN(s) (e.g., control of the UP resources in the AN 105, 205 for a PDU session). The 5GC may be able to provide policy information from the PCF 135, 235 to the wireless device 100, 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100, 200 via non-3GPP access networks 265. As shown in example FIG. 5, the registration management, RM may be employed to register or de-register a wireless device 100, 200 with the network, and establish the user context in the network. Connection management may be employed to establish and release the signaling connection between the wireless device 100, 200 and the AMF 155, 255.

A wireless device 100, 200 may need to register with the network to receive services that require registration. The wireless device 100, 200 may update its registration with the network, for example, periodically, after the wireless device is registered, to remain reachable (e.g., periodic registration update), on mobility (e.g., mobility registration update), and/or to update its capabilities or re-negotiate protocol parameters. An initial registration procedure, such as in the examples shown in FIG. 8 and FIG. 9, may involve execution of network access control functions (e.g., user authentication and access authorization based on subscription profiles in UDM 140, 240). As result of the registration procedure, the identity of the serving AMF 155, 255 may be registered in UDM 140, 240. The registration management (RM) procedures may be applicable over both 3GPP access 105, 205 and non-3GPP access 265.

Figure 3:
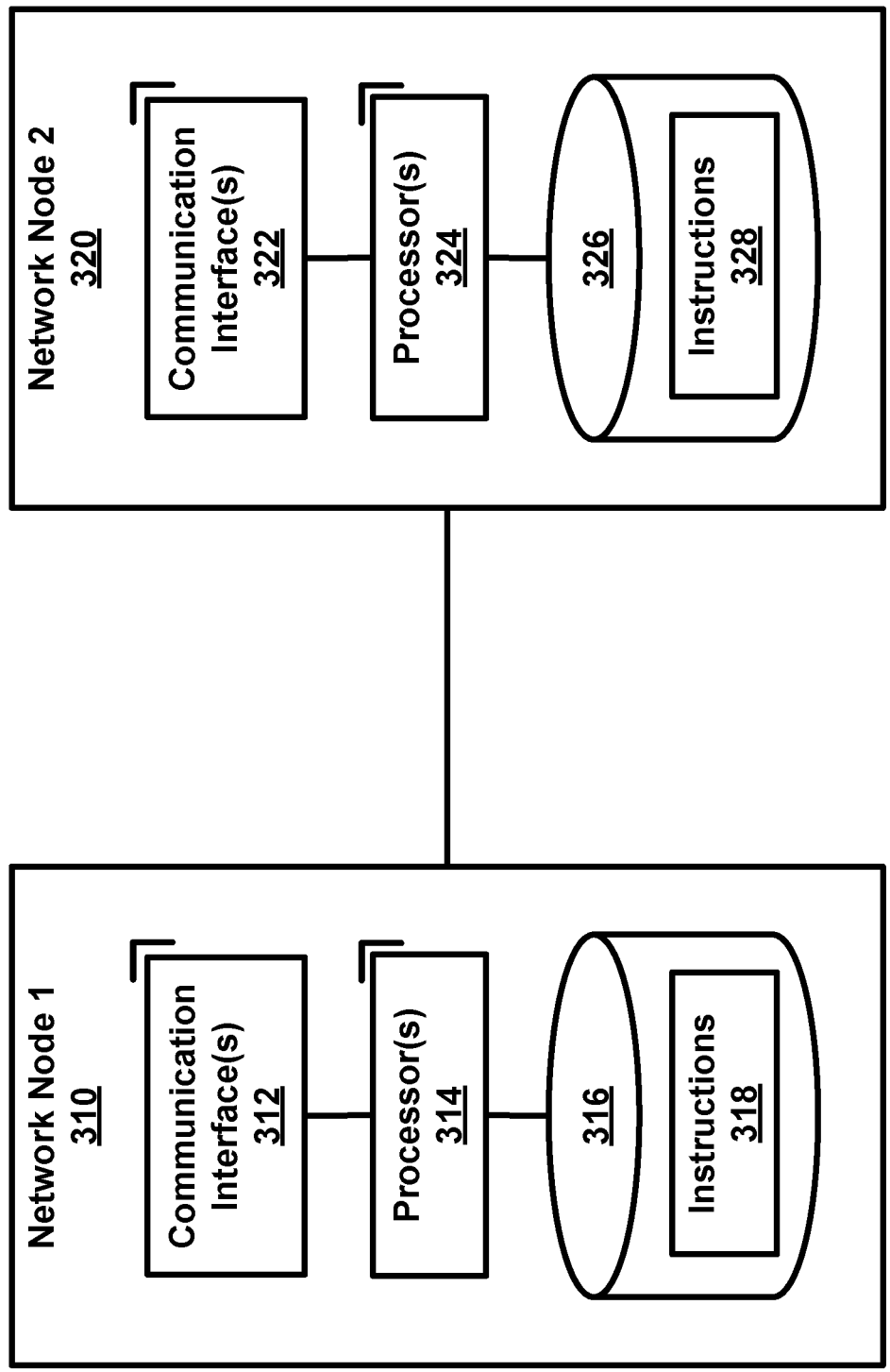
FIG. 3 shows an example of one or more network nodes.
Figure 4A:
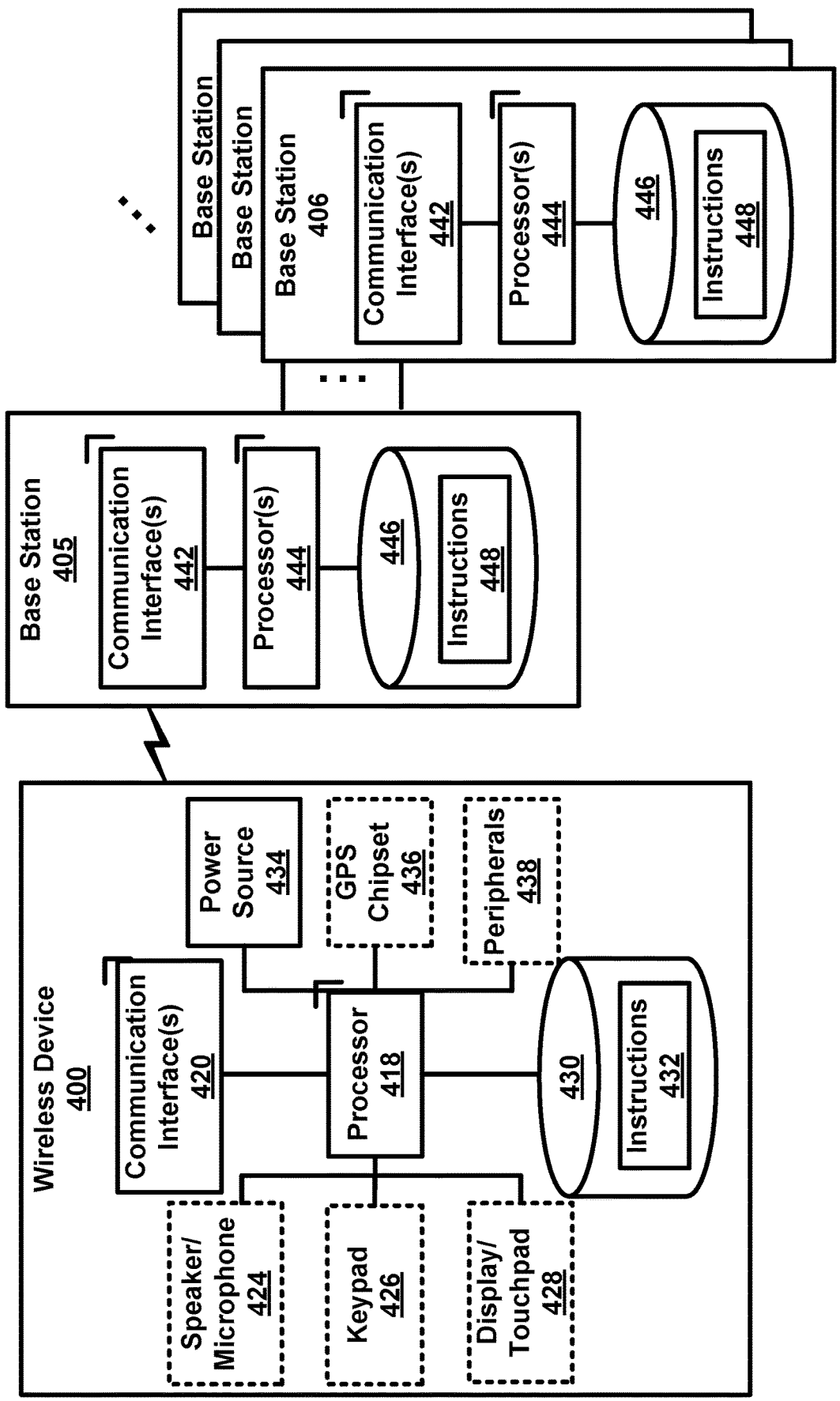
FIG. 4A shows an example of a wireless device and one or more base stations.
Figure 4B:
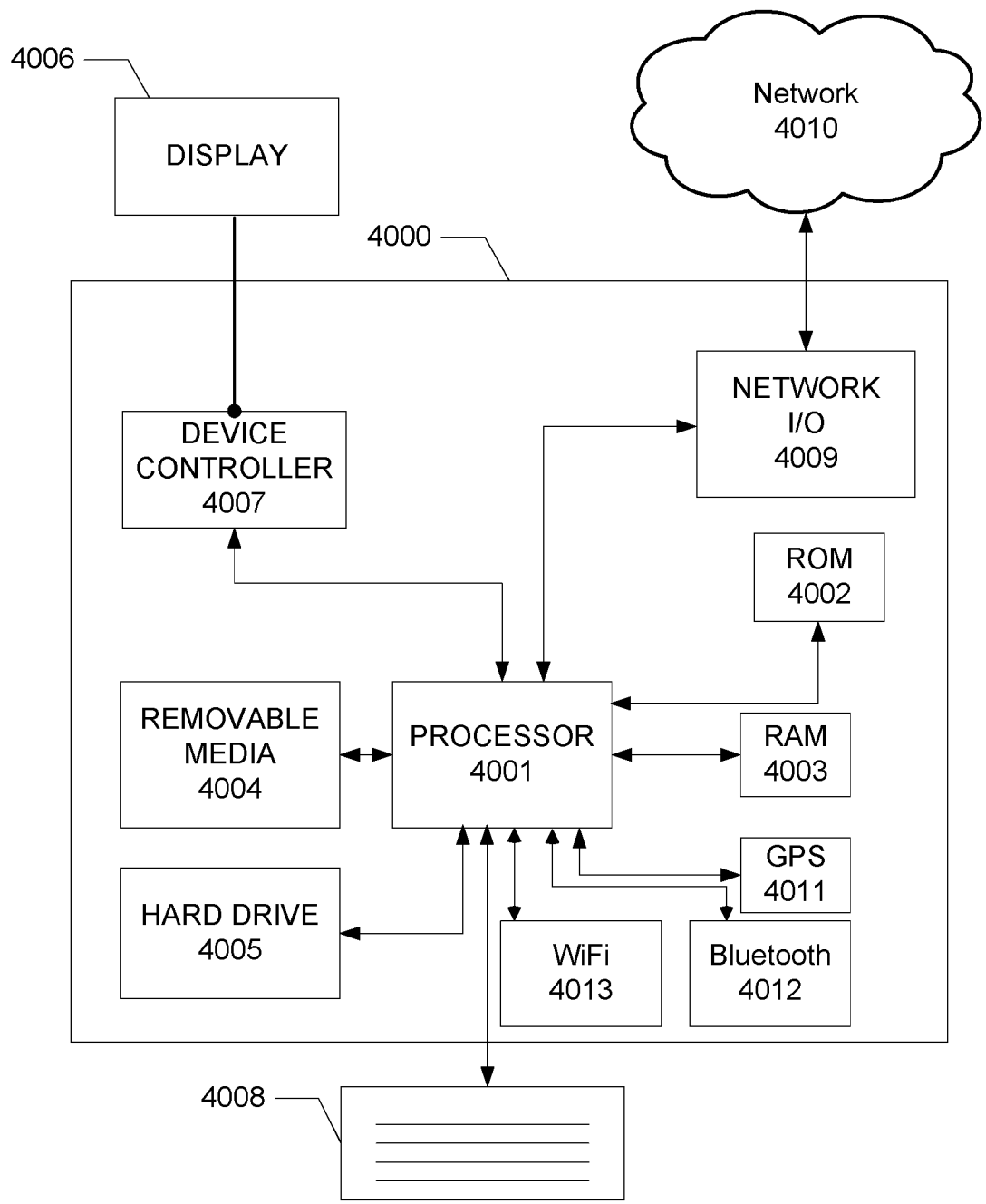
FIG. 4B shows example elements of computing devices that may be used to implement any of the various devices described herein.

FIG. 3 shows hardware elements of a first network node 310 (e.g., a wireless device) and a second network node 320 (e.g., a base station). A communication network may include at least one first network node 310 and at least one second network node 320. The first network node 310 may include one or more communication interface 312, one or more processors 314, and one or more sets of program code instructions 318 stored in non-transitory memory 316 and executable by the one or more processors 314. The second network node may include one or more communication interface 322, one or more processors 324, and one or more sets of program code instructions 328 stored in non-transitory memory 326 and executable by the one or more processors 324. A communication interface 312 in the first network node 310 may be configured to engage in communication with a communication interface 22 in the second network node 320, such as via a communication path that includes at least one wireless link. The wireless link may be a bi-directional link. The communication interface 322 in the second network node 320 may be configured to engage in communication with the communication interface 312 in the first network node 310. The first network node 310 and the second network node 320 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (JAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals.

Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 320) providing New Radio (NR) user plane and control plane protocol terminations towards a first network node (e.g., 310) such as a wireless device. A RAN node may be a next generation evolved Node B (ng-eNB), providing Evolved UMTS Terrestrial Radio Access (E-UTRA) user plane and control plane protocol terminations towards a second wireless device. A first network node 310 (e.g., a wireless device) may communicate with a base station (e.g., a gNB) over a Uu interface. A second wireless device may communicate with a base station (e.g., an ng-eNB) over a Uu interface. The second network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g., Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored in memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a Wi-Fi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via wireless or wired communications) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna, a geographic position of the computing device 400.

The wireless device 400 may communicate with a first base station 405 and/or one or more second base stations 406. The first base station 405 may comprise one or more of a communication interface 442, processor 444, memory 446, instructions 448, and/or any of element, including any element described above regarding the wireless device 400. The one or more second base stations 406 may comprise one or more of a communication interface 442, processor 444, memory 446, instructions 448, and/or any of element, including any element described above regarding the wireless device 400. The first base station 405 may communicate with the wireless device 400 and/or the one or more second base stations 406 via communication interface 442. The one or more second base stations 406 may communicate with the wireless device 405 and/or the first base station via communication interface 442.

FIG. 4B shows general hardware elements that may be used to implement any of the various computing devices discussed herein, including, e.g., the network node 310, the network node 320, the wireless device 400, the base station 405, the base stations 406, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a Wi-Fi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The examples in FIGS. 4A and 4B are hardware configurations, although the components shown may be implemented as software as well. For example, modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (JAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 5A and FIG. 5B depict examples of the RM states of a wireless device, such as the wireless device 100, 200 as observed by the wireless device 100, 200 and AMF 155, 255. FIG. 5A shows RM state transition in the wireless device. Two RM states may be used in a wireless device 100, 200 (and possibly in the AMF 155, 255) that may reflect the registration status of the wireless device 100, 200 in the selected PLMN. The registration status of the wireless device 100, 200 in the selected PLMN may be RM-DEREGISTERED 500 or RM-REGISTERED 510. In the RM DEREGISTERED state 500, the wireless device 100, 200 may not be registered with a network. The wireless device 100, 200 context in AMF 155, 255 may not hold valid location or routing information for the wireless device 100, 200 so the wireless device 100, 200 may be not reachable by the AMF 155, 255. Some wireless device context may still be stored in the wireless device 100, 200 and the AMF 155, 255. In the RM REGISTERED state 510, the wireless device 100, 200 may be registered with the network. In the RM-REGISTERED 510 state, the wireless device 100, 200 may receive services that require registration with the network.

FIG. 5B shows RM state transitions in the AMF 155, 255. Two RM states may be used in the AMF 155, 255 for the wireless device 100, 200 that reflect the registration status of the wireless device 100, 100 in the selected PLMN. The two RM states that may be used in the AMF 155, 255 for the wireless device 100, 200 in the selected PLMN may be RM-DEREGISTERED 520 or RM-REGISTERED 530. The state of RM-DEREGISTERED 500 in the wireless device 100, 200 may correspond to the state of RM-DEREGISTERED 520 in the AMF 155, 255. The state of RM-REGISTERED 510 in the wireless device 100, 200 may correspond to the state of RM-REGISTERED 530 in the AMF 155, 255.

FIG. 6A and FIG. 6B depict examples of CM state transitions as observed by the wireless device 100 and AMF 155. Connection management CM may comprise the functions of establishing and releasing a signaling connection between a wireless device 100, 200 and the AMF 155, 255 over N1. This signaling connection may be used to provide NAS signaling exchange between the wireless device 100, 200 and a core network. The signaling connection may comprise both the AN signaling connection between the wireless device 100, 200 and/or the (R)AN 105, 205 (e.g., RRC connection over 3GPP access) and the N2 connection for this wireless device 100, 200 between the AN and the AMF 155, 255. FIG. 6A shows CM state transitions in the wireless device 100, 200. Two CM states may be used for the NAS signaling connectivity of the wireless device 100, 200 with the AMF 155, 255: CM-IDLE 600 and CM-CONNECTED 610. A wireless device 100, 200 in CM-IDLE 600 state may be in RM-REGISTERED 510 state that may have no NAS signaling connection established with the AMF 155, 255 over N1. The wireless device 100, 200 may perform cell selection, cell reselection, and PLMN selection. A wireless device 100, 200 in CM-CONNECTED 610 state may have a NAS signaling connection with the AMF 155, 255 over N1. RRC inactive state may apply to NG-RAN (e.g., it applies to NR and E-UTRA connected to 5G CN). The AMF 155, 255 may provide (e.g., based on network configuration) assistance information to the NG (R)AN 105, 205, for example, to assist the NG (R)AN's 105, 205 decision as to whether the wireless device 100, 200 may be sent to RRC inactive state. If a wireless device 100, 200 may be CM-CONNECTED 610 with RRC inactive state, the wireless device 100, 200 may resume the RRC connection (e.g., due to uplink data pending), may execute a mobile initiated signaling procedure (e.g., as a response to (R)AN 105, 205 paging), and/or notify the network that it has left the (R)AN 105, 205 notification area. NAS signaling connection management may comprise the functions of establishing and releasing a NAS signaling connection. NAS signaling connection establishment function may be provided by the wireless device 100, 200 and the AMF 155, 255 to establish a NAS signaling connection for a wireless device 100, 200 in CM-IDLE 600 state. The procedure of releasing a NAS signaling connection may be initiated by the 5G (R)AN 105, 205 node or the AMF 155, 255.

FIG. 6B shows CM state transitions in the AMF 155, 255. Two CM states may be used for a wireless device 100, 200 at the AMF 155, 255: CM-IDLE 620 and CM-CONNECTED 630. The state of CM-IDLE 600 in the wireless device 100, 200 may correspond to the state of CM-IDLE 620 in the AMF 155, 255. The state of CM-CONNECTED 610 in the wireless device 100, 200 may correspond to the state of CM-CONNECTED 630 in the AMF 155, 255. Reachability management of the wireless device 100, 200 may detect whether a wireless device 100, 200 may be reachable and/or provide the wireless device location (e.g., the access node in communication with the wireless device) for the network to reach the wireless device 100, 200. This may be done by paging wireless device 100, 200 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105, 205 (e.g., for a CM-CONNECTED 630 state).

The wireless device 100, 200 and the AMF 155, 255 may negotiate wireless device 100, 200 reachability characteristics in CM-IDLE 600 and/or 620 states during registration and registration update procedures. A variety of wireless device reachability categories may be negotiated between a wireless device 100, 200 and an AMF 155, 255 for CM-IDLE 600 and/or 620 states, such as wireless device 100, 200 reachability providing mobile device terminated data. The wireless device 100, 200 may be CM-IDLE 600 mode and mobile initiated connection only (MICO) mode. The 5GC may support a PDU connectivity service that provides exchange of PDUs between a wireless device 100, 200 and a data network identified by a DNN. The PDU connectivity service may be supported via PDU sessions that may be established, for example, after request from the wireless device 100, 200.

A PDU session may support one or more PDU session types. PDU sessions may be established (e.g., after wireless device 100, 200 request), modified (e.g., after wireless device 100 and 5GC request) and released (e.g., after wireless device 100, 200 and 5GC request) using NAS SM signaling exchanged over N1 between the wireless device 100, 200 and the SMF 160, 260. The 5GC may be able to trigger a specific application in the wireless device 100 (e.g., after a request from an application server). If receiving that trigger message, the wireless device 100, 200 may pass it to the identified application in the wireless device 100, 200. The identified application in the wireless device 100, 200 may establish a PDU session to a specific DNN.

Figure 7:
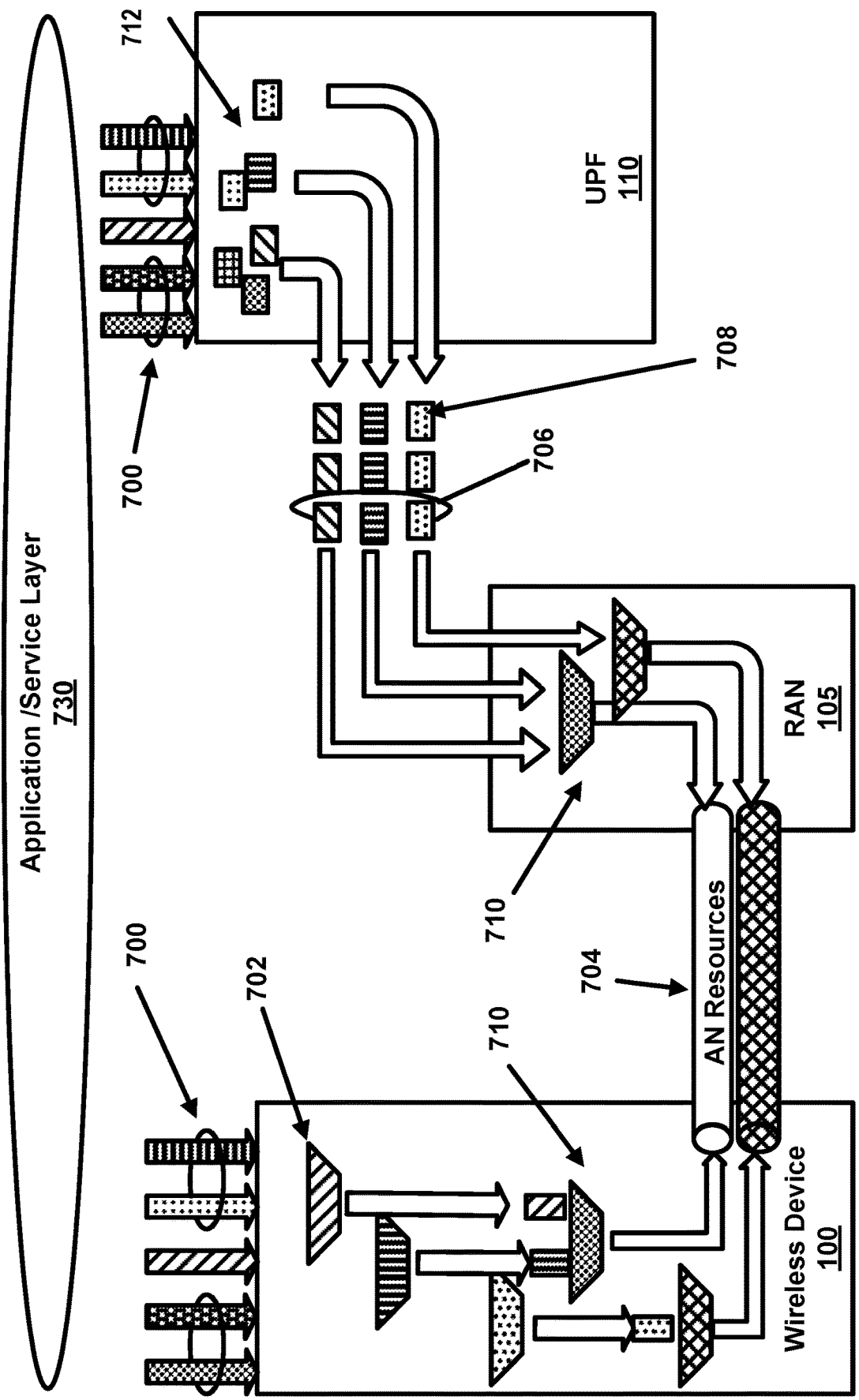
FIG. 7 shows an example for classification and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160, 260) may allocate the QFI for a QoS flow and may derive its QoS parameters from the information provided by the PCF. The SMF 160, 260 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like).

One or more devices (e.g., a 5GC) may support edge computing and may provide operators and/or third party services to be hosted close to the wireless device access point of attachment. The one or more devices (e.g., a 5GC) may select a UPF 110, 210 close to the wireless device 100, 210 and may execute the traffic steering from the UPF 110, 210 to the LADN via a N6 interface. This selecting a UPF 110, 210 close to the wireless device may be based on the wireless device subscription data, wireless device location, the information from application function AF 145, 245, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110, 210 to route the user traffic to the LADN, traffic steering where the one or more devices (e.g., a 5GC) selects the traffic to be routed to the applications in the LADN, session and service continuity to provide wireless device 100, 200 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 205, 5GC and a wireless device 100, 200, and/or the like. Provided NSSAI may be an NSSAI provided by a serving PLMN, for example, during a registration procedure, indicating the NSSAI provided by the network for the wireless device 100, 200 in the serving PLMN for the current registration area. One or more network slices (e.g., a set of network slices) for a wireless device may be changed at any time, for example, during a time that the wireless device may be registered with a network, based on being initiated by a network, and/or based on being initiated by the wireless device. A periodic registration update may be wireless device 100, 200 re-registration at expiry of a periodic registration timer. A requested NSSAI may be a NSSAI that the wireless device 100, 200 may provide to the network. A service-based interface may represent how a set of services may be provided/exposed by a given NF.

A PDU connectivity service may provide exchange of PDUs between a wireless device 100, 200 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services. This service-based representation shown in FIG. 1 may also comprise point-to-point reference points where necessary. FIG. 1 shows an example reference point representation, showing the interaction between the NF services in the network functions described by point-to-point reference point (e.g., N11) between any two network functions.

A network slice may comprise or be associated with the core network control plane and/or user plane network functions such as, for example, a 5G RAN, the N3IWF functions to the non-3GPP Access Network, and/or the like. Network slices may support differing features and/or network function implementations. An operator may deploy multiple network slice instances delivering the same features for different groups of wireless devices, to deliver different committed service, and/or because the network slice instances may be dedicated to an individual customer. The NSSF 120 may store the mapping information between a slice instance ID and an NF ID (and/or NF address).

A wireless device 100, 200 may simultaneously be served by one or more network slice instances via, for example, a 5G-AN. The wireless device 100, 200 may be served by k network slices (e.g., k=8, 16, etc.) at a time. An AMF 155, 255 instance serving the wireless device 100, 200 may belong to a network slice instance serving the wireless device 100.

A PDU session may belong to one specific network slice instance per PLMN. Different network slice instances may not share a PDU session. Different slices may have slice-specific PDU sessions using the same DNN, or different DNNs.

A Single Network Slice Selection Assistance Information (S-NSSAI) may indicate (e.g., identify) a network slice. An S-NSSAI may comprise a slice/service type (SST) and/or a slice differentiator (SD). The SST may refer to the expected network slice behavior in terms of features and services. An SD may be optional information that may complement the slice/service type(s), for example, to allow further differentiation for selecting a network slice instance from potentially multiple network slice instances that comply with the indicated slice/service type. The same network slice instance may be selected using different S-NSSAIs. The CN part of a network slice instance(s) serving a wireless 100, 200 may be selected by the CN.

Subscription data may include the S-NSSAI(s) of the network slices to which the wireless device 100, 200 may subscribe. One or more S-NSSAIs may be indicated (e.g., marked) as a default S-NSSAI. k S-NSSAI may be indicated (e.g., marked) as a default S-NSSAI (e.g., k=8, 16, etc.). The wireless device 100, 200 may subscribe to more than 8 S-NSSAIs, or up to or more than any other quantity of S-NSSAIs.

A wireless device 100, 200 may be configured, by the HPLMN, with a configured NSSAI per PLMN. The wireless device 100, 200 may obtain, from the AMF 155, an allowed NSSAI for a PLMN (which may include one or more S-NSSAIs), for example, based on or after successful completion of a wireless device's registration procedure.

The allowed NSSAI may take precedence over the configured NSSAI, for example, for a PLMN. The wireless device 100, 200 may use the S-NSSAIs in the allowed NSSAI corresponding to a network slice for the subsequent network slice selection related procedures in the serving PLMN. The establishment of user plane connectivity to a data network via a network slice instance(s) may comprise: performing an RM procedure to select an AMF 155, 255 that supports the required network slices, establishing one or more PDU sessions to the required data network via the network slice instance(s), and/or the like.

The wireless device 100, 200 may provide a requested NSSAI to the network in the RRC and NAS layer. The requested NSAAI may comprise the S-NSSAI(s) corresponding to the slice(s) to which the wireless device 100, 200 attempts to register, a temporary user ID if one was assigned to the wireless device 100, 200 and/or the like. The wireless device 100, 200 may provide the requested NSSA, for example, if the wireless device 100, 200 registers with a PLMN, and/or if the wireless device 100, 200 for the PLMN has a configured NSSAI or an allowed NSSAI. The requested NSSAI may be a configured-NSSAI, an allowed-NSSAI, and/or the like. The RAN 105, 205 may route NAS signaling to and/or from the wireless device 100, 200 to and/or from a default AMF 155, 255. The RAN 105, 205 may route NAS signaling to and/or from the wireless device 100, 200 to and/or from a default AMF 155, 255, for example, if a wireless device 100, 200 registers with a PLMN and does not have a configured NSSAI or allowed NSSAI for the PLMN.

The network may change the set of permitted network slice(s) to which the wireless device 100, 200 is registered. The network may change the set of permitted network slice(s) to which the wireless device 100, 200 is registered, for example, based on local policies, subscription changes, and/or wireless device 100, 200 mobility. The network may change the set of permitted network slice(s) for a registration procedure. The network may trigger a notification to be sent to the wireless device 100, notifying the wireless device 100 of the change of the supported network slices using an RM procedure (which may trigger a registration procedure). The network may provide the wireless device 100 with a new allowed NSSAI and tracking area list.

For a registration procedure in a PLMN, the AMF 155, 255 that first receives the registration request may redirect the registration request to another AMF 155, 255 via the RAN 105, 205 and/or via direct signaling between the initial AMF 155, 255 and the target AMF 155, 255. The AMF 155, 255 that first receives the registration request may redirect the registration request to another AMF 155, 255 via the RAN 105, 205 and/or via direct signaling between the initial AMF 155, 255 and the target AMF 155, 255, for example, if the network decides that the wireless device 100, 200 should be served by a different AMF 155, 255, for example, based on network slice(s) aspects. The network operator may provision the wireless device 100 with an NSSP. The NSSP may comprise one or more NSSP rules.

The wireless device 100, 200 may route the user data of the application in one or more of the PDU sessions. The wireless device 100, 200 may route the user data of the application in one or more of the PDU sessions, for example, if a wireless device 100, 200 has one or more established PDU sessions corresponding to a specific S-NSSAI, unless other conditions in the wireless device 100, 200 prohibit the use of the PDU sessions. The wireless device 100, 200 may consider the DNN to determine which PDU session to use if the application provides a DNN. The wireless device 100, 200 may request a new PDU session corresponding to the S-NSSAI. The wireless device 100, 200 may request a new PDU session corresponding to the S-NSSAI, for example, with the DNN that may be provided by the application, if the wireless device 100, 200 does not have a PDU session established with the specific S-NSSAI. The RAN 105, 205 may be aware of the network slices used by the wireless 100, 200 in order for the RAN 105, 205 to select a proper resource for supporting network slicing in the RAN 105, 205.

An AMF 155, 255 may select an SMF 160, 260 in a network slice instance, for example, based on the S-NSSAI, DNN, and/or other information (e.g., wireless device 100, 200 subscription and local operator policies, and/or the like). An AMF 155, 255 may select an SMF 160, 260 in a network slice instance based on the S-NSSAI, DNN, and/or other information, for example, if the wireless device 100, 200 triggers the establishment of a PDU session. The selected SMF 160, 260 may establish the PDU session based on the S-NSSAI and DNN.

The wireless device 100, 200 may or may not include the NSSAI in NAS signaling. The wireless device 100, 200 may not include the NSSAI in NAS signaling, for example, in order to support network-controlled privacy of slice information for the slices that the wireless device 100, 200 may access. The wireless device 100, 200 may not include the NSSAI in NAS signaling, for example, unless the wireless device 100, 200 has a NAS security context. The wireless device 100, 200 may not include NSSAI, for example, in unprotected RRC signaling. The wireless device 100, 200 may not include NSSAI, for example, if the wireless device 100, 200 is aware of or configured such that privacy considerations are used for the NSSAI.

Network slice specific network functions in VPLMN and HPLMN may be selected, for example, for a wireless device that may be roaming. The network slice specific network functions in VPLMN and HPLMN may be selected, for example, based on the S-NSSAI provided by the wireless device 100, 200 PDU connection establishment. Selection of slice specific NF instances may be performed by each PLMN or by one or more PLMNs. Selection of slice specific NF instances may be performed by a PLMN, for example, if a standardized S-NSSAI is used. Selection of slice specific NF instances may be performed by a PLMN, for example, based on the provided S-NSSAI. The VPLMN may map the S-NSSAI of HPLMN to a S-NSSAI of VPLMN, for example, based on a roaming agreement (e.g., including mapping to a default S-NSSAI of VPLMN). The selection of slice specific NF instance in a VPLMN may be, for example, based on the S-NSSAI of VPLMN. The selection of any slice specific NF instance in HPLMN may be, for example, based on the S-NSSAI of an HPLMN.

Figure 8:
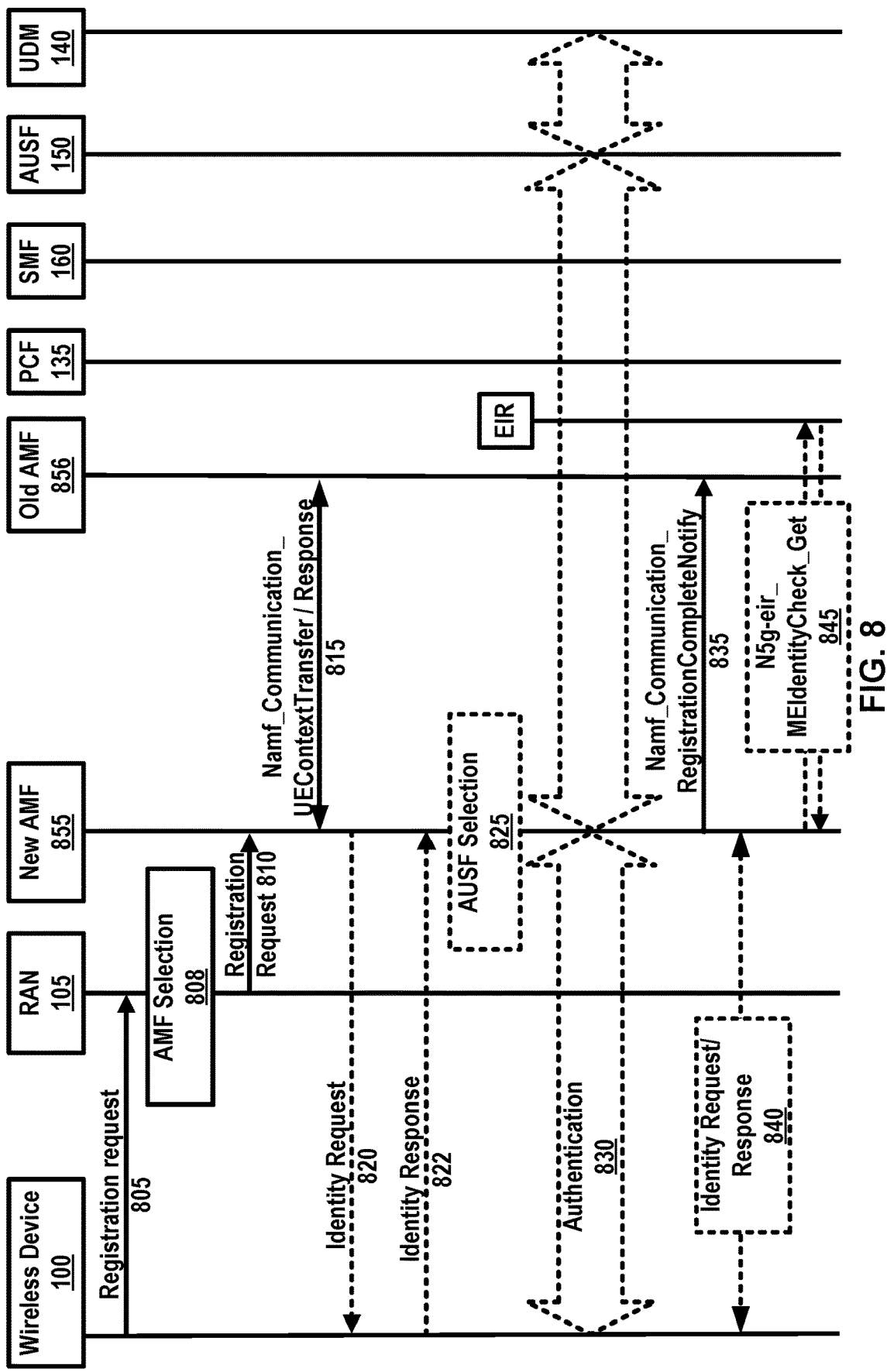
FIG. 8 shows examples of registration procedures.
Figure 9:
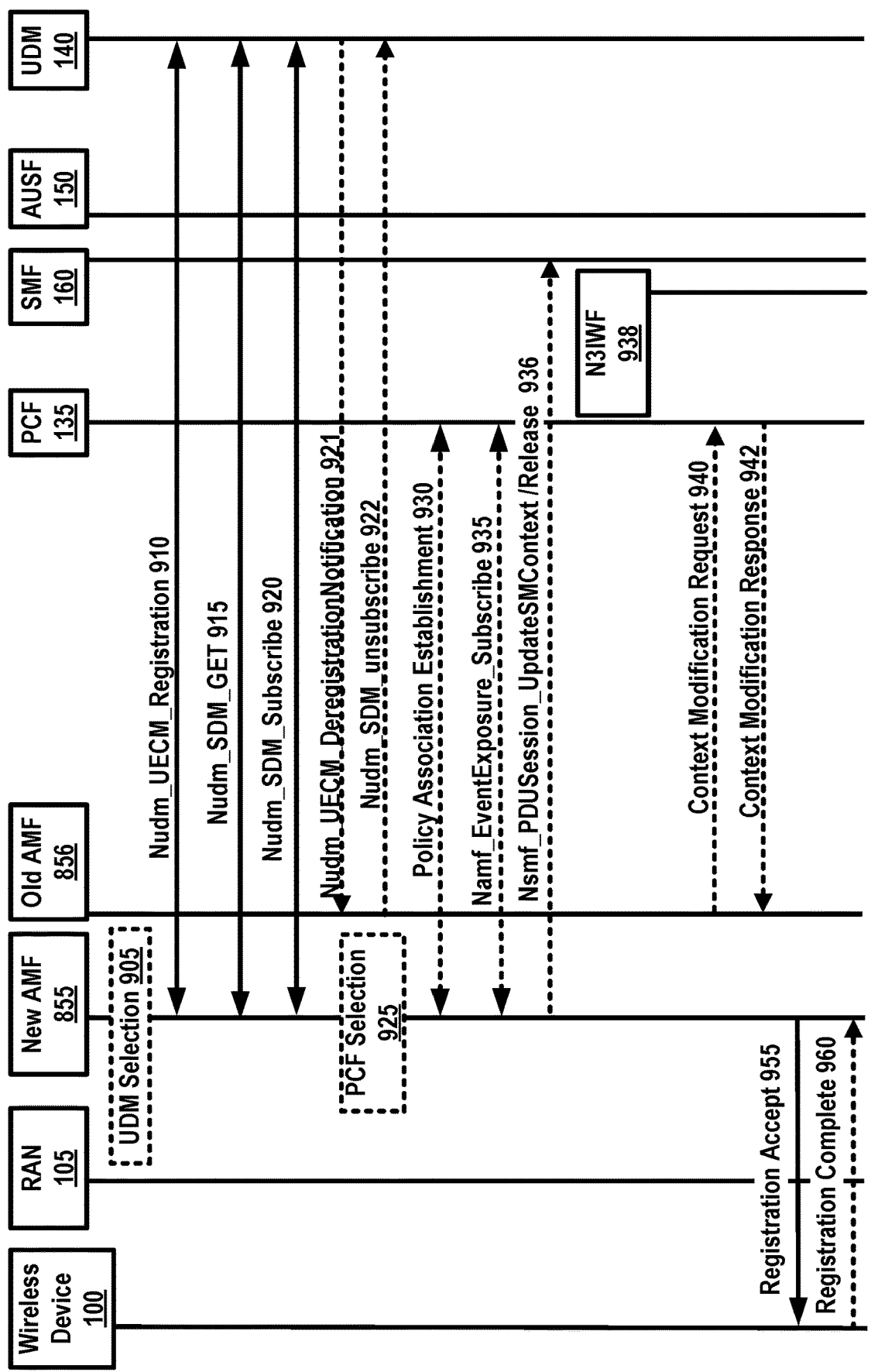
FIG. 9 shows a continuation of the example call flow for an initial registration procedure.

FIG. 8 and FIG. 9 show an example call flow for an initial registration procedure. The initial registration procedure may involve execution of network access control functions (e.g., user authentication and access authorization, which may be based on subscription profiles in UDM 140, 240). The identity of the serving AMF 155, 255 may be registered in a UDM 140, 240, for example, based on or as a result of the initial registration procedure. The RM procedures may be applicable for both a 3GPP access RAN 105, 205 and a non-3GPP access RAN 265.

As shown in FIG. 8 and FIG. 9, a registration procedure may be performed by the wireless device 100, 200. The registration procedure may be performed by the wireless device 100, 200, for example, to become authorized to receive services, to enable mobility tracking, to enable reachability, and/or the like. The wireless device 100, 200 may send a registration request message 805 to the RAN 105 (or 205). The registration request message 805 may comprise, for example, AN parameters and/or an RM-NAS registration request (e.g., registration type, SUCI or SUPI or GUTI (e.g., 5G-GUTI), last visited TAI (if available), security parameters, requested NSSAI, mapping of requested NSSAI, wireless device 5GC capability, PDU session status, PDU session(s) to be re-activated, follow on request, MICO mode preference, and/or the like), and/or the like. The AN parameters may include, for example, SUCI, SUPI, the GUTI (e.g., 5G-GUTI), the selected PLMN ID and requested NSSAI, and/or the like (e.g., for the RAN). The AN parameters may comprise an establishment cause. The establishment cause may provide a reason for requesting an establishment of an RRC connection. The registration type may indicate, for example, whether the wireless device 100 determines and/or requests to perform an initial registration (e.g., if the wireless device 100, 200 is in the RM-DEREGISTERED state), a mobility registration update (e.g., if the wireless device 100, 200 is in the RM-REGISTERED state and initiates a registration procedure, such as due to mobility), a periodic registration update (e.g., if the wireless device 100, 200 is in the RM-REGISTERED state and may initiate a registration procedure, such as due to the periodic registration update timer expiry) or an emergency registration (e.g., if the wireless device 100, 200 is in a limited service state).

The wireless device 100, 200 may include its SUCI or SUPI in the registration request. The wireless device 100, 200 may include its SUCI or SUPI in the registration request, for example, if the wireless device 100, 200 is performing an initial registration (e.g., if the wireless device 100 is in the RM-DEREGISTERED state) to a PLMN for which the wireless device 100, 200 does not already have a GUTI (e.g., 5G-GUTI). The SUCI may be included in the registration request, for example, if the home network has provisioned the public key to protect SUPI in the wireless device 100, 200. The wireless device 100, 200 may perform an initial registration. The wireless device 100, 200 may include the SUPI in a registration request message. The wireless device 100, 200 may include the SUPI in the registration request message, for example, if the wireless device 100, 200 receives a wireless device configuration update command indicating that the wireless device 100, 200 may be required to re-register and/or that the 5G-GUTI is invalid.

The SUPI may be included the registration request message, for example, for an emergency registration. The SUPI may be included for an emergency registration, for example, if the wireless device 100, 200 does not have a valid GUTI (e.g., 5G-GUTI) available. The PEI may be included for an emergency request, for example, if the wireless device 100, 20 has no SUPI and no valid GUTI (e.g., 5G-GUTI). The GUTI (e.g., 5G-GUTI) may be included and may indicate the old (e.g., last serving) AMF 856. The wireless device 100, 200 may not provide the GUTI (e.g., 5G-GUTI) allocated by the AMF 155, 255 over the 3GPP access, for example, during the registration procedure over the non-3GPP access. The wireless device 100, 200 may not provide the GUTI allocated by the AMF 155, 255, for example, if the wireless device 100 is already registered via a non-3GPP access in a PLMN different from the new PLMN (e.g., not the registered PLMN or a PLMN equivalent to the registered PLMN) of the 3GPP access. The wireless device 100, 200 may not provide access to the GUTI (e.g., 5G-GUTI) allocated by the AMF 155 over the non-3GPP during the registration procedure over the 3GPP access. The wireless device 100 may not provide access to the GUTI, for example, if the wireless device 100 is already registered via a 3GPP access in a PLMN (e.g., the registered PLMN) different from the new PLMN (e.g., not the registered PLMN or a PLMN equivalent to the registered PLMN) of the non-3GPP access. The wireless device 100, 200 may provide the wireless device's 100, 200 usage setting. The wireless device 100, 200 may provide the wireless device's 100, 200 usage setting, for example, based on its configuration.

The wireless device 100, 200 may include the mapping of requested NSSAI for initial registration or mobility registration updates. The mapping of requested NSSAI, for example, may comprise the mapping of each S-NSSAI of the requested NSSAI to the S-NSSAIs of the configured NSSAI for the HPLMN. The wireless device 100, 200 may include the mapping of requested NSSAI, for example, to ensure that the network is able to verify whether the S-NSSAI(s) in the requested NSSAI are permitted (e.g., based on the subscribed S-NSSAIs). The last visited TAI may be included in the mapping of requested NSSAI. The last visited TAI may be included in the mapping of requested NSSAI, for example, to help the AMF 155, 255 produce a registration area for the wireless device. Security parameters may be used for authentication and integrity protection. A requested NSSAI may indicate the network slice selection assistance information. The PDU session status may indicate the previously established PDU sessions in the wireless device 100, 200. The PDU session status may indicate the established PDU session of the current PLMN in the wireless device 100, 200. The PDU session status may indicate the established PDU session of the current PLMN in the wireless device 100, 200, for example, if the wireless device 100, 200 is connected to two AMF 155, 255 belonging to different PLMNs (e.g., via 3GPP access and via non-3GPP access). The PDU session(s) to be re-activated may be included, for example, to indicate the PDU session(s) for which the wireless device 100, 200 may intend to activate UP connections. A PDU session corresponding to an LADN may not be included in the PDU session(s) to be re-activated. The PDU session corresponding to a LADN may not be included in the PDU session(s) to be re-activated, for example, if the wireless device 100, 200 is outside the area of availability of the LADN. The follow-on request may be included, for example, if the wireless device 100, 200 has a pending uplink signaling that the wireless device 100, 200 does not include PDU session(s) to be re-activated, or if the registration type indicates the wireless device 100, 200 may want to perform an emergency registration.

The RAN 105, 205 may perform AMF selection 808. The RAN 105, 205 may perform AMF selection 808, for example, based on RAT and a requested NSSAI (e.g., if available). The RAN 105, 205 may perform AMF selection 808, for example, if an SUPI is included or if the GUTI (e.g., 5G-GUTI) does not indicate a valid AMF 155, 255. The RAN 105, 205 may forward the registration request message 810 to a new AMF 855. The RAN 105, 205 may forward the registration request message 810 to a new AMF 855, for example, on the N2 connection of the wireless device 100, 200 if the wireless device 100, 200 is in the CM-CONNECTED state. The RAN 105, 205 may forward the registration request 810 to the new AMF 855, which may have been configured to perform AMF selection 808. The RAN 105, 205 may forward the registration request 810 to the new AMF 855, for example, if the RAN 105, 205 does not select an appropriate new AMF 855.

The RAN 105, 205 may send an N2 registration request message 810 to the new AMF 855. The N2 registration request message 810, may comprise, for example, N2 parameters, RM-NAS registration request (e.g., registration type, SUPI or 5G-GUTI, last visited TAI (if available), security parameters, requested NSSAI, mapping of requested NSSAI, wireless device 5GC capability, PDU session status, PDU session(s) to be re-activated, follow on request, and MICO mode preference), and/or the like. The N2 parameters may comprise the selected PLMN ID, location information, cell identity, and the RAT type related to the cell in which the wireless device 100, 200 is communicating (e.g., camping on) for example, if the RAN 105, 205 is used. The N2 parameters may comprise the establishment cause. The N2 parameters may comprise the establishment cause, for example, if the RAN 105, 205 is used.

A new AMF 855 may send, to the old AMF 856, complete registration request (e.g., an Namf_Communication_UEContextTransfer) 815. The new AMF 855 may invoke an operation (e.g., the Namf_Communication_UEContextTransfer 815 service operation) on the old AMF 856. The new AMF 855 may invoke an operation (e.g., the Namf_Communication_UEContextTransfer 815 service operation) on the old AMF 856 (which may include the complete registration request IE), for example, if the wireless device's GUTI (e.g., 5G-GUTI) is included in the registration request and the serving AMF 155, 255 has changed since last registration procedure. The complete registration request IE may be integrity protected. The new AMF 855 may invoke the operation (e.g., the Namf_Communication_UEContextTransfer 815 service operation) on the old AMF 856, for example, to request the wireless device's 100 SUPI and MM Context. The old AMF 856 may use the integrity protected complete registration request IE, for example, to verify whether the context transfer service operation invocation corresponds to the wireless device 100, 200 requested. The old AMF 856 may transfer the event subscriptions information by each NF consumer, for the wireless device 100, 200, to the new AMF 855. The SUPI request may or may not be skipped. The SUPI request may be skipped, for example, if the wireless device 100, 200 indicates (e.g., identifies) itself with PEI.

The old AMF 856 may send, to the new AMF 855, a response 815 to the transfer message (e.g., Namf_Communication_UEContextTransfer). The response 815 may comprise, for example, SUPI, MM context, SMF 160 information, and/or a PCF ID). The old AMF 856 may respond, to the new AMF 855, based on an operation (e.g., Namf_Communication_UEContextTransfer invocation). The old AMF 856 may respond to the new AMF 855, for example, by including the wireless device's SUPI and/or MM context. The old AMF 856 may include SMF 160, 260 information which may comprise, for example, S-NSSAI(s), SMF 160, 260 identities, and/or a PDU session ID (e.g., if the old AMF 856 has information about established PDU sessions). The old AMF 856 may have information about the NGAP wireless device-TNLA bindings. The old AMF 856 may include information about the NGAP wireless device-TNLA bindings in one or more messages, for example, if the old AMF 856 has information about active NGAP wireless device-TNLA bindings to the N3IWF 270.

The identity request procedure 820 may be initiated, for example, by the new AMF 855 sending an identity request message 820 to the wireless device 100, 200 from the SUCI. The identity request message 820 may be initiated, for example, if the SUPI has not been provided by the wireless device 100, 200 and/or if the SUPI has not been retrieved from the old AMF 856. The wireless device 100, 200 may respond, to the identity request message 820 (e.g., identity request procedure), with an identity response message 822. The identity response message 822 may include the SUCI. The wireless device 100, 200 may determine (e.g., derive) the SUCI, for example, by using the provisioned public key of the HPLMN.

The new AMF 855 may determine to initiate an AUSF selection 825. The AUSF selection 825 may be to initiate the wireless device authentication 830 (e.g., wireless device security). The new AMF 855 may initiate the AUSF selection 825, for example, by invoking an AUSF 150, 250. The new AMF 855 may select an AUSF 150, 250, for example, based on the SUPI and/or the SUCI. The new AMF 855 may perform or skip the authentication 830 and/or the security setup. The new AMF 855 may accept that the authentication 830 may fail and continue the registration procedure. The new AMF 855 may accept that the authentication 830 may fail and continue the registration procedure, for example, if the new AMF 855 is configured to support emergency registration for unauthenticated SUPIs. The new AMF 855 may accept that the authentication 830 may fail and continue the registration procedure, for example, if the wireless device 100, 200 indicates that the registration type is an emergency registration.

The authentication 830 may be performed by the Nudm_UEAuthenticate_Get operation. The AUSF 150 may discover a UDM 140, 240. The AUSF 150 may return the SUPI to the new AMF 855, for example, after the authentication 830 is successful. The AUSF 150, 250 may return the SUPI to the new AMF 855 after the authentication 830 is successful, for example, if the new AMF 855 provides a SUCI to AUSF 150, 250. The new AMF 855 may determine whether the registration request must/should be rerouted (e.g., rerouted from the AMF 155 operating as an initial AMF), for example, if network slicing is used. The new AMF 855 may initiate NAS security functions. The new AMF 855 may initiate an NGAP procedure. The initiation may, for example, enable an AN (e.g., 5G-AN) to use the NGAP procedure for securing procedures with the wireless device 100 upon completion of a NAS security function setup. The AN (e.g., 5G-AN) may store the security context. The AN may acknowledge completion of the NAS security function setup to the AMF 155, 255. The AN (e.g., 5G-AN) may use the security context, for example, to protect the messages exchanged with the wireless device 100, 200.

A new AMF 855 may send Namf_Communication_RegistrationCompleteNotify 835 to the old AMF 856. The new AMF 855 may notify the old AMF 856 that the registration of the wireless device 100, 200 in the new AMF 855 is completed. The new AMF 855 may notify the old AMF 856 that the registration of the wireless device 100, 200 in the new AMF 855 is completed (e.g., if the new AMF 855 has changed) by invoking the Namf_Communication_RegistrationCompleteNotify service operation. The registration may be rejected. The new AMF 855 may invoke the Namf_Communication_RegistrationCompleteNotify 835 service operation, for example, if the registration is rejected. The new AMF 855 may send a reject indication reason code to the old AMF 856. The old AMF 856 may continue as if the wireless device context transfer service operation was never received. The old AMF 856 may continue as if the wireless device context transfer service operation was never received, for example, if the authentication/security procedure fails. The new AMF 855 may determine which (if any) of one or more PDU sessions may not be supported in the new registration area. The new AMF 855 may determine which (if any) of one or more PDU sessions may not be supported in the new registration area, for example, if one or more of the S-NSSAIs used in the old registration area are not served in the target registration area. The new AMF 855 may invoke the Namf_Communication_RegistrationCompleteNotify 835 service operation, which may include the rejected PDU session ID and/or a reject cause (e.g., the S-NSSAI becomes no longer available) in one or more messages to the old AMF 856. The new AMF 855 may modify the PDU session status. The old AMF 856 may inform one or more SMFs (e.g., the corresponding SMF 160) to locally release the wireless device's SM context, for example, by invoking the Nsmf_PDUSession_ReleaseSMContext service operation.

The new AMF 855 may send an identity request/response 840 (e.g., PEI) to the wireless device 100, 200. An identity request procedure may be initiated by the new AMF 855. The identity request procedure may be initiated by the new AMF 855, for example, by sending an identity request message 840 to the wireless device 100 to retrieve the PEI (e.g., if the PEI was not provided by the wireless device 100, 200 and/or if the PEI was not retrieved from the old AMF 856). The PEI may be encrypted for transfer, unless, for example, the wireless device 100, 200 performs emergency registration and is not authenticated. The wireless device 100, 200 may include the PEI in the registration request for an emergency registration. The new AMF 855 may initiate ME identity check. The new AMF 855 may initiate ME identity check, for example, by invoking an N5g-eir_EquipmentIdentityCheck_Get service operation 845 (e.g., with an Equipment Identity Register (EIR)).

As shown in FIG. 9, the new AMF 855 (e.g., based on the SUPI) may perform UDM selection 905 to select a UDM 140, 240. The UDM 140, 240 may select a UDR instance. The new AMF 855 may register with the UDM 140, 240. The new AMF 855 may register with the UDM 140, for example, by using a Nudm_UECM_Registration 910. The new AMF 855 may subscribe to be notified if the UDM 140, 240 deregisters the AMF 155, 255, if the AMF 155, 255 has changed since the last registration procedure, if the wireless device 100, 200 provides a SUPI which may not refer to a valid context in the AMF 155, 255, and/or if the wireless device 100, 200 registers to the same AMF 155, 255 that it has already registered to a non-3GPP access (e.g., the wireless device 100, 200 is registered over a non-3GPP access and may initiate the registration procedure to add a 3GPP access).

The UDM 140, 240 may store the AMF 155, 255 identity associated with a first access type and may not remove the AMF 155, 255 identity associated with one or more second access types. The UDM 140, 240 may store information provided at registration in UDR with Nudr_UDM_Update. The AMF 155, 255 may retrieve the access and mobility subscription data and SMF 160, 260 selection subscription data, for example, by using Nudm_SDM_Get 915. The UDM 140, 240 may retrieve the access and mobility subscription data and SMF 160, 260 selection subscription data information from UDR, for example, with Nudr_UDM_Query. The AMF 155, 255 may subscribe to be notified based on a successful response and/or after a successful response is received. The AMF 155, 255 may subscribe to be notified based on a successful response and/or after a successful response is received, for example, if the data requested is modified using Nudm_SDM_Subscribe 920. The UDM 140, 240 may subscribe to UDR, for example, by using Nudr_UDM_Subscribe 920. The GPSI may be provided to the new AMF 855 in the subscription data from the UDM 140, 240. The GPSI may be provided in the subscription data from the UDM 140, 240, for example, if the GPSI is available in the wireless device 100, 200 subscription data. The new AMF 855 may provide the access type it serves for the wireless device 100 to the UDM 140. The access type may, for example, be set to 3GPP access. The UDM 140 may store the associated access type together with the serving AMF 155 in UDR, for example, with Nudr_UDM_Update. The new AMF 855 may create an MM context for the wireless device 100, 200. The new AMF 855 may create an MM context for the wireless device 100, 200, for example, in response to getting the mobility subscription data from the UDM 140, 240. The UDM 140, 240 may initiate Nudm_UECM_DeregistrationNotification 921 to the old AMF 856, corresponding to 3GPP, access. The UDM 140, 240 may initiate Nudm_UECM_DeregistrationNotification 921, for example, if the UDM 140, 240 stores the associated access type together with the serving AMF 155, 255. The old AMF 856 may remove the MM context of the wireless device 100, 200. The old AMF 856 may invoke a Namf_EventExposure_Notify service operation, for example, by sending one or more messages to the associated SMFs 160, 260 of the wireless device 100, 200. The old AMF 856 may invoke the service operation, for example, to notify the associated SMFs 160, 260 that the wireless device 100, 200 is deregistered from the old AMF 856. The SMF 160, 260 may release the PDU session(s). The SMF 160, 260 may release the PDU session(s), for example, based on the notification, if the serving NF removal reason indicated by the UDM 140, 240 is initial registration. The old AMF 856 may unsubscribe with the UDM 140, 240 for subscription data, for example, by using Nudm_SDM_unsubscribe 922.

The new AMF 855 may select 925 a PCF 135, 235. The new AMF 855 may select 925 a PCF 135, 235, for example, if the AMF 155, 255 determines to initiate PCF 135, 235 communication (e.g., the new AMF 855 has not yet obtained access and mobility policy for the wireless device 100, 200 and/or if the access and mobility policy in the new AMF 855 is no longer valid). The new AMF 855 may select the (V-)PCF identified by the PCF ID. The new AMF 855 may select the (V-)PCF identified by the PCF ID, for example, if the new AMF 855 receives a PCF ID from the old AMF 856 and successfully contacts the PCF 135, 235 indicated (e.g., identified) by the PCF ID. The new AMF 855 may select 925 a PCF 135, 235. The new AMF 855 may select 925 a PCF 135, 235, for example, if the PCF 135, 235 indicated (e.g., identified) by the PCF ID is not used (e.g., no response from the PCF 135 is received) and/or if there is no PCF ID received from the old AMF 856.

The new AMF 855 may perform a policy association establishment 930. The new AMF 855 may perform the policy association establishment 930, for example, during registration procedure. The new AMF 855 may include the PCF-ID in a Npcf_AMPolicyControl Get operation for the policy association establishment 930. The new AMF 855 may include the PCF-ID in the Npcf_AMPolicyControl Get operation, for example, if the new AMF 855 communicates with or contacts the PCF 135, 235 indicated (e.g., identified) by the (V-)PCF ID received, for example, during inter-AMF mobility. The PCF 135, 235 may provide the updated mobility restrictions to the new AMF 855. The PCF 135, 235 may provide the updated mobility restrictions to the new AMF 855, for example, if the AMF 155, 255 notifies the mobility restrictions (e.g., wireless device 100, 200 location) to the PCF 135, 235 for adjustment, or if the PCF 135, 235 updates the mobility restrictions itself due to some conditions (e.g., application in use, time and date). The PCF 135, 235 may invoke Namf_EventExposure_Subscribe 935 service operation for the wireless device 100, 200 event subscription.

The new AMF 855 may send, to the SMF 160, 260 an Nsmf_PDUSession_UpdateSMContext 936. The new AMF 855 may invoke the Nsmf_PDUSession_UpdateSMContext 936. The new AMF 855 may invoke the Nsmf_PDUSession_UpdateSMContext 936, for example, if the PDU session(s) to be re-activated is included in the registration request. The new AMF 855 may send the Nsmf_PDUSession_UpdateSMContext 936 request to the SMF(s) 160 associated with the PDU session(s). The new AMF 855 may send the Nsmf_PDUSession_UpdateSMContext 936 request, for example, to activate user plane connections of the PDU session(s). The SMF 160, 260 may decide to trigger (e.g., the intermediate UPF 110, 210 insertion) removal or change of PSA. The procedure may be performed without N11 and N2 interactions. The procedure may be performed without N11 and N2 interactions, for example, to update the N3 user plane between the RAN 105, 205 and the CN (e.g., 5GC) if the intermediate UPF 110, 210 insertion, removal, and/or relocation is performed for the PDU session(s) that is/are not included in PDU session(s) to be re-activated. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, if any PDU session status indicates that it is released at the wireless device 100, 200. The new AMF 855 may invoke the Nsmf_PDUSession_ReleaseSMContext 936 service operation towards the SMF 160, 260 (e.g., by sending one or more messages to the SMF 16, 260). The new AMF 855 may invoke the Nsmf_PDUSession_ReleaseSMContext 936 service operation, for example, in order to release any network resources related to the PDU session.

The new AMF 855 may send a wireless device Context Modification Request 940 to a N3IWF 938. The new AMF 855 may create an NGAP wireless device association, towards the N3IWF 938 to which the wireless device 100, 200 is connected (e.g., by sending one or more messages to the N3IWF 938). The new AMF 855 may create the NGAP wireless device association, for example, if the AMF 155, 255 has changed. The N3IWF 938 may respond to the new AMF 855, for example, with a wireless device Context Modification Response 942.

The new AMF 855 may send, to the wireless device 100, 200, a registration accept message 955. The registration accept message 955 may comprise, for example, GUTI (e.g., 5G-GUTI), registration area, mobility restrictions, PDU session status, allowed NSSAI (or mapping of allowed NSSAI), periodic registration update timer, LADN information and accepted MICO mode, IMS voice over PS session supported indication, emergency service support indicator, and/or the like. The new AMF 855 may send the registration accept message 955, for example, to the wireless device 100, 200. The registration accept message 955 may, for example, indicate that the registration request has been accepted. The registration accept message 955 may include GUTI (e.g., 5G-GUTI), for example, if the new AMF 855 allocates a new GUTI (e.g., 5G-GUTI). The new AMF 855 may send the registration area to the wireless device 100, 200. The new AMF 855 may send the registration area, for example, via a registration accept message 955 if, for example, the new AMF 855 allocates a new registration area. The wireless device 100, 200 may determine that the old registration area is valid or consider the old registration area to be valid. The wireless device 100, 200 may determine that the old registration area is valid (or consider the old registration area to be valid), for example, if there is no registration area included in the registration accept message. Mobility restrictions may be included in the registration accept message 955. Mobility restrictions may be included in the registration accept message 955, for example if mobility restrictions are used for the wireless device 100, 200 and if the registration type is not an emergency registration.

The new AMF 855 may indicate the established PDU sessions to the wireless device 100, 200, for example, in the PDU session status. The wireless device 100, 200 may locally remove internal resources related to PDU sessions. The wireless device 100, 200 may locally remove internal resources related to PDU sessions, for example, that are not marked as established in the received PDU session status. The wireless device 100, 200 may locally remove internal resources related to the PDU session of the current PLMN that are not marked as established in received PDU session status. The wireless device 100, 200 may locally remove internal resources related to the PDU session of the current PLMN that are not marked as established in received PDU session status, for example, if the wireless device 100, 200 is connected to the two AMFs 155, 255 belonging to different PLMN via 3GPP access and non-3GPP access. The new AMF 855 may indicate the PDU session status to the wireless device 100, 200. The new AMF 855 may indicate the PDU session status to the wireless device 100, 200, for example, if the PDU session status information is in the registration request. The mapping of the allowed NSSAI may be, for example, the mapping of each S-NSSAI of the allowed NSSAI to the S-NSSAIs of the configured NSSAI for the HPLMN. The new AMF 855 may include, in the registration accept message 955, the LADN information for LADNs that are or may be available within the registration area determined by the new AMF 855 for the wireless device 100, 200. The new AMF 855 may indicate whether MICO mode may be used. The new AMF 855 may indicate whether MICO mode may be used, for example, if the wireless device 100, 200 includes MICO mode in the request. The new AMF 855 may set the IMS voice over PS session supported indication. The new AMF 855 may perform a wireless device/RAN radio information and compatibility request procedure. The new AMF 855 may perform a wireless device/RAN radio information and compatibility request procedure, for example, to check the compatibility of the wireless device 100, 200 and RAN radio capabilities related to IMS voice over PS to set the IMS voice over PS session supported indication. The emergency service support indicator may inform the wireless device 100, 200 that emergency services are supported (e.g., the wireless device 100, 200 may request PDU session for emergency services.) The handover restriction list and wireless device-AMBR may be provided, to RAN 105, 205, by the new AMF 855.

The wireless device 100, 200 may send a registration complete message 960 to the new AMF 855. The wireless device 100, 200 may send the registration complete message 960 to the new AMF 855, for example, to acknowledge that a new GUTI (e.g., 5G-GUTI) has been assigned. The new AMF 855 may release the signaling connection with the wireless device 100, 200. The new AMF 855 may release the signaling connection with the wireless device 100, 200, for example, if information about the PDU session(s) to be re-activated is not included in the registration request. The new AMF 855 may not release the signaling connection after the completion of the registration procedure. The new AMF 855 may not release the signaling connection after the completion of the registration procedure, for example, if the follow-on request is included in the registration request. The new AMF 855 may not release the signaling connection after the completion of the registration procedure, for example, if the new AMF 855 is aware that some signaling is pending in the new AMF 855 or between the wireless device 100, 200 and the CN (e.g., 5GC).

Figure 10:
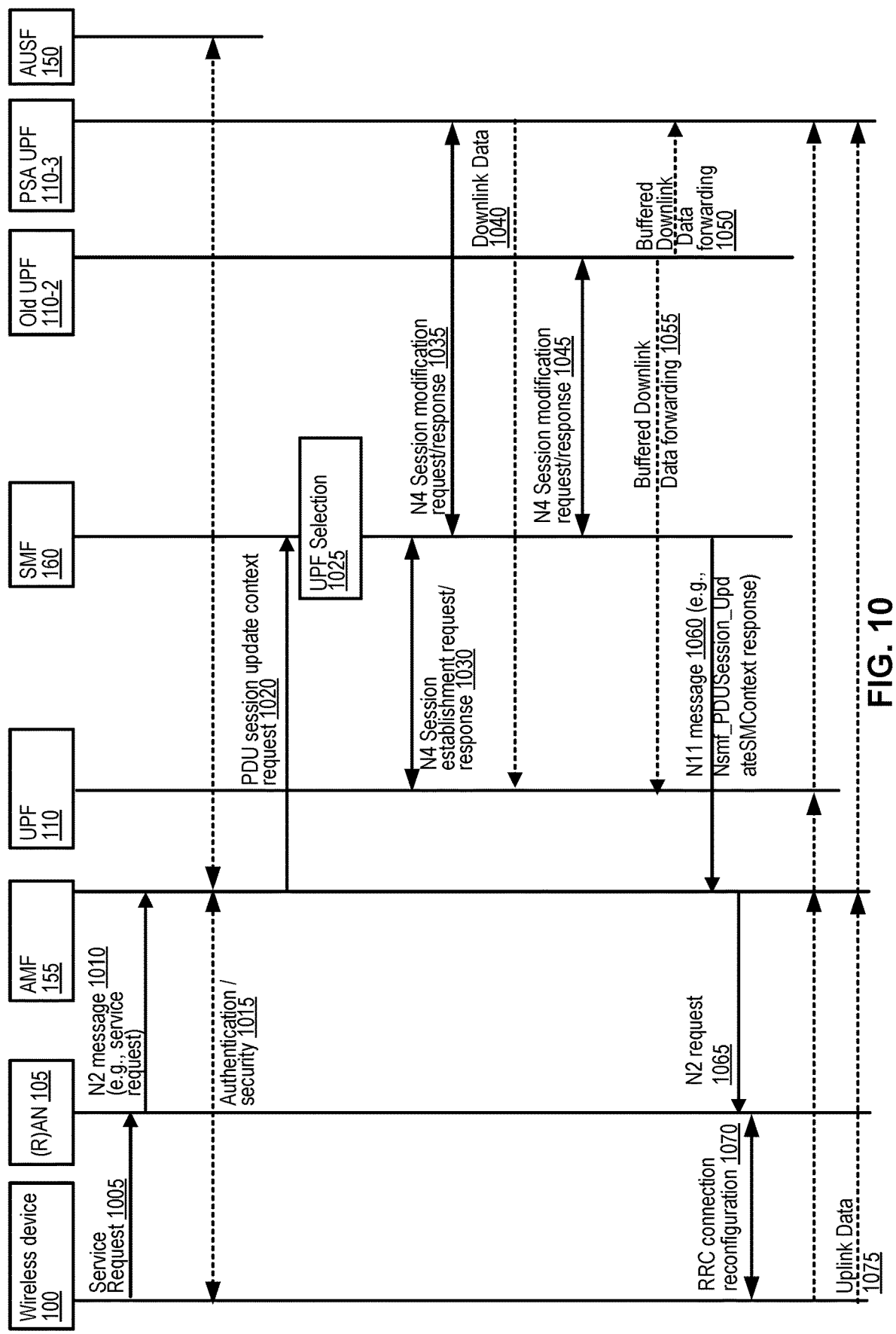
FIG. 10 shows an example service request procedure.
Figure 11:
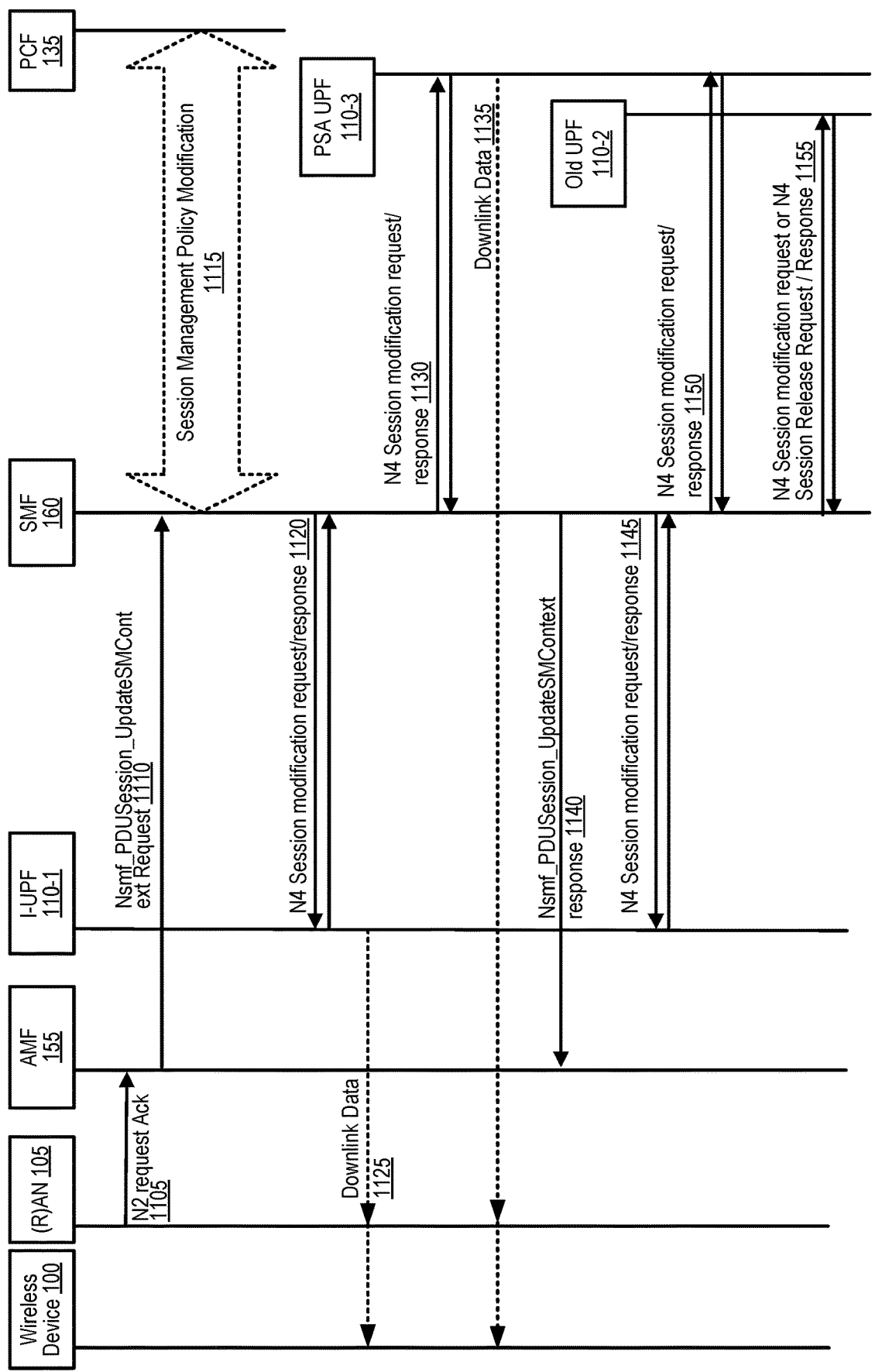
FIG. 11 shows an example service request procedure.

FIG. 10 and FIG. 11 show an example service request procedure. The example service request procedure may be a wireless device-triggered service request procedure. The service request procedure may be used by a wireless device (e.g., the wireless device 100, 200) in CM-IDLE state to request the establishment of a secure connection to an AMF 155, 255. FIG. 11 may be a continuation of FIG. 10. For example, the procedure of FIG. 11 may follow the procedure of FIG. 10. The service request procedure may be used to activate a user plane connection for an established PDU session. The service request procedure may be triggered by the wireless device 100, 200 and/or the CN (e.g., 5GC). The service request procedure may be used, for example, if the wireless device 100, 200 is in CM-IDLE state and/or in CM-CONNECTED state. The service request procedure may allow selective activation of user plane connections for some of the established PDU sessions.

The wireless device 100, 200 in CM IDLE state may initiate the service request procedure to send uplink signaling messages, user data, etc. The wireless device 100, 200 may initiate the service request procedure based on (e.g., in response to) a network paging request, and/or other messages/triggers. The AMF 155, 255 may perform authentication, for example, based on receiving a service request message (e.g., from the wireless device 100, 200). The wireless device 100, 200 or network may send signaling messages, for example, based on the establishment of signaling connection to the AMF 155, 255. For example, the wireless device 100, 200 may send, via the AMF 155, 255, a PDU session establishment message to the SMF 160, 260.

The AMF 155, 255 may respond to a service request message with a service accept message. The service accept message may be to synchronize a PDU session status between the wireless device 100, 200 and network. The AMF 155, 255 may respond to the service request message with a service reject message. The AMF 155, 255 may respond to the wireless device 100, 200 with a service reject message, for example, if the service request may not be accepted by the network. The service reject message may comprise an indication (or cause code) requesting the wireless device 100, 200 to perform a registration update procedure. A network may take further actions if user plane connection activation is not successful, for example, for a service request based on user data. With respect to FIG. 10 and FIG. 11, more than one UPF (e.g., old UPF 110-2 and PDU session anchor (PSA) UPF 110-3) may be involved in the service request procedure.

The wireless device 100, 200 may send to a (R)AN 105, 205 an AN message. The AN message may comprise AN parameters, mobility management, a service request (e.g., an MM NAS service request message) 1005, etc. The service request 1005 may comprise/indicate a list of PDU sessions to be activated, a list of allowed PDU sessions, security parameters, PDU session status, etc. The wireless device 100, 200 may provide the list of PDU sessions to be activated, for example, if the wireless device 100, 200 re-activates the PDU session(s). The list of allowed PDU sessions may be provided by the wireless device 100, 200, for example, if the service request 1005 is in response to a paging or a NAS notification. The list of allowed PDU sessions may identify the PDU sessions that may be transferred or associated to the access on which the service request 1005 is sent. The parameters may include selected PLMN ID, and an establishment cause. The establishment cause may provide the reason for requesting the establishment of an RRC connection. The wireless device 100, 200 may send a the service request 1005 to the AMF 155. The service request 1005 may be encapsulated in an RRC message to the RAN 105, 205.

The wireless device 100, 200 may identify/indicate the PDU session(s) for which the user plane connections are to be activated. The wireless device 100, 200 may identify/indicate, in the NAS service request message (e.g., the service request 1005), the PDU session(s) for which the user plane connections are to be activated, for example, if the service request procedure is triggered for user data. The wireless device 100, 200 may identify/indicate the PDU session(s) for which the user plane connections are to be activated based on the list of PDU sessions to be activated. The wireless device 100, 200 may not identify/indicate any PDU session(s), for example, if the service request procedure is triggered for signaling. The wireless device 100, 200 may identify/indicate, in the NAS service request message, the PDU session(s) for which user plane connections may be activated, for example, if the service request procedure is triggered for paging response and/or transmission of user data from the wireless device 100, 200. The wireless device 100, 200 may identify/indicate, in the NAS service request message, the PDU session(s) for which user plane connections may be activated using the list of PDU sessions to be activated.

The NAS service request message may indicate/identify, in the list of allowed PDU sessions, the list of PDU sessions associated with non-3GPP access that may be re-activated over 3GPP. The NAS service request message may indicate/identify the list of PDU sessions associated with the non-3GPP access that may be re-activated over 3GPP, for example, if the service request procedure (over 3GPP access) is triggered based on a paging indication indicating non-3GPP access. The PDU session status may indicate the PDU sessions available for the wireless device 100, 200. The wireless device 100, 200 may not trigger the service request procedure for a PDU session corresponding to an LADN, for example, if the wireless device 100, 200 is outside the area of availability of the LADN. The wireless device 100, 200 may not identify such PDU session(s) (e.g., corresponding to LADN(s) for which the wireless device 100, 200 is outside areas of availabilities) in the list of PDU sessions to be activated, for example, if the service request procedure is triggered for other reasons.

The (R)AN 105 may send, to AMF 155, 255, an N2 Message 1010 (e.g., a service request). The N2 message 1010 may comprise N2 parameters, the MM NAS service request, etc. The AMF 155, 255 may reject the N2 message, for example, if it is unable to handle the service request. The N2 parameters may comprise one or more of the GUTI (e.g., 5G-GUTI), selected PLMN indicator/ID, location information, RAT type, establishment cause, etc., for example, if NG-RAN is used. The GUTI may be determined based on an RRC procedure. The (R)AN 105, 205 may determine/select the AMF 155, 255 based on the GUTI. The location information and RAT type may relate to the cell in which the wireless device 100, 200 may be camping. The AMF 155, 255 may initiate a PDU session release procedure in the network, for example, based on the PDU session status. The AMF 155, 255 may initiate a PDU session release procedure for the PDU sessions whose PDU session indicators/ID(s) are indicated (e.g., by the wireless device 100, 200) as not available.

The AMF 155, 255 may initiate a NAS authentication/security procedure 1015. The AMF 155, 255 may initiate the NAS authentication/security procedure 1015, for example, if the service request was not sent based on integrity protection or if an integrity protection verification fails. The wireless device 100, 200 and the network may exchange NAS signaling, for example, if the wireless device 100, 200 triggers the service request procedure to establish a signaling connection and/or based on successful establishment of the signaling connection.

The AMF 155, 255 may send, to the SMF 160, 260, a PDU session update context request 1020 (e.g., Nsmf_PDUSession_UpdateSMContext request). The PDU session update context request 1020 may comprise PDU session indicators/ID(s), cause(s), wireless device 100, 200 location information, access type, etc.

The Nsmf_PDUSession_UpdateSMContext request may be invoked by the AMF 155, 255 for example, if the wireless device 100, 200 identifies/indicates PDU session(s) to be activated in the NAS service request message. The Nsmf_PDUSession_UpdateSMContext request may be triggered by the SMF 160, 260 for example, if the PDU session(s) indicated/identified by the wireless device 100, 200 correlate to other PDU sessions different from the one triggering the procedure. The Nsmf_PDUSession_UpdateSMContext request may be triggered by the SMF 160, 260 for example, if the current wireless device 100, 200 location is outside an area of validity for N2 information provided by the SMF 160, 260 (e.g., during a network triggered service request procedure). The AMF 155, 255 may not send the N2 information provided by the SMF 160, 260 for example, in (e.g., during) the network triggered service request procedure.

The AMF 155, 255 may determine the PDU session(s) to be activated. The AMF 155, 255 may send an Nsmf_PDUSession_UpdateSMContext request to SMF(s) 160, 260. The SMF(s) 160, 260 may be associated with the PDU session(s) with cause set to indicate establishment of user plane resources for the PDU session(s).

The AMF 155, 255 may notify the SMF 160, 260 that the user plane for the PDU session may not be re-activated. The AMF 155, 255 may notify the SMF 160, 260 that the user plane for the PDU session may not be re-activated, for example, if the service request procedure is triggered based on a paging indication indicating non-3GPP access, and the list of allowed PDU sessions provided by the wireless device 100, 200 not including the PDU session for which the wireless device 100, 200 was paged. The service request procedure may succeed without re-activating the user plane of any PDU sessions. The AMF 155, 255 may notify the wireless device 100, 200 that the service request procedure was successful.

The SMF 160, 260 may determine to (e.g., based on local policies) keep the PDU session, reject the activation of user plane connection for the PDU session, and inform the AMF 155, 255. The SMF 160, 260 may determine to keep the PDU session, reject the activation of user plane connection for the PDU session, and inform the AMF 155, 255, for example, if the SMF 160, 260 determines that the wireless device 100, 200 is outside an area of availability of the LADN corresponding to the PDU session indicator/ID. The SMF 160, 260 may determine that the wireless device 100, 200 is outside an area of availability of the LADN, for example, based on wireless device location reporting information from the AMF 155, 255. The SMF 160, 260 may notify the UPF 110, 210 (e.g., that originated the data notification) to discard downlink data for the PDU sessions and/or to not provide further data notification messages, for example, if the service request procedure is triggered by a network triggered service request. The SMF 160, 260 may send, to the AMF 155, 255, an indication of an appropriate reject cause and the user plane activation of PDU session may be stopped.

The SMF 160, 260 may determine to (e.g., based on local policies) release the PDU session. The SMF 160, 260 may determine to release the PDU session, for example, if the SMF 160, 260 determines that the wireless device 100, 200 is outside an area of availability of the LADN corresponding to the PDU session indicator/ID. The SMF 160, 260 may determine that the wireless device 100, 200 is outside an area of availability of the LADN, for example, based on wireless device location reporting information from the AMF 155, 255. The SMF 160, 260 may locally release the PDU session and may indicate to/inform the AMF 155, 255 that the PDU session may be released. The SMF 160, 260 may send, to the AMF 155, 255, an indication of an appropriate reject cause and the user plane activation of PDU session may be stopped.

The user plane activation of the PDU session may be accepted by the SMF 160, 260, for example, based on the location information (e.g., wireless device location reporting information) received from the AMF 155, 255. The SMF 160, 260 may check the UPF selection criteria (e.g., UPF selection procedure 1025), for example, based on the user plane activation of the PDU session being accepted by the SMF 160, 260. The UPF selection criteria may comprise one or more of slice isolation requirements; slice coexistence requirements; dynamic load of UPF 110, 210; relative static capacity among UPFs supporting the same DNN; whether location of UPF 110, 210 is available at the SMF 160, 260; wireless device 100, 200 location information; capability of the UPF 110, 210; functionality required for the particular wireless device session, etc. An appropriate UPF 110, 210 may be selected by matching the functionality and features required for the wireless device 100, 200, DNN, PDU session type (e.g., IPv4, IPv6, ethernet type, or unstructured type) and, if applicable, the static IP address/prefix, SSC mode selected for the PDU session, subscription profile of the wireless device 100, 200 in UDM 140, 240, DNAI as included in the PCC rules, local operator policies, S-NSSAI, access technology being used by the wireless device 100, 200, UPF 110 logical topology, etc. The SMF 160, 260 may determine to perform one or more of the following: continue using the current UPF(s); select a new intermediate UPF 110, 210 (or add/remove an intermediate UPF 110, 210) (e.g., if the wireless device 100, 200 has moved out of the service area of the UPF 110, 210 that was previously connecting to the (R)AN 105, 205) while maintaining the UPF(s) acting as PDU session anchor; trigger re-establishment of the PDU session to perform relocation/reallocation of the UPF 110, 210 acting as PDU session anchor (e.g., if the wireless device 100, 200 has moved out of the service area of the UPF 110 which is connecting to RAN 105, 205).

The SMF 160 may send, to the UPF 110, 210 (e.g., a new intermediate UPF (I-UPF) 110, 210), an N4 session establishment request 1030. The N4 session establishment request 1030 message may be sent to a new UPF 110, 210. The SMF 160, 260 may determine/select the new UPF 110, 210 to act as an intermediate UPF 110-2 for the PDU session. The SMF 160, 260 may determine/select to insert an intermediate UPF 110, 210 for a PDU session which may not have an intermediate UPF 110-2. The N4 session establishment request 1030 message may indicate packet detection, data forwarding, and/or enforcement and reporting rules to be installed on the new intermediate UPF. The PDU session anchor addressing information (on N9) for this PDU session may be provided/indicated to the intermediate UPF 110-2.

The SMF 160, 260 may include (e.g., in the N4 session establishment request 1030 message) a data forwarding indication, for example, if a new UPF 110, 210 is selected by the SMF 160, 260 to replace the old (intermediate) UPF 110-2. The data forwarding indication may indicate, to the UPF 110, 210, that a second tunnel endpoint may be reserved for buffered DL data from the old (intermediate) UPF 110-2.

The new (intermediate) UPF 110, 210 may send to SMF 160 an N4 session establishment response message 1030. The UPF 110, 210 may allocate CN tunnel information. The UPF 110, 210 may provide DL CN tunnel information for the UPF 110, 210 acting as PDU session anchor and UL CN tunnel information (e.g., CN N3 tunnel information) to the SMF 160. The new (intermediate) UPF 110, 210 acting as N3 terminating point may send DL CN tunnel information, for the old (intermediate) UPF 110-2, to the SMF 160, for example, if the data forwarding indication is received. The SMF 160 may start a timer, to release the resource(s) in the old intermediate UPF 110-2.

The SMF 160 may send an N4 session modification request message 1035 to a PDU session anchor (PSA) UPF 110-3. The SMF 160, 260 may send the N4 session modification request message 1035, for example, if the SMF 160, 260 selects a new (intermediate) UPF 110, 210 for the PDU session or remove the old (intermediate) UPF 110-2. The N4 session modification request message 1035 may comprise the data forwarding indication and DL tunnel information from the new (intermediate) UPF 110, 210. The PSA UPF 110-3 may begin to send the DL data 1040 to the new (intermediate) UPF 110, 210 as indicated in the DL tunnel information.

The SMF 160, 260 may include the data forwarding indication in the service request, for example, if the service request is triggered by the network, and the SMF 160, 260 removes the old (intermediate) UPF 110-2 and does not replace the old (intermediate) UPF 110-2 with the new (intermediate) UPF 110, 210. The data forwarding indication may indicate to the PSA UPF 110-3 that a second tunnel endpoint may be reserved for buffered DL data from the old (intermediate) UPF 110-2. The PSA UPF 110-3 may begin to buffer the DL data it may receive at the same time from the N6 interface.

The PSA UPF 110-3 may send, to the SMF 160, 260, an N4 session modification response 1035. The PSA UPF 110-3 may become as N3 terminating point and may send CN DL tunnel information, for the old (intermediate) UPF 110-2, to the SMF 160, for example, if the data forwarding indication is received. The SMF 160 may start a timer to release the resource(s) in old (intermediate) UPF 110-2 (e.g., if there is one).

The SMF 160, 260 may send, to the old (intermediate) UPF 110-2, an N4 session modification request 1045. The N4 session modification request 1045 may comprise an address of the new (intermediate) UPF 110, 210, a DL tunnel indicator/ID of the new (intermediate) UPF 110, 210, etc. The SMF 160 may send the N4 session modification request 1045 to the old (intermediate) UPF 110-2, and may provide the DL tunnel information for the buffered DL data, for example, if the service request is triggered by the network, and/or the SMF 160, 260 removes the old (intermediate) UPF 110-2. The DL tunnel information may be from the new (intermediate) UPF 110, 210 (e.g., acting as N3 terminating point), for example, if the SMF 160, 260 allocates the new (intermediate) UPF 110. The DL tunnel information may be from the new PSA UPF 110-3 acting as N3 terminating point, for example, if the SMF 160, 260 does not allocate a new (intermediate) UPF 110, 210. The SMF 160, 260 may start a timer to monitor the forwarding tunnel. The old (intermediate) UPF 110-2 may send an N4 session modification response message 1045 to the SMF 160.

The old (intermediate) UPF 110-2 may forward its buffered data to the new (intermediate) UPF 110, 210 (e.g., step 1055) or to the PSA UPF 110-3 (e.g., step 1050). The old (intermediate) UPF 110-2 may forward its buffered data to the new (intermediate) UPF 110, 210 (e.g., acting as N3 terminating point), for example, if the old (intermediate) UPF 110-2 is relocated and forwarding tunnel is established to the new (intermediate) UPF 110, 210. The old (intermediate) UPF 110-2 may forward its buffered data to the PSA UPF 110-3 (e.g., acting as N3 terminating point), for example, if the old (intermediate) UPF 110-2 is removed, the new (intermediate) UPF 110, 210 is not assigned for the PDU session, and a forwarding tunnel is established to the PSA UPF 110-3.

The SMF 160, 260 may send, to the AMF 155, 255, an N11 message 1060 (e.g., an Nsmf_PDUSession_UpdateSM-Context response message). The N11 message 1060 may comprising/indicate one or more of an N1 SM container (e.g., PDU session indicator/ID, PDU session re-establishment indication), N2 SM information (e.g., PDU session indicator/ID, QoS profile, CN N3 tunnel information, S-NS-SAI), cause, etc. The SMF 160, 260 may send the N11 message 1060, for example, based on receiving the Nsmf_PDUSession_UpdateSMContext request (e.g., with a cause indicating establishment of user plane resources). The SMF 160, 260 may determine whether UPF reallocation may be performed, for example, based on the location information of the wireless device 100, 200, service area of the UPF 110, 210, and/or operator policies. The SMF 160, 260 may generate N2 SM information. The SMF 160, 260 may send an Nsmf_PDUSession_UpdateSMContext response 1060 (e.g., comprising the N2 SM information) to the AMF 155, 255 to establish the user plane(s), for example, for a PDU session that the SMF 160, 260 determines to be served by the current UPF 110, 210 (e.g., PDU session anchor or intermediate UPF). The N2 SM information may comprise information that the AMF 155, 255 may provide to the RAN 105, 205. The SMF 160, 260 may reject the activation of user plane of the PDU session, for example, for a PDU session that the SMF 160, 260 determines as requiring UPF relocation for a PDU session anchor UPF. The SMF 160, 260 may reject the activation of user plane of the PDU session, for example, by sending, to the wireless device 100, 200 via the AMF 155, 255, an Nsmf_PDUSession_UpdateSMContext response. The Nsmf_PDUSession_UpdateSMContext response may comprise an N1 SM container. The N1 SM container may indicate the corresponding PDU session indicator/ID and a PDU session re-establishment indication.

The SMF 160, 260 may receive an Namf_EventExposure_Notify signal from the AMF 155, 255. The Namf_EventExposure_Notify signal may indicate that the wireless device 100, 200 is reachable. The SMF 160, 260 may invoke the Namf_Communication_N1N2MessageTransfer service operation towards the AMF 155, 255, for example, based on receiving the Namf_EventExposure_Notify signal and if the SMF 160, 260 has pending DL data. The SMF 160, 260 may invoke the Namf_Communication_N1N2MessageTransfer service operation to establish the user plane(s) for the PDU sessions. The SMF 160, 260 may resume sending DL data notifications to the AMF 155, 255 for the DL data.

The SMF 160, 260 may send a message, to the AMF 155, 255, to reject the activation of user plane of the PDU session by including a cause in the Nsmf_PDUSession_UpdateSMContext response. The SMF 160, 260 may send the message to reject the activation of user plane of the PDU session, for example, if the wireless device 100, 200 is outside the area of availability of the LADN corresponding to the PDU session; or if the AMF 155, 255 notifies the SMF 160 that the wireless device 100, 200 is reachable for regulatory prioritized service, and the PDU session to be activated is not for a regulatory prioritized service; or if the SMF 160 decides to perform relocation of PSA UPF 110-3 for the requested PDU session.

The AMF 155, 255 may send, to the (R)AN 105, 205 an N2 request message 1065. The N2 request message 1065 may comprise one or more of N2 SM information received from SMF 160, 260; security context; AMF 155, 255 signaling connection indicator/ID; a handover restriction list; an MM NAS service accept message; list of recommended cells, TAs, and/or NG-RAN node identifiers, etc. The RAN 105, 205 may store the security context, AMF 155, 255 signaling connection ID, QoS information for the QoS flows of the PDU sessions that may be activated, and N3 tunnel indicators/IDs in the wireless device RAN context. The MM NAS service accept message may comprise PDU session status in the AMF 155. The MM NAS service accept message may comprise the PDU session indicator/ID and/or may indicate a reason because of which user plane resources may not be activated (e.g. LADN not available), for example, if the activation of a user plane of a PDU session is rejected by the SMF 160, 260. Local PDU session release may be indicated to the wireless device 100, 200 via the session status, for example, during the session request procedure.

There may be multiple PDU sessions that may involve multiple SMFs 160, 260. The AMF 155, 255 may not wait for responses from all SMFs 160, 260 prior to sending the N2 SM information to the wireless device 100, 200. The AMF 155, 255 may wait for all responses from the SMFs 160, 260 prior to sending the MM NAS service accept message to the wireless device 100, 200.

The AMF 155, 255 may include (e.g., in the N2 request message 1065) at least N2 SM information from the SMF 160, 260, for example, if the service request procedure is triggered for user plane activation for a PDU session. AMF 155, 255 may send additional N2 SM information from SMFs 160, 260 in separate N2 message(s) (e.g. N2 tunnel setup request), if there is any. The AMF 155, 255 may send an N2 request message to (R)AN 105, 205 after all the Nsmf_PDUSession_UpdateSMContext response service operations from all SMFs 160, 260 associated with the wireless device 100, 200 are received, for example, if multiple SMFs 160, 260 are involved. The N2 request message may comprise N2 SM information received in each of the Nsmf_PDUSession_UpdateSMContext responses and corresponding PDU session indicators/IDs. The PDU session indicators/IDs enable the AMF 155, 255 to associate responses to relevant SMFs 160, 260.

The RAN 105, 205 (e.g., NG RAN) node may provide the list of recommended cells, TAs, NG-RAN node indicators, for example, during the release procedure. The AMF 155, 255 may include the information from the list in the N2 request 1065. The RAN 105, 205 may use the information to allocate RAN notification area, for example, if the RAN 105, 205 determines to enable RRC inactive state for the wireless device 100, 200.

The AMF 155, 255 may receive an indication, from the SMF 160, 260 (e.g., during a PDU session establishment procedure) that the wireless device 100, 200 may be using a PDU session related to latency sensitive services, for any of the PDU sessions established for the wireless device 100, 200. The AMF 155, 255 may include the wireless device's RRC inactive assistance information, for example, if the AMF 155, 255 has received an indication from the wireless device 100, 200 (e.g., that may support a CM-CONNECTED with RRC inactive state). The AMF 155, 255, may include the wireless device's RRC inactive assistance information, for example, based on network configuration.

The (R)AN 105, 205 may send, to the wireless device 100, 200, an RRC connection reconfiguration message 1070. The RRC connection reconfiguration message 1070 may indicate that the (R)AN 105, 205 may perform RRC connection reconfiguration with the wireless device 100, 200. RRC connection reconfiguration may depend on QoS information for all QoS flows (e.g., of the PDU sessions whose user plane connections may be activated) and data radio bearers. User plane security may be established.

The N2 request message 1065 may include an MM NAS service accept message. The RAN 105, 205 may forward the MM NAS service accept message to the wireless device 100, 200. The wireless device 100, 200 may locally delete context of PDU sessions that may not be available in the CN (e.g., 5GC).

The N1 SM information may be sent (e.g., by the AMF 155, 255) to the wireless device 100, 200. The N1 SM information may indicate that some PDU session(s) may be re-established. The wireless device 100, 200 may initiate PDU session re-establishment for the PDU session(s) that may be re-established, for example, based on the completion of the service request procedure.

Uplink data 1075 from the wireless device 100, 200 may be forwarded to the RAN 105, 205, for example, based on setting up of user plane radio resources. The RAN 105, 205 (e.g., NG-RAN) may send the uplink data based on the provided UPF address and tunnel indicator/ID.

The (R)AN 105, 205 may send to the AMF 155, 255 an N2 request acknowledgement message 1105. The N2 request acknowledgment message 1105 may comprise N2 SM information. The N2 SM information may comprise one or more of: AN tunnel information, list of accepted QoS flows for the PDU sessions for which user plane connections are activated, list of rejected QoS flows for the PDU sessions for which user plane connections are activated. The N2 request message 1065 may include N2 SM information (e.g. AN tunnel information). RAN 105, 205 may respond to N2 SM information with a separate N2 message (e.g. N2 tunnel setup response message). The N2 request acknowledgment message 1105 may comprise N2 SM information corresponding to multiple SMFs 160, 260 and information to enable the AMF 155, 255 to associate the responses to relevant SMFs 160, 260, for example, if N2 SM information corresponding to multiple SMFs 160, 260 are included in the N2 request message 1065.

The AMF 155, 255 may send, to the SMF 160, 260, an Nsmf_PDUSession_UpdateSMContext request message 1110. The Nsmf_PDUSession_UpdateSMContext request message 1110 may comprise one or more of N2 SM information (e.g., AN tunnel information), RAT type per PDU session, etc. The AMF 155, 255 may forward the N2 SM information to the relevant SMF 160, 260, for example, if the AMF 155, 255 receives N2 SM information (corresponding to one or multiple SMFs 160, 260) from the RAN 105, 205. The AMF 155, 255 may include a wireless device time zone IE in the Nsmf_PDUSession_UpdateSMContext request message 1110, for example, if the wireless device time zone may change compared to a last reported wireless device time Zone.

The SMF 160, 260 may initiate notification about new location information to the PCF 135, 235 (if subscribed), for example, if dynamic PCC is deployed. The SMF 160, 260 may initiate notification about new location information to the PCF 135, 235 by invoking an event exposure notification operation (e.g., a Nsmf_EventExposure_Notify service operation). The PCF 135, 235 may provide updated policies by invoking a policy control update notification message 1115 (e.g., based on an Npcf_SMPolicyControl_UpdateNotify operation).

The SMF 160, 260 may select a new UPF 110, 210 for the PDU session. The SMF 160, 260 may select a new UPF 110, 210 to act as an intermediate UPF (e.g., I-UPF 110-1 in FIG. 11) for the PDU session. The SMF 160, 260 may initiate an N4 session modification procedure 1120 with the new (intermediate) UPF 110, 210 and may provide AN tunnel information. Downlink data 1125 from the new (intermediate) UPF 110, 210 may be forwarded to RAN 105, 205 and the wireless device 100, 200. The UPF 110, 210 may send to the SMF 160, 260 an N4 session modification response 1120. The SMF 160, 260 may initiate an N4 session modification procedure 1130 with the PSA UPF 110-3 (e.g., in a manner similar to above). Downlink data 1135 from the PSA UPF 110-3 may be forwarded to RAN 105, 205 and the wireless device 100, 200. The SMF 160, 260 may send to the AMF 155, 255 an Nsmf_PDUSession_UpdateSMContext response 1140.

A forwarding tunnel may be established to the new (intermediate) UPF 110. The SMF 160, 260 may send an N4 session modification request 1145 to the new (intermediate) UPF 110, 210 (e.g., acting as N3 terminating point) to release the forwarding tunnel, for example, and if a timer set by the SMF 160, 260 for forwarding tunnel expires. The new (intermediate) UPF 110, 210 may send, to the SMF 160, 260, an N4 session modification response 1145. The SMF 160, 260 may send to the PSA UPF 110-3 an N4 session modification request 1150, or N4 session release request.

The SMF 160, 260 may continue using an old (intermediate) UPF 110-2. The SMF 160, 260 may send an N4 session modification request 1155 to the old (intermediate) UPF 110-2, for example, if the SMF 160, 260 may continue using the old UPF 110-2. The N4 session modification request 1155 may provide/comprise AN tunnel information. The SMF 160, 260 may initiate a resource release (e.g., based on an expiration of a timer), for example, if the SMF 160, 260 may selects a new (intermediate) UPF 110, 210 and the old (intermediate) UPF 110-2 is not the PSA UPF 110-3. The SMF 160, 260 may initiate a resource release, for example, by sending an N4 session release request 1155 (e.g., comprising a release cause) to the old (intermediate) UPF 110-2.

The old (intermediate) UPF 110-2 may send, to the SMF 160, 260, an N4 session modification response or N4 session release response 1155. The old (intermediate) UPF 110-2 may acknowledge the N4 session modification request or the N4 session release request 1155 with the N4 session modification response or N4 session release response message 1155 to confirm the modification or release of resources. The AMF 155, 255 may invoke the Namf_EventExposure_Notify service operation to notify NFs regarding mobility related events. The NFs may have subscribed for these events. The AMF 155, 255 may invoke the Namf_EventExposure_Notify service operation to notify the NFs, for example, based on (e.g., after) completion of the service request procedure (e.g., of FIGS. 10 and 11). The AMF 155, 255 may invoke the Namf_EventExposure_Notify service operation towards the SMF 160, 260, for example, if the SMF 160, 260 has subscribed for events corresponding to wireless device 100, 200 moving into or out of an area of interest and if the wireless device's current location may indicate that it may be moving into or moving outside of the area of interest. The AMF 155, 255 may invoke the Namf_EventExposure_Notify service operation towards the SMF 160, 260, for example, if the SMF 160 has subscribed for LADN DNN and if the wireless device 100, 200 is moving into or outside of an area where the LADN is available. The wireless device 100, 200 may be in MICO mode; the AMF 155, 255 may have notified an SMF 160, 260 that: the wireless device 100, 200 is unreachable, and the SMF 160, 260 may not send DL data notifications to the AMF 155, 255. The AMF 155, 255 may invoke the Namf_EventExposure_Notify service operation towards the SMF 160, 260 to inform the SMF 160, 260 that the wireless device 100, 200 is reachable. The AMF 155, 255 may invoke the Namf_EventExposure_Notify service operation towards the SMF 160, 260, for example, if the SMF 160, 260 had subscribed for reachability status of the wireless device 100, 200. The AMF 155, 255 may invoke the Namf_EventExposure_Notify service operation towards the SMF 160, 260, for example, to notify the SMF 160, 260 regarding the reachability status of the wireless device 100, 200.

Figure 12:
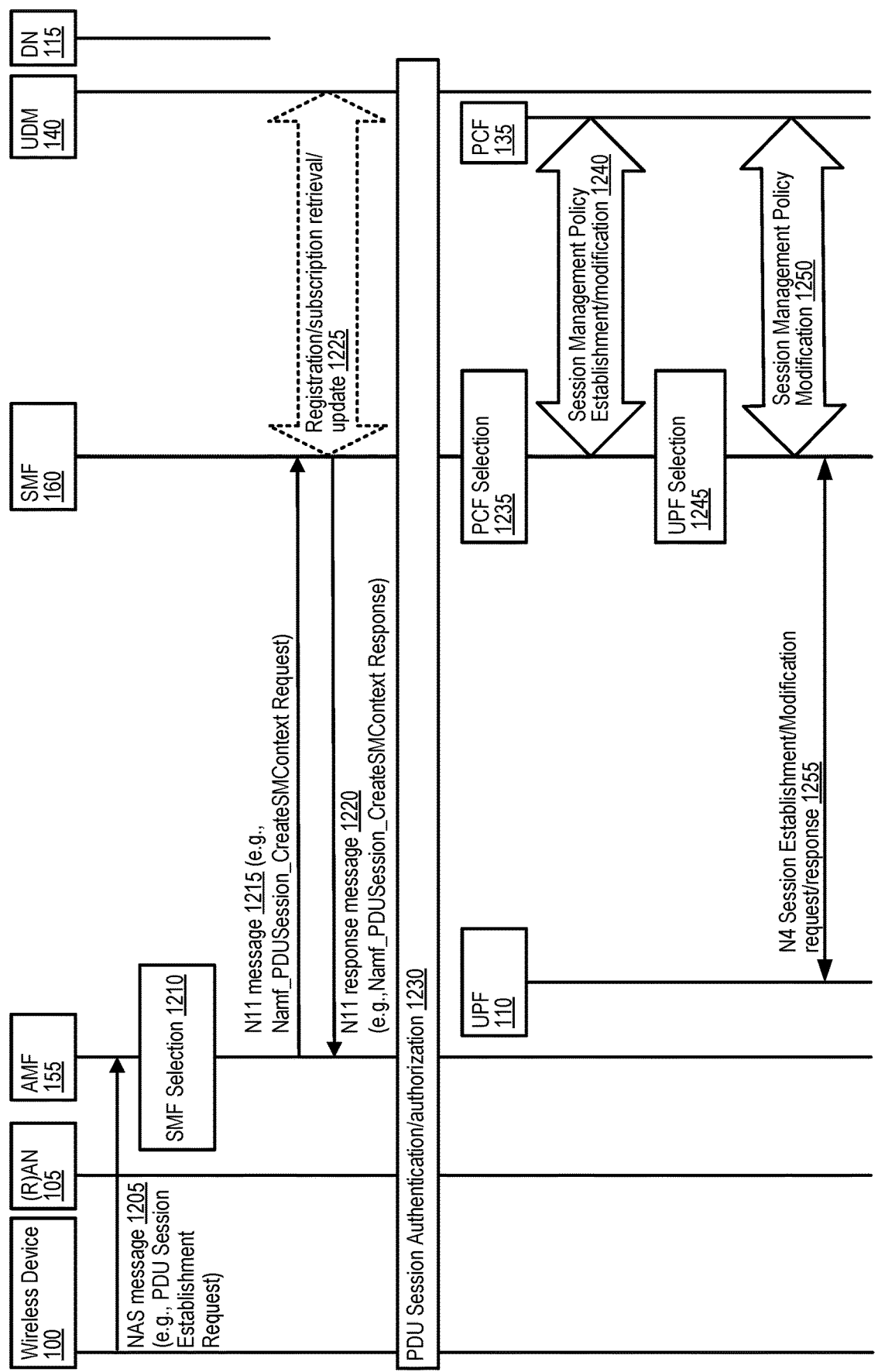
FIG. 12 shows an example packet data unit (PDU) session establishment procedure e.
Figure 13:
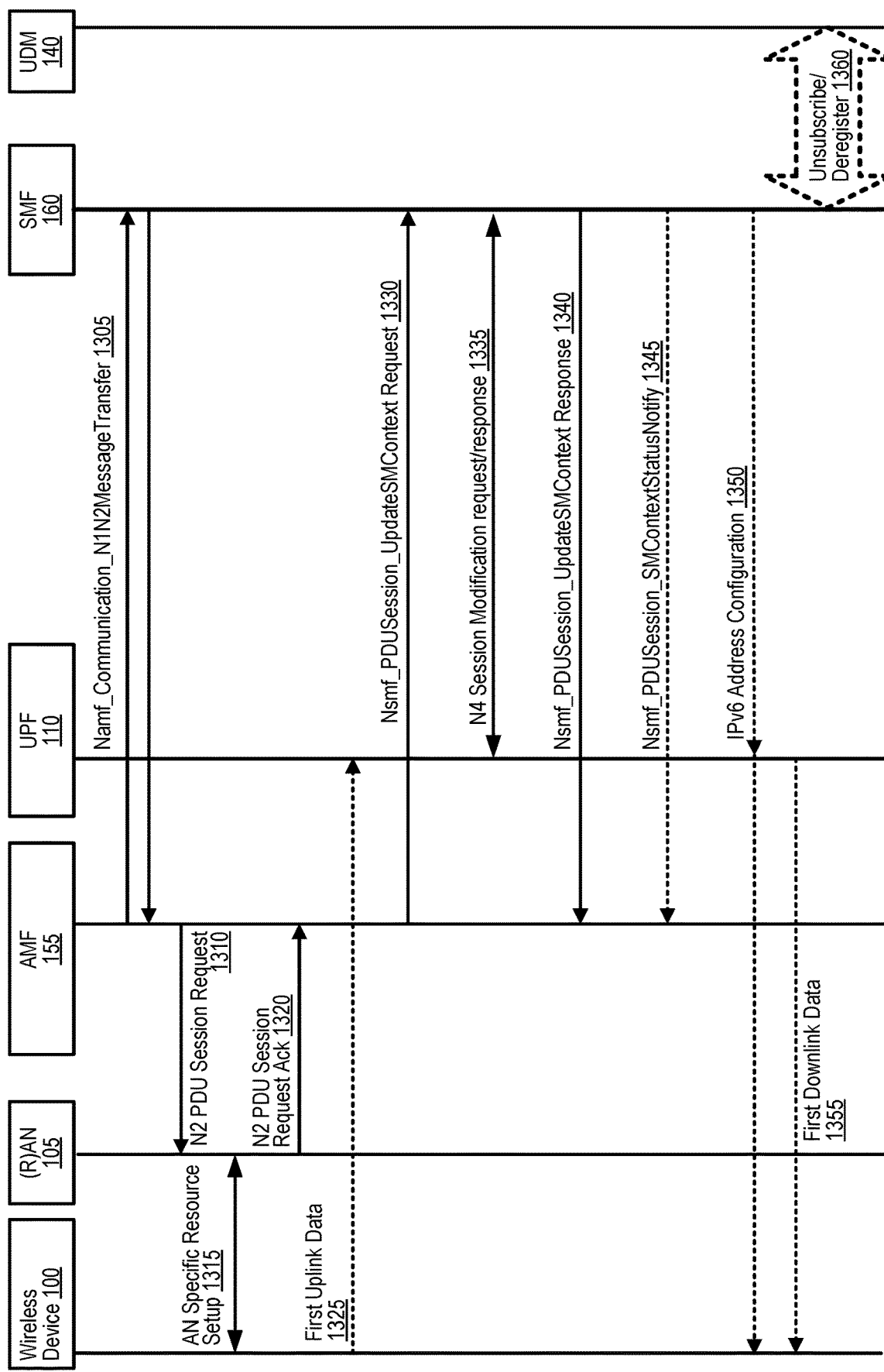
FIG. 13 shows an example PDU session establishment procedure.

FIGS. 12 and 13 show an example PDU session establishment procedure. The wireless device 100, 200 may send, to the AMF 155, 255, a NAS message 1205 (or an SM NAS message). for example, for PDU session establishment. The NAS message 1205 may comprise/indicate one or more of an NSSAI, an S-NSSAI (e.g., requested S-NSSAI, allowed S-NSSAI, and/or subscribed S-NSSAI, etc.), DNN, PDU session indicator/ID, a request type, an old PDU session indicator/ID, an N1 SM container (e.g., comprising a PDU session establishment request), etc. The wireless device 100, 200 may generate a new PDU session indicator/ID to establish a new PDU session. The wireless device 100, 200 may initiate the PDU session establishment procedure with a request type. The request type may indicate an emergency request, for example, if an emergency service is required and an emergency PDU session is not already established. The wireless device 100, 200 may initiate the wireless device-requested PDU session establishment procedure by the transmission of the NAS message 1205. The NAS message 1205 may comprise a PDU session establishment request within the N1 SM container. The PDU session establishment request may indicate one or more of a PDU type, an SSC mode, protocol configuration options, etc. The request type may indicate that the PDU session establishment request is an initial request if the PDU session establishment request is a request to establish a new PDU session. The request type may indicate an existing PDU session, for example, if the PDU session establishment request refers to an existing PDU session between 3GPP access and non-3GPP access, or to an existing PDN connection in EPC. The request type may indicate an emergency request, for example, if the PDU session establishment request is a request to establish a PDU session for emergency services. The request type may indicate an existing emergency PDU session, for example, if the PDU session establishment request refers to an existing PDU session for emergency services between 3GPP access and non-3GPP access. The NAS message 1205, sent by the wireless device 100, 200, may be encapsulated in an N2 message to the AMF 155, 255. The N2 message may further comprise user location information and access technology type information. The PDU session establishment request may comprise an SM PDU DN request container. The SM PDU DN request container may comprise information for the PDU session authorization by the external DN. The wireless device 100, 200 may include, in the NAS message 1205, an old PDU session indicator/ID, for example, if the PDU session establishment procedure is triggered for SSC mode 3 operation. The old PDU session indicator/ID may correspond to an on-going PDU session that is to be released. The old PDU session indicator/ID may be an optional parameter which may be included. The AMF 155, 255 may receive the NAS message 1205 (e.g., NAS SM message) together with user location information (e.g. cell indicator/ID in case of the RAN 105, 205). The wireless device 100, 200 may not trigger a PDU session establishment for a PDU session corresponding to an LADN, for example, if the wireless device 100, 200 is outside the area of availability of the LADN.

The AMF 155, 255 may determine that the NAS message 1205 (or the SM NAS message) may correspond to a request for the new PDU session. The AMF 155, 255 may determine that the NAS message 1205 (or the SM NAS message) may correspond to a request for the new PDU session, for example, based on determining that the request type indicates an initial request and/or that the PDU session indicator/ID is not used for any existing PDU session(s) of the wireless device 100, 200. The AMF 155, 255 may determine a default S-NSSAI for the requested PDU session, for example, if the NAS message 1205 does not comprise an S-NSSAI. The AMF 155, 255 may determine a default S-NSSAI for the requested PDU session, for example, based on a wireless device subscription (e.g., if it contains only one default S-NSSAI), or based on an operator policy. The AMF 155, 255 may perform SMF selection 1210. The AMF 155, 255 may select an SMF 160, 260, for example, based on the SMF selection 1210. The AMF 155, 255 may store an association of the S-NSSAI, the PDU session indicator/ID and/or an SMF indicator/ID (e.g., corresponding to the selected SMF 160, 260), for example, if the request type indicates an initial request or if the PDU session establishment request is caused by a handover from EPS. The AMF 155, 255 may select the SMF 160, 260 and may store an association of the new PDU session indicator/ID and the SMF indicator/ID (e.g., corresponding to the selected SMF 160, 260), for example, if the request type indicates an initial request and if the old PDU session indictor/ID indicating the existing PDU session may be contained in the NAS message 1205.

The AMF 155, 255 may send, to the SMF 160, 260, an N11 message 1215 (e.g., an Nsmf_PDUSession_CreateSMContext request or an Nsmf_PDUSession_UpdateSMContext request). The Nsmf_PDUSession_CreateSMContext request may comprise one or more of: a SUPI or PEI, a DNN, an S-NSSAI, a PDU session indicator/ID, an AMF indicator/ID (e.g., corresponding to the AMF 155, 255), a request type, an N1 SM container (e.g., comprising the PDU session establishment request), user location information, access type, PEI, and/or GPSI, etc. The Nsmf_PDUSession_UpdateSMContext request may comprise one or more of: a SUPI, a DNN, an S-NSSAI, a PDU session indicator/ID, an AMF indicator/ID (e.g., corresponding to the AMF 155, 255), a request type, an N1 SM container (e.g., comprising the PDU session establishment request), user location information, access type, RAT type, and/or PEI, etc. The AMF 155, 255 may invoke the Nsmf_PDUSession_CreateSMContext request, for example, if the AMF 155, 255 does not have an association with the SMF 160, 260 for the PDU session indicator/ID provided by the wireless device 100, 200 (e.g., the request type indicates an initial request). The AMF 155, 255 may invoke the Nsmf_PDUSession_UpdateSMContext request, for example, if the AMF 155, 255 already has an association with the SMF 160, 260 for the PDU session indicator/ID provided by the wireless device 100, 200 (e.g. the request type indicates an existing PDU session). The AMF indicator/ID may be the wireless device's globally unique AMF indicator/identifier (GUAMI) which may uniquely identify the AMF 155, 255 serving the wireless device 100, 200. The AMF 155, 255 may forward the PDU session indicator/ID together with the N1 SM container (e.g., comprising the PDU session establishment request received from the wireless device 100, 200). The AMF 155, 255 may provide the PEI instead of the SUPI, for example, if the wireless device 100, 200 has registered for emergency services without providing the SUPI. The AMF 155, 255 may indicate that the SUPI has not been authenticated, for example, if the wireless device 100, 200 has registered for emergency services but has not been authenticated.

The SMF 160, 260 may register with the UDM 140, 240, retrieve subscription data 1225, and subscribe to be notified if subscription data is modified, for example, if the request type indicates neither an emergency request nor an existing emergency PDU session, and if the SMF 160, 260 has not yet registered and subscription data is not available. The SMF 160, 260 may determine that the request may be due to handover between 3GPP access and non-3GPP access or due to handover from EPS, for example, if the request type indicates an existing PDU session or an existing emergency PDU session. The SMF 160, 260 may identify the existing PDU session based on the PDU session indicator/ID. The SMF 160, 260 may not create a new SM context but instead may update an existing SM context and may provide the representation of the updated SM context to the AMF 155, 255 in an N11 message response. The SMF 160, 260 may determine/identify the existing PDU session to be released based on the old PDU session indicator/ID, for example, if the request type indicates an initial request and if the old PDU session indicator/ID is included in the Nsmf_PDUSession_CreateSMContext request.

The SMF 160, 260 may send to the AMF 155, 255, an N11 message response 1220. The N11 message response 1220 may be a PDU session create/update response, Nsmf_PDUSession_CreateSMContext response, or an Nsmf_PDUSession_UpdateSMContext response. The Nsmf_PDUSession_CreateSMContext response may comprise/indicate one or more of a cause, an SM context indicator/ID and/or an N1 SM container. The N1 SM container may indicate a rejection of a PDU session and a cause.

The SMF 160, 260 may select a UPF 110, 210 and may trigger a PDU session establishment authentication/authorization procedure 1230. The SMF 160, 260 may select a UPF 110, 210 and may trigger a PDU session establishment authentication/authorization procedure 1230, for example, to perform secondary authorization/authentication for the establishment of the PDU session by a DN-AAA server.

The SMF 160, 260 may select an SSC mode for the PDU session, for example, if the request type indicates an initial request. The SMF 160, 260 may select one or more UPFs as needed. The SMF 160 may allocate an IP address/prefix for a PDU session corresponding to PDU session type IPv4 or IPv6. The SMF 160, 260 may allocate, for a PDU session corresponding to PDU session type IPv6, an interface identifier to the wireless device 100, 200 to enable the wireless device 100, 200 to build its link-local address. The SMF 160, 260 may allocate an IPv6 prefix for the PDU session and N6 point-to-point tunneling (e.g., based on UDP/IPv6) if the PDU session corresponds to unstructured PDU type.

The SMF 160, 260 may performs PCF selection procedure 1235, for example, if dynamic PCC is deplayed. The SMF 160, 260 may use the PCF 135, 235 already selected for the PDU session, for example, if the request type indicates existing PDU session or existing emergency PDU session. The SMF 160, 260 may apply a local policy, for example, if dynamic PCC is not deployed.

The SMF 160, 260 may perform a session management policy establishment procedure 1240 to establish a PDU session with the PCF 135, 235 and may get the default PCC rules for the PDU session. The GPSI may be included if available at the SMF 160, 260. The SMF 160, 260 may notify an event previously subscribed by the PCF 135, 235 by a session management policy modification procedure, for example, if the request type in the N11 message 1215 indicates existing PDU session. The PCF 135, 235 may update policy information in the SMF 160, 260, for example, if the request type in the N11 message 1215 indicates existing PDU session. The PCF 135, 235 may provide authorized session-AMBR, and the authorized 5QI and ARP to SMF 160, 260. The PCF 135, 235 may subscribe to the IP allocation/release event (and/or other events) in the SMF 160, 260. The PCF 135, 235, based on the emergency DNN, may set the ARP of the PCC rules to a value that may be reserved for emergency services.

The SMF 160, 260 may select an SSC mode for the PDU session, for example, if the request type in the N11 message 1215 indicates initial request. The SMF 160, 260 may select one or more UPFs as needed (e.g., step 1245). The SMF 160 may allocate an IP address/prefix for the PDU session, for example, if the PDU session corresponds to PDU session type IPv4 or IPv6. The SMF 160, 260 may allocate, for a PDU session corresponding to PDU session type IPv6, an interface identifier to the wireless device 100, 200 to enable the wireless device 100, 200 to build its link-local address. The SMF 160, 260 may allocate an IPv6 prefix for the PDU session and N6 point-to-point tunneling (e.g., based on UDP/IPv6), for example, if the PDU session corresponds to an unstructured PDU type. Neither a MAC address nor an IP address may be allocated by the SMF 160 to the wireless device 100, 200 for a PDU session corresponding to an ethernet PDU type. The SMF 160, 260 may maintain the same IP address/prefix that may be allocated to the wireless device 100, 200 in the source network, for example, if the request type in the N11 message 1215 indicates an existing PDU session.

The SMF 160 may maintain the SSC mode of the PDU session (e.g., the current PDU session anchor and IP address), for example, if the request type in N11 message 1215 indicates an existing PDU session that is moved between 3GPP access and non-3GPP access. The SMF 160 may trigger a new intermediate UPF 110, 210 insertion or allocation of a new UPF 110, 210. The SMF 160, 260 may select the UPF 110, 210 and may select SSC mode 1, for example, if the request type indicates emergency request.

The SMF 160, 260 may perform a session management policy modification procedure 1250 to report an event to the PCF 135, 235. The SMF 160, 260 may perform the session management policy modification procedure 1250 to report an event that was previously subscribed by the PCF 135, 235. The SMF 160, 260 may notify the PCF 135, 235 (e.g., that has previously subscribed to the event) with the allocated IP address/prefix corresponding to the wireless device 100, 200, for example, if request type is initial request, dynamic PCC is deployed, and PDU session type is IPv4 or IPv6. The PCF 135, 235 may provide updated policies to the SMF 160, 260. The PCF 135, 235 may provide authorized session-AMBR, and the authorized 5QI and ARP to the SMF 160, 260.

The SMF 160, 260 may initiate an N4 session establishment procedure 1255 with the selected UPF 110, 210. The SMF 160, 260 may initiate an N4 session establishment procedure 1255 with the selected UPF 110, 210, for example, if the request type indicates initial request. The SMF 160, 260 may initiate an N4 session modification procedure with the selected UPF 110, 210. The SMF 160, 260 may send an N4 session establishment/modification request 1255, to the UPF 110, 210. The SMF 160, 260 may provide one or more of packet detection rules, enforcement rules, reporting rules, etc., to be installed on the UPF 110, 210 for the PDU session. CN tunnel information may be provided to the UPF 110, 210, for example, if the CN tunnel information is allocated by the SMF 160, 260. The SMF 160, 260 may determine the inactivity timer and may provide the inactivity timer to the UPF 110, 210, for example, if the selective user plane deactivation is required for the PDU session. The UPF 110 may provide an acknowledgment by sending an N4 session establishment/modification response 1255 (e.g., to the UPF 110, 210). CN tunnel information may be provided to SMF 160, 260, for example, if CN tunnel information is allocated by the UPF 110, 210. The SMF 160, 260 may initiate an N4 session establishment/modification procedure 1255 with each UPF 110, 210 of multiple UPFs corresponding to the PDU session, for example, if multiple UPFs are selected for the PDU session.

The SMF 160, 260 may send, to the AMF 155, 255, an Namf_Communication_N1N2MessageTransfer message 1305. The Namf_Communication_N1N2MessageTransfer message 1305 may comprise/indicate a PDU session indicator/ID, an access type, N2 SM information (e.g., PDU session indicator/ID, QFI(s), QoS profile(s), CN tunnel information, S-NSSAI, session-AMBR, PDU session type, etc.), N1 SM container (e.g., comprising an PDU session establishment accept message). The PDU session establishment accept message may comprise one or more of QoS rule(s), a selected SSC mode, S-NSSAI, an allocated IPv4 address, an interface indicator/identifier, a session-AMBR, a selected PDU session type, etc. The CN tunnel information may comprise tunnel information related with the UPF 110, 210 that terminates N3, for example, if multiple UPFs are used for the PDU session. The N2 SM information may comprise information that the AMF 155, 255 may forward to the (R)AN 105, 205. The CN tunnel information may correspond to the core network address of the N3 tunnel corresponding to the PDU session. The QoS profile(s) and the corresponding QFIs may be provided to the (R)AN 105, 205. The PDU session indicator/ID may be used by AN signaling with the wireless device 100, 200 to indicate, to the wireless device 100, 200, the association between AN resources and a PDU session for the wireless device 100, 200. A PDU session may be associated with an S-NSSAI and a DNN. The N1 SM container may contain the PDU session establishment accept message that the AMF 155 may provide to the wireless device 100, 200. Multiple QoS rules and QoS profiles may be included in the PDU session establishment accept message within the N1 SM container and in the N2 SM information. The Namf_Communication_N1N2MessageTransfer message 1305 may further comprise the PDU session indicator/ID and information allowing the AMF 155, 255 to determine which access towards the wireless device 100, 200 to use.

The AMF 155, 255 may send, to the (R)AN 105, 205, an N2 PDU session request 1310. The N2 PDU session request 1310 may comprise N2 SM information and/or a NAS message. The NAS message may comprise the PDU session indicator/ID and/or the N1 SM container (e.g., comprising the PDU session establishment accept message, etc.). The AMF 155, 255 may send the NAS message within the N2 PDU session request 1310 to the (R)AN 105, 205. The NAS message may comprise PDU session indicator/ID and the PDU session establishment accept message (e.g., targeted to the wireless device 100, 200). The AMF 155, 255 may send the N2 SM information, received from the SMF 160, 260, within the N2 PDU session request 1310 to the (R)AN 105, 205.

The (R)AN 105, 205 may perform an AN specific signaling exchange 1315 with the wireless device 100, 200. The AN specific signaling exchange 1315 may be related with the information received from SMF 160, 260. An RRC connection reconfiguration procedure may be performed with the wireless device 100, 200 (e.g., if the RAN 105, 205 corresponds to a 3GPP RAN). The RRC connection reconfiguration procedure may be performed to establish the necessary RAN resources related to the QoS rules for the PDU session request 1310. (R)AN 105, 205 may allocate (R)AN N3 tunnel information for the PDU session. A master RAN node may assign some (e.g., zero or more) QFIs to be setup to the master RAN node and other QFIs to the secondary RAN 105 node, for example, for dual connectivity. The tunnel information may comprise a tunnel endpoint for each involved RAN node and the QFIs assigned to each tunnel endpoint. A QFI may be assigned to either the master RAN node or the secondary RAN node. (R)AN 105, 205 may forward the NAS message 1310 (e.g., comprising PDU session indicator/ID, N1 SM container with PDU session establishment accept message) to the wireless device 100, 200. The (R)AN 105, 205 may provide the NAS message to the wireless device 100, 200 if the necessary RAN 105 resources are established and the allocation of (R)AN 105 tunnel information is successful.

The (R)AN 105, 205 may send an N2 PDU session response 1320 to the AMF 155, 255. The N2 PDU session response 1320 may comprise/indicate a PDU session indicator/ID, a cause, N2 SM information, etc. The N2 SM information may comprise PDU session indicator/ID, AN tunnel information, list(s) of accepted/rejected QFI(s), etc. The tunnel information may correspond to the access network address of the N3 tunnel corresponding to the PDU session.

The AMF 155, 255 may forward the N2 SM information, received from (R)AN 105, 205, to the SMF 160, 260. The AMF 155, 255 may forward the N2 SM information via an Nsmf_PDUSession_UpdateSMContext request 1330. The Nsmf_PDUSession_UpdateSMContext request 1330 may comprise/indicate N2 SM information, request type, etc. The SMF 160, 260 may release rejected QFI(s) associated QoS profiles, for example, if a list of the rejected QFI(s) is included in the N2 SM information.

The SMF 160, 260 may initiate an N4 session modification procedure 1335 with the UPF 110, 210. The SMF 160, 260 may provide, to the UPF 110, 210, AN tunnel information and the corresponding forwarding rules. The UPF 110, 210 may provide an N4 session modification response 1335 to the SMF 160, 260.

The SMF 160, 260 may send, to the AMF 155, 255, an Nsmf_PDUSession_UpdateSMContext response 1340. The Nsmf_PDUSession_UpdateSMContext response 1340 may indicate a cause. The SMF 160, 260 may subscribe to the wireless device mobility event notifications from the AMF 155 The mobility event notifications may comprise location reporting, information regarding the wireless device 100, 200 moving into or out of area of interest, etc. The SMF 160, 260 may subscribe to the wireless device mobility event notifications by invoking Namf_EventExposure_Subscribe service operation. The SMF 160, 260 may subscribe to notifications regarding the wireless device 100, 200 moving into or out of an LADN service area by providing the LADN DNN as an indicator for the area of interest. The AMF 155, 255 may forward relevant events subscribed by the SMF 160, 260.

The SMF 160, 260 may send, to the AMF 155, 255, an Nsmf_PDUSession_SMContextStatusNotify message 1345.

The SMF 160, 260 may inform the AMF 155, 255 (e.g., by invoking/sending Nsmf_PDUSession_SMContextStatusNotify message 1345), for example, if the PDU session establishment procedure is not successful. The Nsmf_PDUSession_SMContextStatusNotify message 1345 may comprise a release notification. The SMF 160, 260 may release any created N4 session(s), any PDU session address (e.g. IP address, if allocated), and may release the association with the PCF 135, 235.

The SMF 160, 260 may generate an IPv6 router advertisement 1350, for example, if the PDU session corresponds to the PDU session type IPv6. The SMF 160, 260 may send IPv6 router advertisement 1350 to the wireless device 100, 200 via N4 and the UPF 110, 210. The network may send downlink data 1355, to the wireless device 100, 200, based on establishment of the PDU session.

The SMF 160, 260 may unsubscribe (e.g., step 1360) to modifications of session management subscription data (e.g., for the corresponding SUPI, DNN, and/or S-NSSAI). The SMF 160, 260 may unsubscribe (e.g., step 1360) to modifications (e.g., using Nudm_SDM_Unsubscribe), for example, if the SMF 160, 260 is no longer handling a PDU session of the wireless device 100, 200 (e.g., for the corresponding DNN, S-NSSAI). The SMF 160, 260 may deregister (e.g., step 1360) for a PDU session (e.g., using a Nudm_UECM_Deregistration message), for example, if the PDU session may not be established. The Nudm_UECM_Deregistration message may indicate a SUPI, a DNN, and/or a PDU session indicator/ID.

Figure 14:
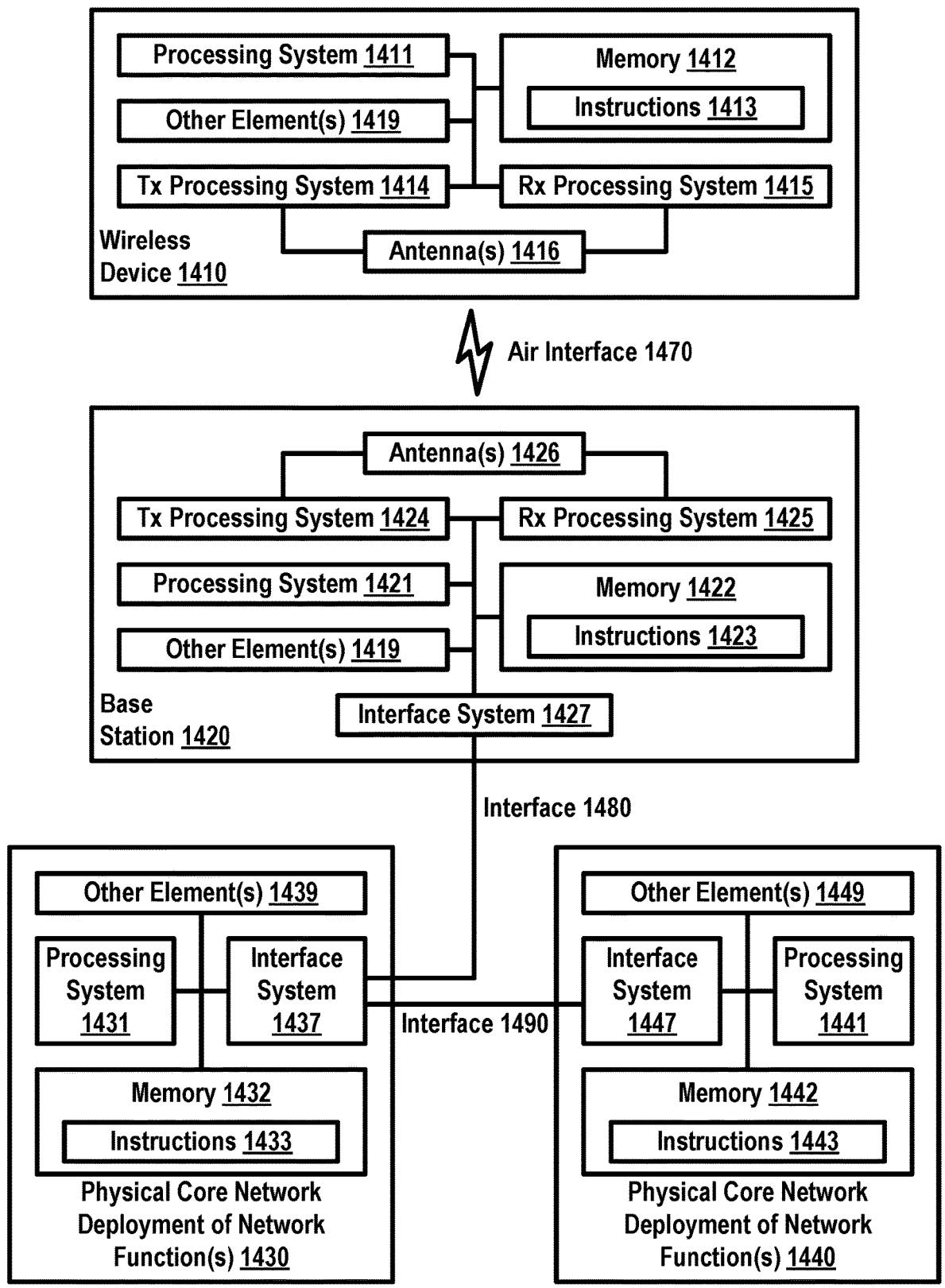
FIG. 14 shows an example mobile communication network.
Figure 15:
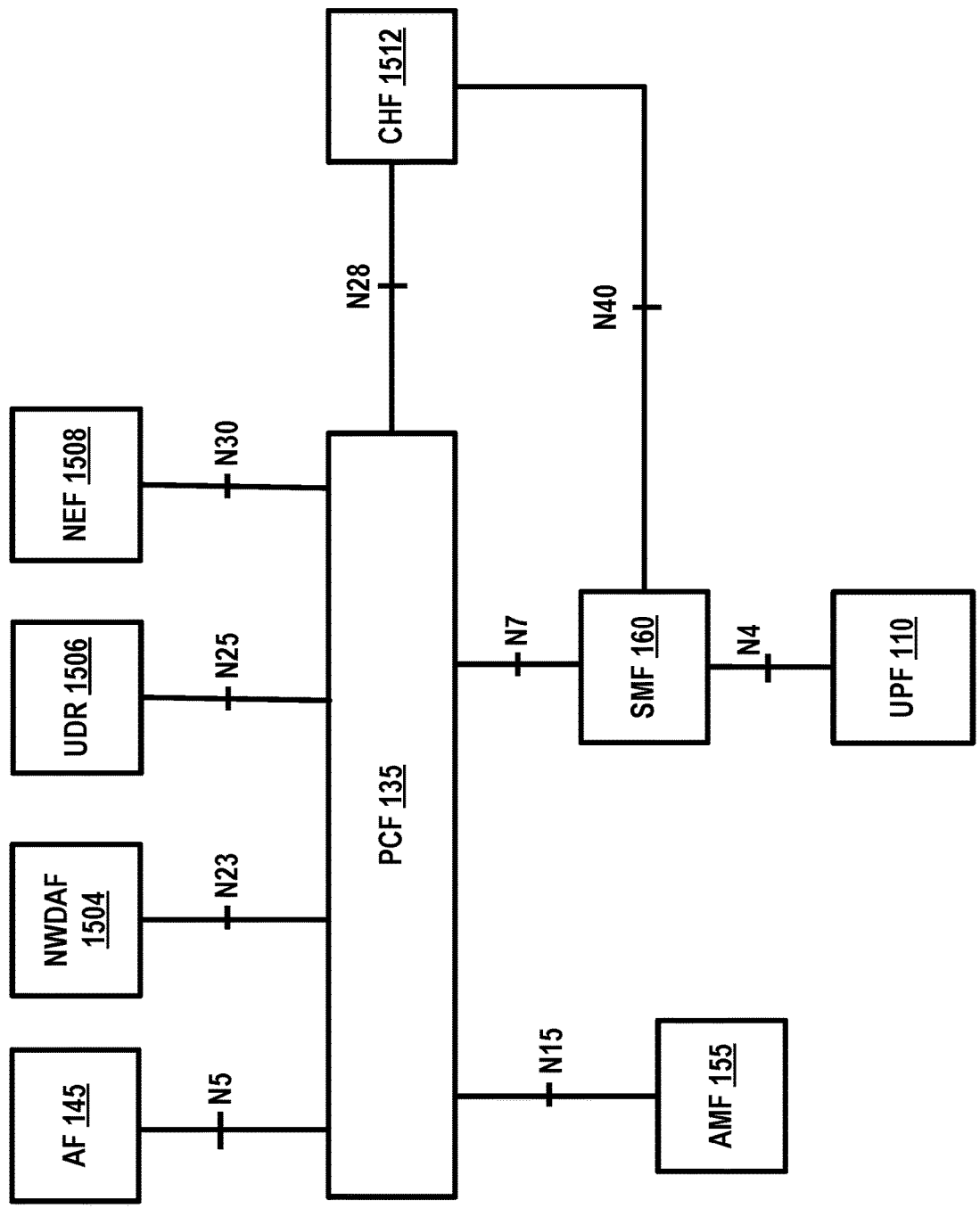
FIG. 15 shows an example policy and charging control system architecture.

FIG. 14 shows an example mobile communication network. Various examples described herein may apply to the example mobile communication network of FIG. 14. The mobile communication network may comprise a wireless device 1410, a base station 1420, a physical CN deployment 1430 of one or more network functions, and a physical CN deployment 1440 of one or more network functions. The CN deployment 1430 and the CN deployment 1440 may be elements of a core network.

The wireless device 1410 may communicate with the base station 1420 via an air interface 1470. The communication direction from the wireless device 1410 to the base station 1420 over the air interface may be known as uplink, and the communication direction from the base station 1420 to the wireless device 1410 over the air interface 1470 may be known as downlink. Downlink transmissions may be separated from uplink transmissions using FDD, TDD, and/or some combination of the two duplexing techniques. FIG. 14 shows a single wireless device 1410 and a single base station 1420, but it may be understood that the wireless device 1410 may communicate with any quantity of base stations or other access network components via the air interface 1470, and that the base station 1420 may communicate with any quantity of wireless devices via the air interface 1470.

The wireless device 1410 may comprise a processing system 1411 and a memory 1412. The memory 1412 may comprise one or more computer-readable media (e.g., one or more non-transitory computer readable media). The memory 1412 may include instructions 1413. The processing system 1411 may process and/or execute the instructions 1413. Processing and/or execution of the instructions 1413 may cause the processing system 1411 to perform one or more functions or activities. The memory 1412 may comprise data (not shown). One of the functions or activities performed by the processing system 1411 may be to store data in the memory 1412 and/or retrieve previously-stored data from the memory 1412. Downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that may be analogous to, but separate, from the memory 1412. The dedicated memory may comprise instructions that may be processed and/or executed to perform out one or more of their respective functionalities.

The wireless device 1410 may comprise one or more other elements 1419. The one or more other elements 1419 may comprise software and/or hardware that may provide features and/or functionalities. The one or more other elements may comprise, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS), etc.). The wireless device 1410 may receive user input data from and/or provide user output data to the one or more one or more other elements 1419. The one or more other elements 1419 may comprise a power source. The wireless device 1410 may receive power from the power source. The wireless device 1410 may be configured to distribute the power to the other components in the wireless device 1410. The power source may comprise one or more sources of power (e.g., a battery, a solar cell, a fuel cell, or any combination thereof).

The wireless device 1410 may send/transmit data to the base station 1420 via the air interface 1470. The processing system 1411 may implement layer 3 and layer 2 open systems interconnection (OSI) functionality to process the data for uplink transmissions. Layer 3 may comprise a radio resource control layer (RRC). Layer 2 may comprise a service data application protocol layer (SDAP), a packet data convergence protocol layer (PDCP), a radio link control layer (RLC), and a media access control layer (MAC). The data may be provided to the transmission processing system 1414. The transmission processing system 1414 may implement layer 1 OSI functionality. Layer 1 may include a physical layer (PHY). The wireless device 1410 may transmit the data via the air interface 1470 using one or more antennas 1416.

For scenarios where the one or more antennas 1416 comprise multiple antennas, the multiple antennas may be used to perform one or more multi-antenna techniques. Multi-antenna techniques may comprise spatial multiplexing (e.g., single-user multiple-input multiple output (MIMO) or multi-user MIMO), transmit/receive diversity, and/or beamforming.

The wireless device 1410 may receive downlink data from the base station 1420 via the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data.

The base station 1420 may comprise elements analogous to the elements of the wireless device 1410. The base station

1420 may comprise a processing system 1421 and a memory 1422. The memory 1422 may comprise one or more computer-readable media (e.g., one or more non-transitory computer readable media). The memory 1422 may comprise instructions 1423. The processing system 1421 may process and/or execute the instructions 1423. Processing and/or execution of the instructions 1423 may cause the processing system 1421 to perform one or more functions or activities. The memory 1422 may comprise data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 2 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the CN via an interface 1480. The interface 1480 may be wired and/or wireless. The interface system 1427 may comprise one or more components suitable for communicating via the interface 1480. The interface 1480 may connect the base station 1420 to a single CN deployment 1430, but it may be understood that the wireless device 1410 may communicate with any quantity of CN deployments via the interface 1480, and that the CN deployment 1430 may communicate with any quantity of base stations via the interface 1480. The base station 1420 may comprise one or more other elements 1429 analogous to one or more of the one or more other elements 1419.

The CN deployment 1430 may comprise one or more network functions (NFs). The CN deployment 1430 may comprise an AMF and/or a UPF analogous to the AMF and UPF shown in FIG. 1 or FIG. 2. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media (e.g., one or more non-transitory computer readable media). The memory 1432 may comprise instructions 1433. The processing system 1431 may process and/or execute the instructions 1433. Processing and/or execution of the instructions 1433 may cause the processing system 1431 to perform one or more functions or activities. The memory 1432 may comprise data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 or FIG. 2 and/or one or more other CN deployments, including the CN deployment 1440). The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media (e.g., one or more non-transitory computer readable media). The memory 1442 may comprise instructions 1443. The processing system 1441 may process and/or execute the instructions 1443. Processing and/or execution of the instructions 1443 may cause the processing system 1441 to perform one or more functions or activities. The memory 1442 may comprise data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements 1449.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more NFs. Depending on the context in which the term is used, a NF may refer to a particular set of functionalities and/or one or more physical elements configured to perform those functionalities (e.g., a processing system and memory comprising instructions that, when executed by the processing system, cause the processing system to perform the functionalities). There may be many different types of NFs and each type of NF may be associated with a different set of functionalities. Different NFs may be flexibly deployed at different locations (for example, in different physical CN deployments) or in a same location (for example, co-located in the same physical CN deployment). Physical CN deployments may be not limited to implementation of NFs. For example, a particular physical CN deployment may further comprise a base station or portions therefor and/or a data network or portions thereof. One or more NFs implemented on a particular physical CN deployment may be co-located with one or more non-core elements, including elements of an access network or data network.

FIG. 10 shows an example communication architecture. The example communication architecture may be a policy and charging control system architecture. The example communication architecture may comprise an architecture for an access technology (e.g., any 3GPP access technology, such as 5G access technology; any non-3GPP access technology; or any other access technology etc.). The architecture may comprise one or more of: PCF 135, SMF 160, UPF 110, AMF 155, NEF 1508, NWDAF 1504, CHF 1512, AF 145, and UDR 1506. The CHF 1512 may support charging methods corresponding to one or more of: offline charging, online charging, and/or converged charging. Offline charging may comprise collecting charging information for network resource usage concurrently with that resource usage. Charging data record (CDR) files may be generated by the network. CDR files may be transferred to a network operator's billing domain (BD) for subscriber billing, inter-operator accounting, collection of statistics, and/or other functions. The BD may comprise post-processing systems (e.g., operator's billing systems and/or billing mediation devices). Charging information corresponding to offline charging may (or may not) affect, in real-time (or near real-time), the services being rendered.

Online charging may comprise collecting charging information for network resource usage concurrently with the resource usage. The network may obtain/receive authorization for the network resource usage prior to actual resource usage. The charging information utilized in online charging may (or may not) be identical (or substantially identical) to the charging information utilized in offline charging. Charging information corresponding to online charging may affect, in real-time (or near real-time), the services being rendered. A charging mechanism using online charging may require direct interaction with network control functionalities. Converged charging may comprise a combination of online charging and offline charging.

Figure 16:
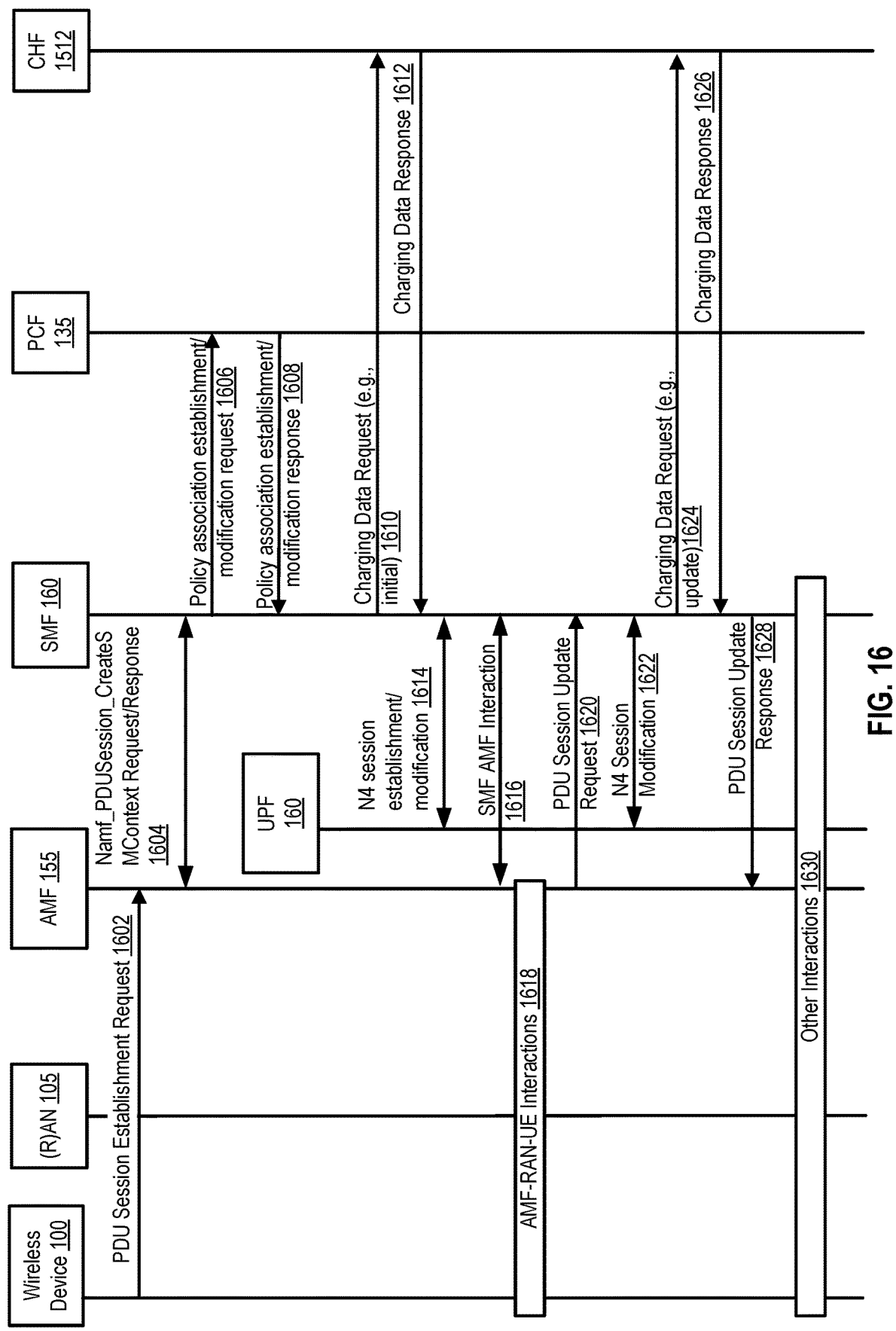
FIG. 16 shows an example call flow for PDU session establishment and charging.

FIG. 16 shows an example call flow for PDU session establishment and charging. The wireless device 100 may invoke a PDU session establishment procedure. The wireless device 100 may invoke a PDU session establishment procedure, for example, by sending a PDU session establishment request message 1602 to the AMF 155, 255. The PDU session establishment request message 1602 may comprise one or more of: a PDU session indicator/ID, a PDU type, an SSC mode, user location information, and/or access technology type information.

The AMF 155 may select the SMF 160, for example, based on receiving the PDU session establishment request message 1602. The AMF 155 and the SMF 160 may exchange messages (e.g., Namf_PDUSession_CreateSMContext request/response messages 1604). The AMF 155 may send, to the selected SMF 160, a request message (e.g., an Namf_PDUSession_CreateSMContext request message) to request establishment of the PDU session. The SMF 160 may send, to the AMF 155, a response message (e.g., an Namf_PDUSession_CreateSMContext Response message). The response message may indicate whether the request from the AMF 155 is accepted (or not accepted).

The SMF 160 may select a PCF (e.g., the PCF 135). The SMF 160 may send, to the PCF 135, a request message (e.g., an SM Policy association establishment/modification request message 1606) to request PCC rules. The PCF 135 may send, to the SMF 160, a response message (e.g., SM policy association establishment/modification response message 1608). The response message may comprise PCC rules.

The SMF 160 may create a charging indicator/ID for the PDU session. The SMF 160 may send, to the CHF 1012, a request message (e.g., a charging data request [initial] message 1610) to verify authorization of a subscriber of the wireless device 100 to start the PDU session. The PDU session may be triggered by a start of a PDU session charging event. The CHF 1012 may open a CDR for the PDU session. The CHF 1012 may acknowledge the request message by sending, to the SMF 160, a response message (e.g., a charging data response [initial] message 1612).

The SMF 160 may select a UPF (e.g., the UPF 160) and may invoke an N4 session establishment/modification procedure 1614 with the selected UPF. The SMF 160 may interact (e.g., exchange one or more messages) with the AMF 155 (e.g., SMF AMF interaction 1616).

The SMF 160 may send, to the AMF 155, a message (e.g., an Namf_Communication_N1N2MessageTransfer message). The message may comprise one or more of: a PDU session indicator/ID, QoS profile(s), CN tunnel information, and/or S-NSSAI from allowed NSSAI.

The AMF 155 may interact (e.g., exchange one or more messages) with the (R)AN 105 and/or the wireless device 100 (e.g., AMF-RAN-UE interactions 1618). The AMF 155 may send, to the (R)AN 105, a request message (e.g., an N2 PDU session request message). The request message may comprise information received from the SMF 160 (e.g., an indication that the PDU session establishment request is accepted).

The (R)AN 105 may send, to the AMF 155, a response message (e.g., an N2 PDU session response message). The response message may comprise one or more of: a PDU session indicator/ID and/or N2 SM information (e.g., PDU session indicator/ID, AN tunnel information, a list of accepted/rejected QFI(s), etc.). The AN tunnel information may comprise an access network address of an N3 tunnel corresponding to the PDU session.

The AMF 155 may send, to the SMF 160, a PDU session update request message 1620 (e.g., an Nsmf_PDUSession_UpdateSMContext request message). The PDU session update request message 1620 may comprise the N2 SM information (e.g., as received from the (R)AN). The SMF 160 may invoke an N4 session modification procedure 1622. The SMF 160 may send, to the UPF 160, the AN tunnel information and/or corresponding forwarding rules. The UPF 160 may send, to the SMF 160, a response message, for example, based on receiving the AN tunnel information.

The SMF 160 may request, from the CHF 1512, quota(s) (e.g., associated with one or more events). The SMF 160 may request a quota, for example, for a start of service data flow event. The SMF 160 may request a quota, for example, if an allocated quota is consumed and/or a trigger to request a quota is met. The SMF 160 may send, to the CHF 1512, a message (e.g., a charging data request [update] message 1624) indicating the request.

The UPF 160 may send, to the SMF 160, an indication of resource usage of the PDU session. The UPF 160 may send, to the SMF 160, an indication of resource usage of the wireless device 100. The charging data request [update] message 1624 may comprise resource usage information received from the UPF 160. The CHF 1512 may update the CDR for the PDU session, for example, based on the charging data request [update] message 1624. The CHF 1512 may acknowledge reception of the charging data request [update] message 1624 by sending, to the SMF 160, a response message (e.g., a charging data response message 1626).

The SMF 160 may send, to the AMF 155, a PDU session update response message 1628 (e.g., an Nsmf_PDUSession_UpdateSMContext response message), for example, based on receiving the PDU session update request message 1620, invoking the N4 session modification procedure 1622, and/or sending the charging data request [update] message 1624. Other interactions 1630 (e.g., one or more operations, exchange of one or more messages, etc.) may be performed between the SMF 160, the AMF 155, the (R)AN 105, the wireless device 100, and/or other elements shown in FIG. 16, for the PDU session establishment procedure.

Figure 17:
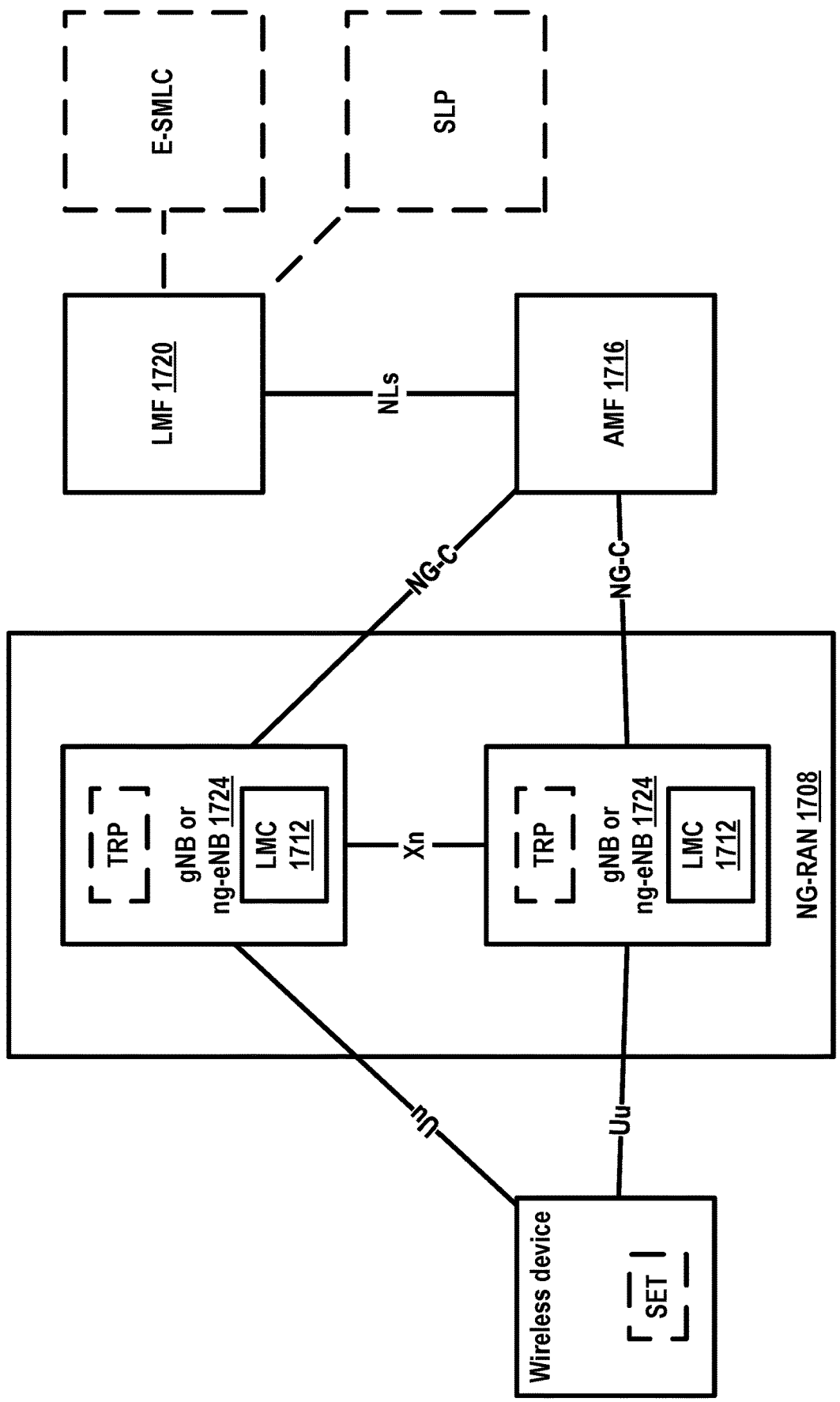
FIG. 17 shows an example arrangement of a local location management component (LMC).

FIG. 17 shows an example arrangement of a local location management component (LMC). The LMC 1712 may be associated with a base station. The LMC 1712 may be an internal function of an NG-RAN node 1724 (e.g., a gNB and/or an ng-eNB) corresponding to the NG-RAN 1708. The LMC 1712 may be located in a central unit control plane (e.g., gNB-CU-CP) for split-base station (split-gNB) architecture. The interface between the LMC 1712 and the serving NG-RAN node 1724 may be internal. The internal interface minimize the latency between the LMC 1712 and serving NG-RAN node 1724. Functions of the NLs interface (e.g. an NL1 interface between an AMF 1716 and LMF 1720) may also be specified for the NG-C interface. The example architecture may not require any new interface. Positioning-related signalling may internal to the NG-RAN node 1724 if wireless device positioning (e.g., positioning of a wireless device 1704) involves only transmission and reception points (TRPs) within the NG-RAN node 1724. The example architecture of FIG. 17 may support location continuity in case of handover, and may enable LMC relocation to a target NG-RAN node via enhancements to the XnAP handover preparation procedure. One or more network functions, such as AMF, LMC, LMF, UDM, OAM, GMLC, LCS client, NEF, and/or may be implemented, for example, as a network element on a (dedicated) hardware, a network node, and/or in any combination of hardware (e.g., computing device(s)) and/or software.

Figure 18:
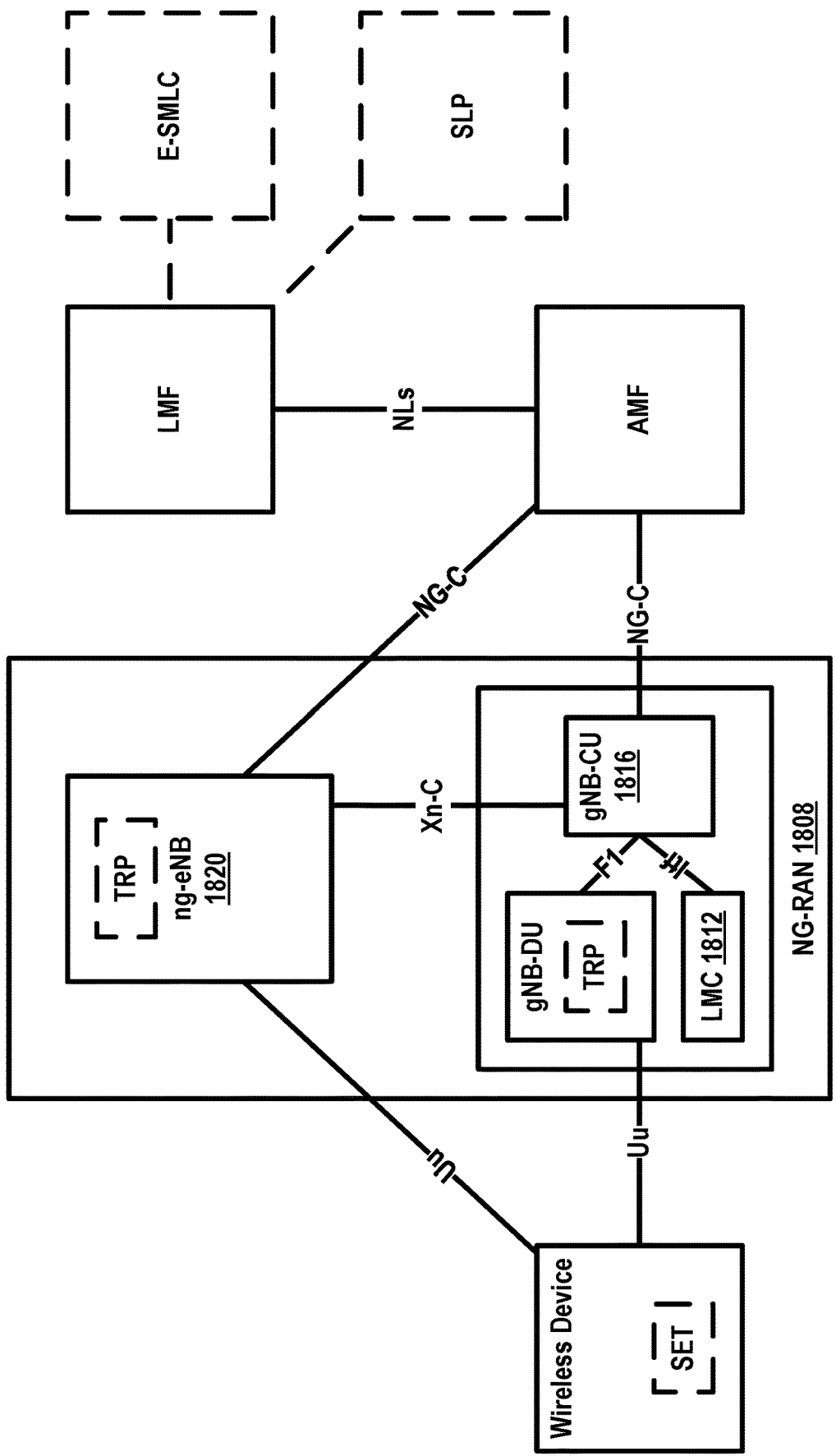
FIG. 18 shows an example arrangement of an LMC.

FIG. 18 shows an example arrangement of an LMC. The LMC 1812 may be associated with a base station. The LMC 1812 may be a logical node within the split base station (e.g., split-gNB) and may be connected to the gNB-CU-CP via a new interface. A dedicated interface may be maintained between the LMC 1812 and the serving NG-RAN node 1820. The NG-C interface may have similar functionalities and effects as described with respect to the architecture of FIG. 17. A new interface between the LMC 1812 and the gNB-CU-CP may be defined. The LMC and gNB-CU-CP may be provided by different vendors, enabling increased flexibility. The example architecture of FIG. 18 may allow offloading of positioning support from a gNB-CU 1816.

Figure 19:
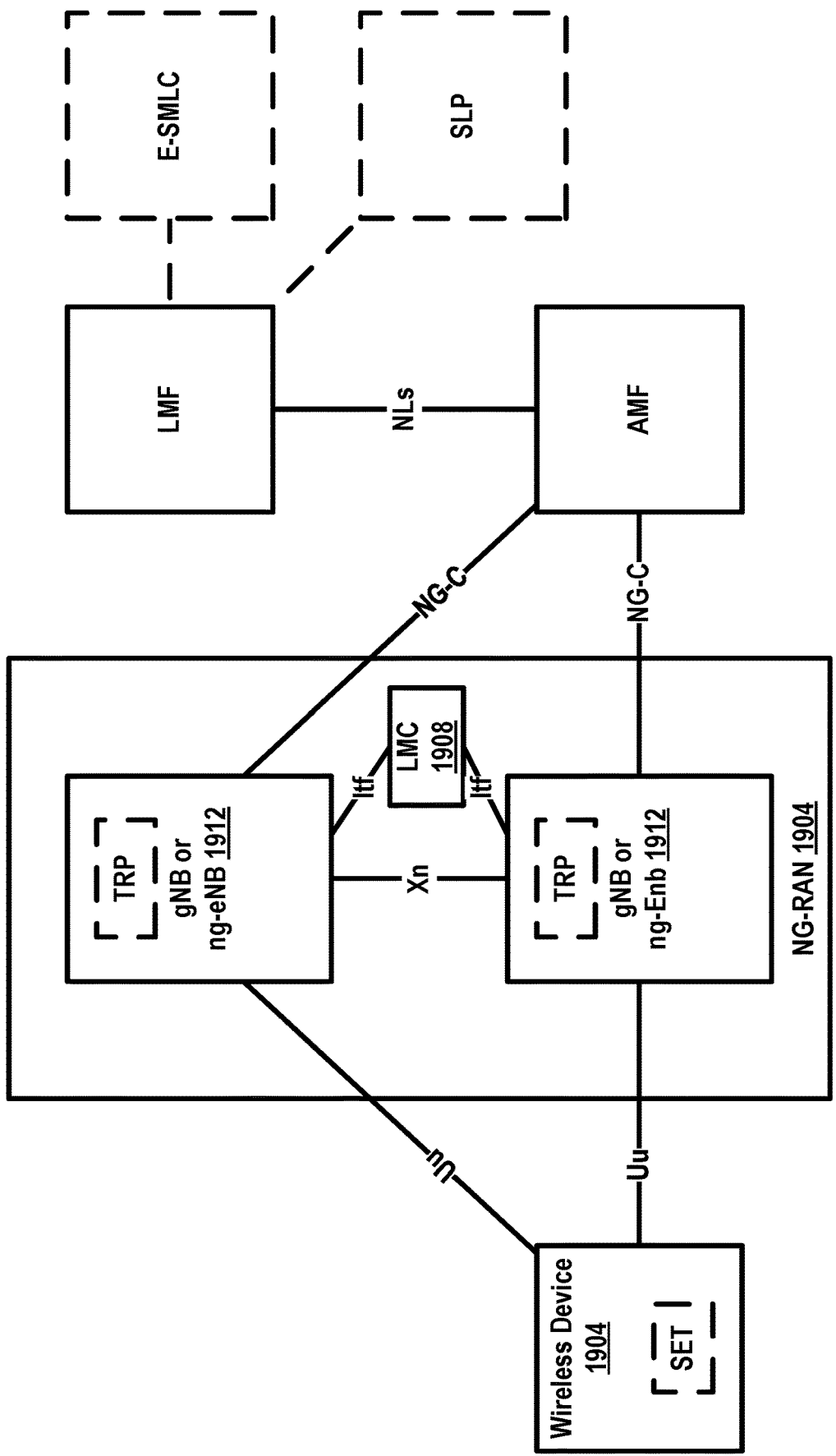
FIG. 19 shows an example arrangement of an LMC.

FIG. 19 shows an example arrangement of an LMC. The LMC 1908 may be associated with a base station. The LMC 1908 may be a new logical node outside or inside an NG-RAN 1904, and may connected to NG-RAN nodes 1912 (e.g., gNBs and/or ng-eNBs) via a new interface.

A dedicated interface may be used between the LMC 1908 and the serving NG-RAN node 1912. The NG-C interface may have similar functionalities and effects as described with respect to FIG. 17, and may be supported by the dedicated interface. A new interface between the LMC 1908 and the NG-RAN node 1912 may be defined. The LMC 1908 and NG-RAN nodes 1912 may be provided by different vendors, enabling increased flexibility. A single LMC 1908 may support multiple NG-RAN nodes 1912. Using a single LMC 1908 for multiple NG-RAN nodes 1912 may avoid the necessity of an LMC in each individual NG-RAN node 1912. The example architecture of FIG. 19 may enable offloading of positioning support from a gNB-CU. The example architecture of FIG. 19 may enable support for location continuity in case of handover. LMC relocation may not be needed, for example, if both source and target NG-RAN nodes 1912 are served by the same LMC 1908.

Figure 20:
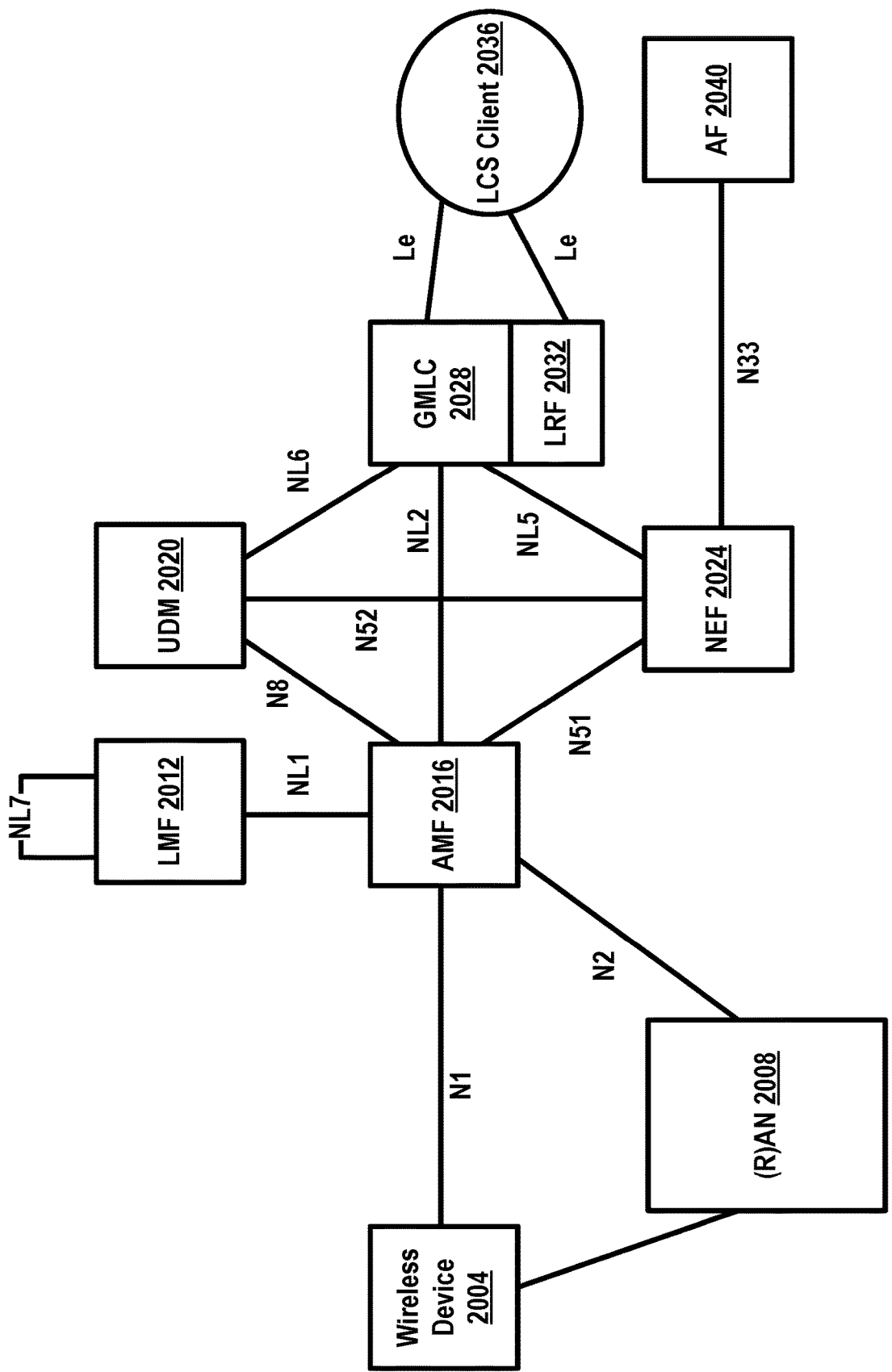
FIG. 20 shows an example architecture for location services.

FIG. 20 shows an example architecture for location services. An access network (e.g., (R)AN 2008) may perform one or more operations corresponding to positioning procedures (e.g., positioning of a target wireless device 2004, provision of location related information not associated with a particular target wireless device, and/or transfer of positioning messages between an AMF 2016 or LMF 2012 and the target wireless device 2004). AFs 2040 and NFs may access location services (LCS) from a GMLC 2028 in the same trust domain (e.g. in the same PLMN) using the Ngmlc interface or event exposure (e.g., with location information from an AMF in the same trust domain using the Namf interface). LCS clients 2036 may access LCS from a GMLC 2028 (e.g. HGMLC) using the Le reference point. External AFs 2040 may access LCS services from an NEF 2024 using Nnef interface. A GMLC 2028 may contain functionality required to support LCS. There may be more than one GMLC 2028 in one PLMN. A GMLC 2028 may be the first node that an external LCS client 2036 accesses in a PLMN (e.g., the Le reference point may be supported by the GMLC). AFs 2040 and NFs may access the GMLC 2028 directly or via NEF 2024. The GMLC 2028 may request routing information and/or target wireless device privacy information from a UDM 2020 via the Nudm interface. The GMLC 2028 may forward a location request to either a serving AMF 2016 (e.g., using Namf interface) or to a GMLC in another PLMN (e.g., using the Ngmlc interface) if the wireless device 2004 is a roaming wireless device. The GMLC 2028 may forward the location request, for example, based on (e.g., after or in response to) performing authorization of an external LCS client 2036 or AF 2040 and verifying target wireless device privacy. A location retrieval function (LRF) 2032 may be collocated with the GMLC 2028 or may be separate. The LRF 2032 may be responsible for retrieving or validating location information, and providing routing and/or correlation information for a wireless device 2004 (e.g., which may have initiated an IMS emergency session). The information may be provided by an LRF 2032 to an E-CSCF.

A wireless device may support positioning with one or more modes. For example, the wireless device may support positioning with four different modes, or any other quantity of modes. A wireless device may support positioning based on a wireless device-assisted mode. The wireless device may perform location measurements and send the measurements to another entity (e.g. an LMF) to compute a location, for example, in the wireless device-assisted mode of positioning. A wireless device may support positioning using a wireless device-based mode. The wireless device may perform location measurements and may compute a location estimate using assistance data provided by a serving PLMN, for example, in the wireless device-based mode of positioning. A wireless device may support positioning using a standalone mode. The wireless device may perform location measurements and compute a location estimate without using assistance data provided by serving PLMN, for example, in the standalone mode of positioning. A wireless device may support positioning using a network based-mode. A serving PLMN may perform location measurements of signals sent by a target wireless device and compute a location estimate, for example, in the network-based mode of positioning.

The transmission of wireless device signals for network-based mode may or may not be transparent to the wireless device. Wireless device positioning capability information (e.g., a limited set of wireless device positioning capability information) may be transferred to the CN (e.g., 5GCN) for (e.g., during) registration of the wireless device. At least some of the positioning capability information may be subsequently transferred to an LMF. A wireless device positioning capability information may be transferred directly to a location server (e.g. an LMF). A wireless device may support additional functions to support location services. A wireless device may support location requests received from a network for 5GC mobile terminal location request (5GC-MT-LR), 5GC network induced location request (5GC-NI-LR), or a deferred 5GC-MT-LR for periodic or triggered location reporting. A wireless device may support location requests to a network for a 5GC mobile originated location request (5GC-MO-LR). A wireless device may support privacy notification and verification for a 5GC-MT-LR or deferred 5GC-MT-LR for periodic or triggered location reporting. A wireless device may support sending updated privacy requirements to a serving AMF (e.g., for transfer to a UDR via UDM). A wireless device may support periodic or triggered location reporting to an LMF. A wireless device may support change of a serving LMF for periodic or triggered location reporting. A wireless device may support cancelation of periodic or triggered location reporting. A wireless device may support multiple simultaneous location sessions. A wireless device may support reception of unciphered and/or ciphered assistance data broadcast by NG-RAN. A wireless device may support reception of ciphering keys for the assistance data from the AMF.

An AMF may contain functionality responsible for managing positioning for a target wireless device for all types of location requests. The AMF may be accessible to the GMLC and NEF via the Namf interface, to the RAN via the N2 reference point, and to the wireless device via the N1 reference point. The AMF may perform one or more functions to support location services. The AMF may initiate an NI-LR location request for a wireless device with an IMS emergency call. The AMF may receive and manage location requests from a GMLC for a 5GC-MT-LR and deferred 5GC-MT-LR for periodic, triggered, and/or wireless device available location events. The AMF may receive and manage location requests from a wireless device for a 5GC-MO-LR. The AMF may receive and manage event exposure request for location information from an NEF. The AMF may select an LMF. The AMF may, for selecting an LMF, optionally account for wireless device access type(s), serving AN node, network slicing, QoS, LCS client type, RAN configuration information, LMF capabilities, LMF load, LMF location, indication of either a single event report or multiple event reports, and/or duration of event reporting. The AMF may receive updated privacy requirements from a wireless device and transfer the requirements to a UDR via UDM. The AMF may support cancelation of periodic or triggered location reporting for a target wireless device. The AMF may support change of a serving LMF for periodic or triggered location reporting for a target wireless device. The AMF may receive ciphering keys from the LMF and forward the keys to suitably subscribed wireless devices (e.g., using mobility management procedures), for example, if assistance data is broadcast by the system (e.g., 5GS) in ciphered form.

An LMF may manage the overall co-ordination and scheduling of resources required for determining a location of a wireless device (e.g., that is registered with or accessing a CN, such as a 5GCN). The LMF may calculate or verify a final location estimate and/or a velocity estimate. The LMF may estimate the achieved accuracy. The LMF may receive location requests, for a target wireless device, from the serving AMF via an Nlmf interface. The LMF may interact with the wireless device to exchange location information as applicable for wireless device-assisted and/or wireless device-based position methods. The LMF may interact with the NG-RAN, N3IWF, and/or TNAN to obtain location information. The LMF may determine the result of the positioning in geographical co-ordinates. The positioning result may comprise a velocity of the wireless device (if requested and/or if available). The LMF may perform one or more additional functions to support location services. The LMF may support a request for a single location received from a serving AMF for a target wireless device. The LMF may support a request, received from a serving AMF for a target wireless device, for periodic or triggered location reporting. The LMF may determine positioning methods based on wireless device capabilities, PLMN capabilities, QoS, and/or LCS client type. The LMF may report wireless device location estimates directly to a GMLC for periodic or triggered location reporting of a target wireless device. The LMF may support cancelation of periodic or triggered location reporting for a target wireless device. The LMF may support the provision of broadcast assistance data to wireless devices (e.g., via NG-RAN) in ciphered or unciphered form. The LMF may forward any ciphering keys to subscribed wireless devices via the AMF.

An AMF may determine an LMF for location estimation of a target wireless device. An LMF selection functionality may be used, by the AMF, to determine an LMF for location estimation of the target wireless device. An LMF indicator/ID may be available in the wireless device location context or may be provided by the wireless device. The AMF may evaluate whether an LMF indicated/identified by an LMF indicator/ID may be used, for example, if the LMF indicator/ID is available in the wireless device location context or is provided by the wireless device. The LMF selection functionality may be supported by the LMF, for example, if the LMF determines that it is unsuitable or unable to support location determination for the current wireless device access network or serving cell (e.g., for the deferred 5GC-MT-LR procedure for periodic, or triggered location events). LMF reselection may be a functionality supported by AMF if necessary (e.g. because of wireless device mobility). The AMF may select a new LMF if the AMF determines that LMF identified by the LMF ID may not be used. The AMF may select a new LMF if the LMF ID is not available in the wireless device location context. The AMF may select a new LMF if the LMF ID is not provided by the wireless device. The LMF selection may be performed at the AMF or LMF based on locally available information, or by querying NRF. For example, LMF profiles may be configured locally at the AMF or the LMF. LMF selection may performed if a location request is received at the AMF and the AMF determines to use the LMF for wireless device position estimation. LMF selection may performed if a subscribed wireless device event reporting is received. Requested quality of service information may be considered for LMF selection. The requested quality of service information may comprise one or more of LCS accuracy, response time (e.g. latency), and/or access type (e.g. 3GPP, N3GPP). Location methods may differ depending on the access type. Location determination may correspond to retrieval of IP addressing information from the N3IWF/TNGF, for example, for WLAN access. Location determination may correspond to retrieval of geographic coordinates corresponding to a line indicator/ID, for example, for wireless access. LMF selection may be based on a RAT type (e.g., 5G NR or eLTE) and/or a serving AN node (e.g., gNB or NG-eNB) of the target wireless device. LMF selection may be based on one or more of RAN configuration information, LMF capabilities, LMF load, LMF location, an indication of either a single event report or multiple event reports, a duration of event reporting, network slicing information (e.g. S-NSSAI and/or NSI ID), etc.

LCS QoS may be used to characterize the location request. LCS QoS may either be determined by the operator or may be determined based on a negotiation with the LCS client or the AF. LCS client or the AF may optionally provide the LCS QoS in the location request. LCS QoS information may comprise one or more of: LCS QoS class, accuracy, and/or response time. The LCS QoS class may define the degree of adherence by the location service to another quality of service parameter (e.g. accuracy), if requested. The system (e.g., 5GS) may attempt to satisfy the other quality of service parameters regardless of the use of QoS class. There may be two or more LCS QoS classes (e.g., best effort class, assured class, etc.). A best effort class may define the least stringent requirement on the QoS achieved for a location request. A location estimate for a best effort class may be returned (e.g., with an appropriate indication that the requested QoS was not met), for example, if a determined location estimate does not fulfil the other QoS requirements. An appropriate error cause may be sent if no location estimate is obtained. Assured class may define the most stringent requirement on the accuracy achieved for a location request. A location estimate for an assured class that does not fulfil the other QoS requirements may be discarded and an appropriate error cause may be sent.

Figure 21:
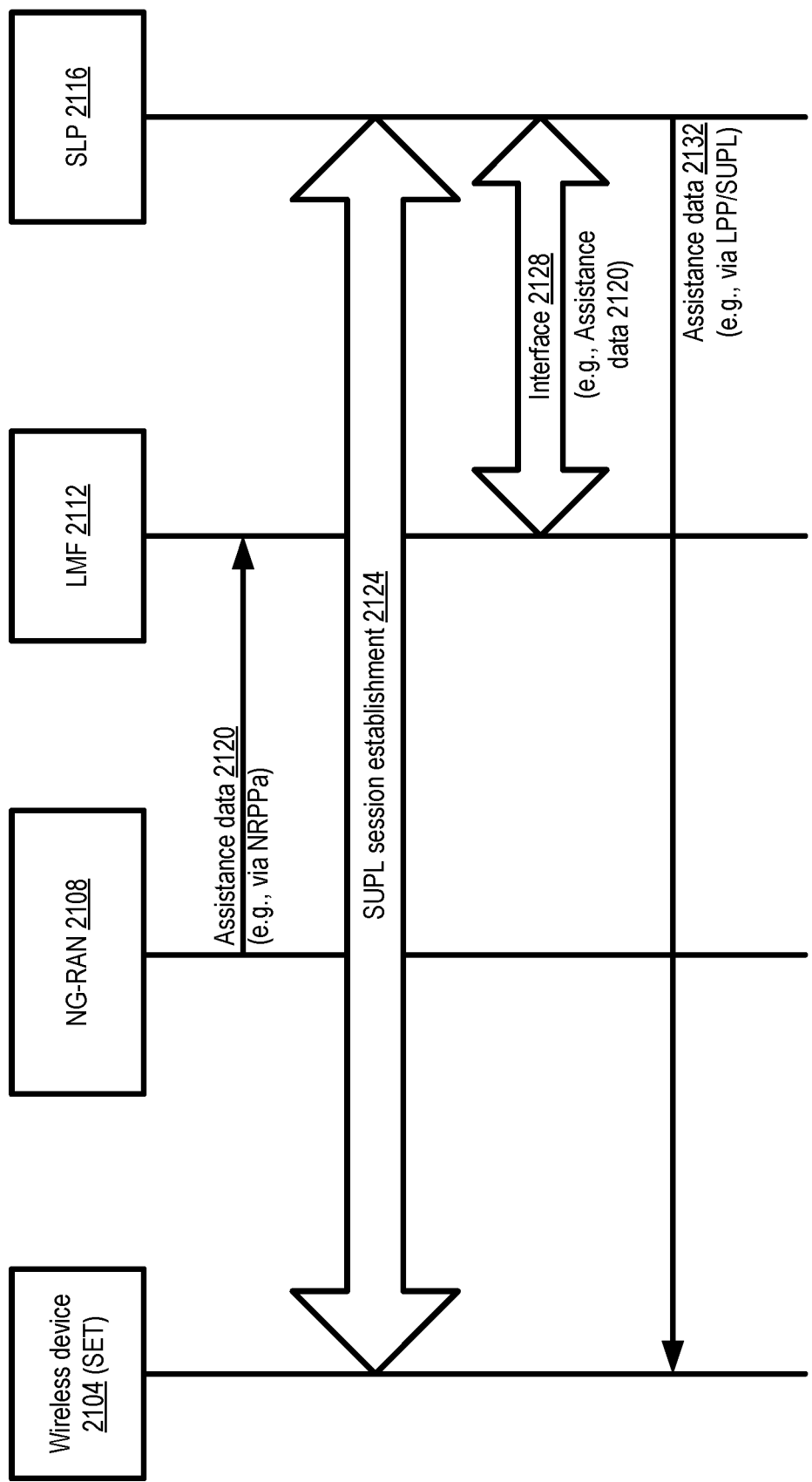
FIG. 21 shows an example communication for transfer of location assistance data to a wireless device.

FIG. 21 shows an example communication for transfer of location assistance data to a wireless device. An LMF 2112 may determine assistance data 2120 (e.g., in advance), for example, from an NG-RAN 2108. The assistance data 2120 may comprise data information for assisting positioning measurement and/or performing positioning calculations (e.g., reference time, Doppler and code phase search windows, reference position, etc.). The assistance data 2120 may comprise physical cell indicator/IDs (PCIs), global cell indicators/IDs (GCIs), etc. The assistance data 2120 may correspond to observed time difference of arrival (OTDOA) assistance data. The LMF 2112 may transfer the assistance data 2120 to a wireless device 2104 via a secure user plane location (SUPL) protocol (e.g., following SUPL session establishment 2124 between an SUPL location platform (SLP) 2116 and the wireless device 2104). The wireless device 2104 may be an SUPL-enabled terminal (SET). SUPL protocol transmissions may not be applicable to operations terminating at the NG-RAN because SUPL protocol transmissions are carried over the user plane. SUPL operations may be performed in combination with control-plane procedures via new radio positioning protocol A (NRPPa). SUPL operations in combination with control plane procedures may be used for wireless device-assisted OTDOA measurements, for example, in which an SUPL location platform (SLP) 2116 may need to provide the wireless device 2104 (in an SUPL session) with assistance data 2120 supplied by the NG-RAN 2108. SUPL operations described with respect to FIG. 21 may use a wireless device-assisted OTDOA positioning operation as an example. The existence of an interface 2128 to the LMF 2112 allows the SLP 2116 to communicate with the LMF 2112 via the SUPL positioning center (SPC), even though the positioning server in this operation is the SLP 2116. At step 2132, assistance data (e.g., the assistance data that was delivered to the LMF 2112 (e.g., via NRPPa) at step 2120) may be transferred over to the SLP 2116 for delivery to the wireless device 2104 (e.g., via LTE positioning protocol (LPP) over SUPL or via any other protocol). Other procedures may be used to implement this transfer of assistance data 2120. As shown in FIG. 21, the (R)AN 2108 may send assistance data 2120 to the LMF 2112 in advance. The LMF 2112 may send the assistance data 2120 to the SLP 2116. The SLP 2116 may send the assistance data 2120 to wireless device 2104 via LPP over SUPL.

Figure 22:
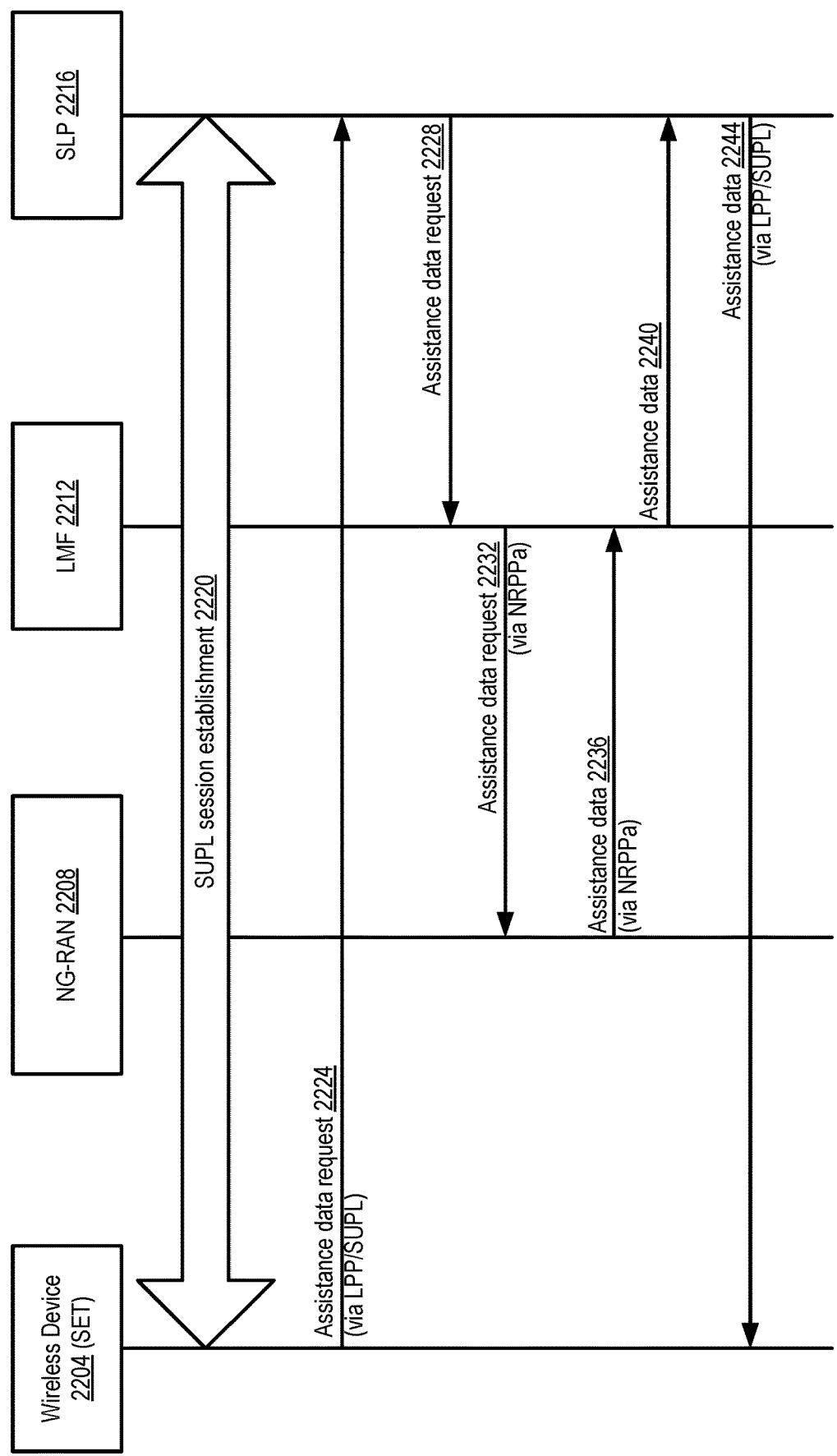
FIG. 22 shows an example communication for transfer of location assistance data to a wireless device.

FIG. 22 shows an example communication for transfer of location assistance data to a wireless device. An SUPL session establishment procedure 2220 may be performed to establish an SUPL session between a wireless device 2204 and an SLP 2216. A wireless device 2204 may send an assistance data request 2224 (e.g., via LPP over SUPL) to the SLP 2216. The assistance data request 2224 may be for OTDOA assistance data. The SLP 2216 may send an assistance data request 2228 to the LMF 2212 based on receiving the assistance data request 2224 from the wireless device 2204. At step 2232, the LMF 2212 may request assistance data from (R)AN 2208 by sending an assistance data request (e.g., via NRPPa). At step 2236, the LMF 2212 may receive assistance data from the (R)AN 2208. At steps 2240 and/or 2244, the LMF 2212 may transfer the assistance data to the wireless device 2204 (e.g., via SUPL). The LMF 2212 may retrieve the assistance data from the (R)AN 2208, for example, if the LMF 2212 does not have the assistance data. The LMF 2212 may retrieve the assistance data based on receiving control plane signaling indicating the requirement for the assistance data.

Retrieval of assistance data (e.g., as described with respect to FIGS. 21 and 22) may be transparent to the wireless device and to the actual SUPL session. Transparency of the retrieval of assistance data may be parallel to the approach used with A-GNSS, in which assistance data (such as satellite ephemerides) may be retrieved from sources entirely external to the cellular network. The delivery of assistance data to the SLP may be viewed as an independent external process for purposes of LPP over SUPL. The delivery of assistance data to the wireless device may takes place through the same mechanisms as control-plane LPP, transported through SUPL protocol.

At least some applications and/or entities in a communication network may require and/or request determination of a wireless device location (e.g., wireless device positioning). Example applications for wireless device positioning include navigation, drone positioning, electronic health (e.g., positioning of a patient), emergency services (e.g., positioning of the accident), V2X communications (e.g., positioning of guided/self-driving vehicles), factory (e.g., positioning of industrial equipment), etc. A wireless device may perform positioning measurements to determine a location of the wireless device. The wireless device may send, via a user plane transmission (e.g. via an SUPL session), the determined positioning measurements to an entity providing location services (e.g., GMLC). Determination of a position of a wireless device in a network, via user plane transmissions, may not support positioning measurements by a base station (e.g., positioning measurement reports determined by a base station). Use of wireless device-determined positioning measurements may not meet a positioning accuracy requested by some applications/devices. For example, the positioning accuracy may correspond to a horizontal positioning accuracy (e.g., 10 meters, or any other value), a vertical positioning accuracy (e.g. 3 meters, or any other value), and/or both. A wireless device may be unable to receive a positioning measurement report from a base station. The wireless device may be unable to determine the positioning of wireless device based on a positioning measurement report from the base station. A GMLC may be unable to receive positioning measurement reports from a base station. The GMLC may be unable to determine the positioning of wireless device based on the positioning measurement report from the base station.

Various examples herein may provide improved wireless device location determination. The wireless device location determination may be based on one or more user plane transmissions. A location of a wireless device may be determined based on a positioning measurement report from a base station. The wireless device may determine its location based on the positioning measurement report from the base station and/or based on the positioning measurement performed by the wireless device. For example, a base station may determine and send a positioning measurement report to a wireless device. The wireless device may determine, based on the positioning measurement report, a location of the wireless device. The wireless device may send an indication of the location, via a user plane transmission, to one or more other entities in a network.

The use of the positioning measurement report from the base station in conjunction with the positioning measurement performed by the wireless device may provide advantages such as improved accuracy and/or satisfaction of one or more specifications requested by one or more applications/devices. A wireless device may receive positioning measurement reports from a base station. The positioning measurement reports may enable the wireless device to determine the location of the wireless device. A GMLC may receive one or more positioning measurement reports from a base station. The positioning measurement report(s) may enable the GMLC to determine location of one or more wireless devices.

Figure 23:
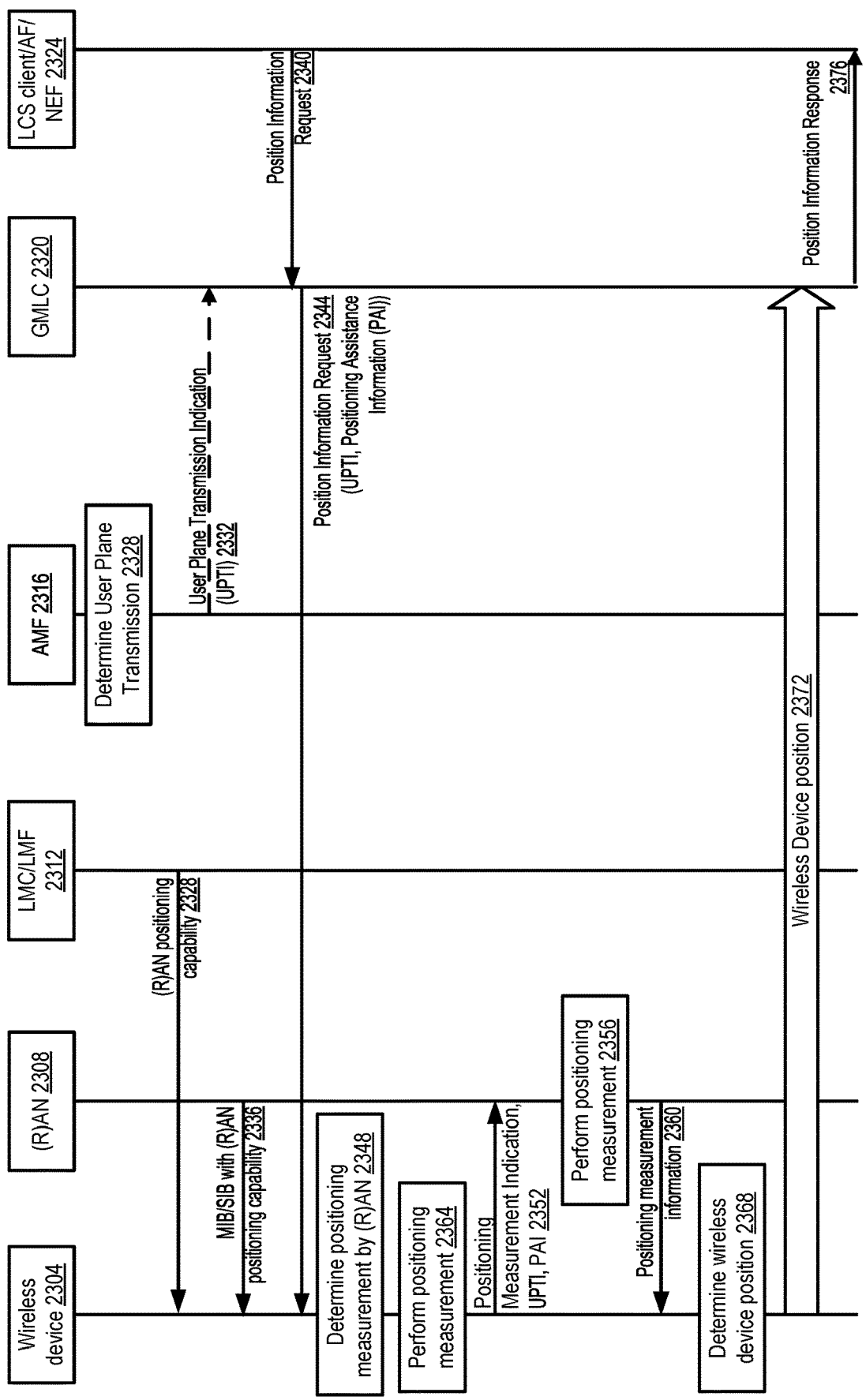
FIG. 23 shows an example communication for determination of a wireless device location.
Figure 26:
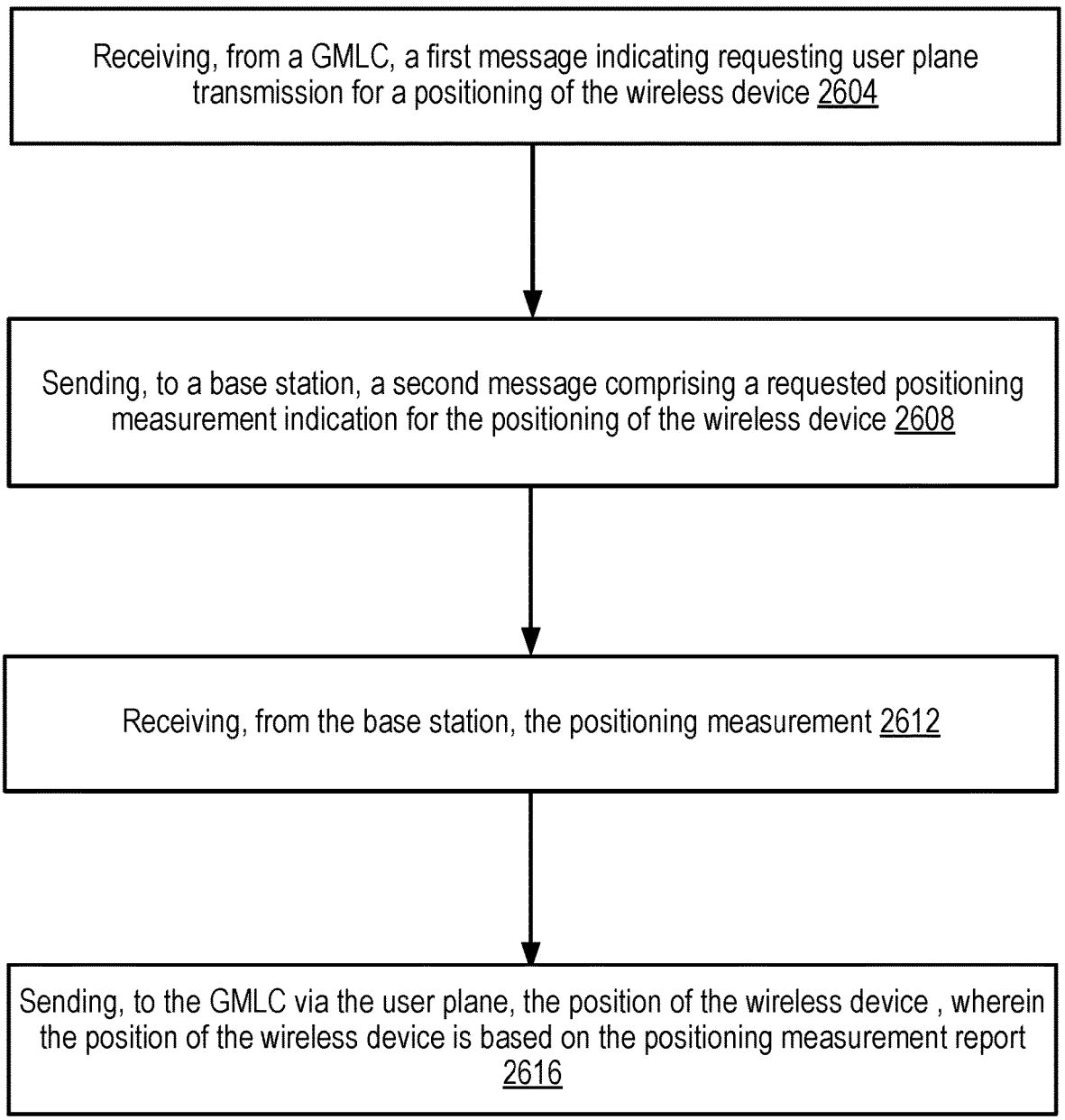
FIG. 26 shows an example method for determination of a wireless device location.

FIG. 23 shows an example communication for determination of a wireless device location (e.g., wireless device positioning). The wireless device location determination as described with respect to FIG. 23 may use a positioning measurement report, from a base station, at a wireless device and user plane transmission of a determined wireless device position. FIGS. 26 and 27 show example procedures for determination of a wireless device position in a communication network. The example procedure 2600 of FIG. 26 may be performed by a wireless device (e.g., wireless device 2304). The example procedure 2700 of FIG. 27 may be performed by a base station and/or a (R)AN (e.g., (R)AN 2308, a base station corresponding to the (R)AN 2308).

An AMF 2316 may determine network status information. An AMF 2316 may receive network status information from a network function (e.g., at least one base station, OAM, UDM). The AMF 2316 may be locally configured with network status information. The AMF 2316 may determine (e.g., step 2328) a user plane transmission for a positioning of at least one wireless device. The AMF 2316 may determine the user plane transmission for a specific wireless device (e.g., wireless device 2304). The AMF 2316 may determine the user plane transmission for at least one wireless device within a coverage of a network. The example coverage of a network may be an area (e.g., a tracking area, a base station area, an AMF area, a PLMN area, etc.). The example network may be a PLMN, a base station, an AMF, etc. The network status information may comprise at least one of: a parameter indicating that the network is overloaded; a parameter indicating that the network has low performance (e.g. may not meet QoS requirement); a parameter indicating that the network has limited resources, etc. The AMF 2316 may determine the user plane transmission for ongoing positioning procedure(s). The network and/or the wireless device may be performing a positioning measurement for a positioning of the wireless device, for example, at a time at which the AMF 2316 determines the user plane transmission. The AMF 2316 may determine the user plane transmission for subsequent positioning procedure(s). The determined user plane transmission may be used at a later time at which the positioning procedure is performed.

The AMF 2316 may send, to a GMLC 2320, a message indicating user plane transmission for a positioning of at least one wireless device in a network coverage. The AMF 2316 may send a user plane transmission request message to the GMLC 2320. The user plane transmission request message may comprise at least one of: a user plane transmission indication 2332; at least one wireless device identity/indicator for the at least one wireless device; at least one tracking area indicator/identifier; at least one base station indicator/identifier; at least one AMF indicator/identifier, at least one PLMN indicator/identifier, and/or the network status information. The user plane transmission indication 2332 may indicate user plane transmission for a positioning of the at least one wireless device in a coverage of a network. The at least one wireless device may be identified/determined by the at least one wireless device identity. The coverage of the network may be identified/determined by the at least one base station identifier, the at least one AMF identifier, and/or the at least one PLMN identifier.

The GMLC 2320 may receive a message (e.g. positioning information request 2340) from a network function 2324 and/or a wireless device. The network function 2324 may be a location services (LCS) client, a NEF, an AF, and/or a (R)AN. The positioning information request message 2340 may indicate a request/query for positioning information of the wireless device 2340. The positioning information request message 2340 may comprise one or more information elements/parameters. The positioning information request message 2340 may comprise one or more positioning information request parameters indicating one or more of the following: a wireless device identity/indicator of the wireless device 100 for which position information is requested (e.g. GPSI and/or SUPI), a parameter indicating whether the request is assured, a parameter (e.g. a required QoS) indicating requested positioning accuracy (e.g. horizontal positioning accuracy, and/or vertical positioning accuracy), a positioning report cycle indicating a request for a triggered positioning report (e.g. one-time positioning report) or a periodical positioning report, supported geographical area description (GAD) shapes, and/or an LCS client type. The positioning information request message 2340 may indicate that the requested parameters (e.g. required QoS) in the message should be guaranteed, for example, if a parameter in the positioning information request message 2340 indicates that the request is assured. The GMLC 2320 may reject the request if the GMLC 2320 cannot guaranteed the request. The positioning information request message 2340 may indicate that the requested parameters (e.g. requested QoS) in the message need not be guaranteed, for example, if a parameter in the positioning information request message 2340 indicates that the request is not assured. The GMLC 2320 may provide different parameters compared to the requested parameters, for example, if the parameter in the positioning information request message 2340 indicates that the request is not assured. The required QoS may comprise at least one of: accuracy of the positioning, response time for the positioning request, and/or LCS QoS class, etc. The LCS client type may comprise at least one of: emergency services, value added services, PLMN operator services, and/or lawful intercept services, etc.

The GMLC 2320 may perform one or more operations, for example, based on the message received from the network function and/or a wireless device. The GMLC 2320 may determine a user plane transmission for a positioning of at least one wireless device, for example, based on the positioning information request message 2340 received from the LCS client and/or the user plane transmission request message received from the AMF 2316. The GMLC 2320 may determine a user plane transmission for a positioning of at least one wireless device (e.g., the wireless device 2304), for example, based on the one or more positioning information request parameters and/or network status information. The positioning information request message 2340 may indicate a request for a periodic positioning report. The LCS client type may indicate value added service(s). The network status information may indicate that an AMF area is overloaded. The required QoS may indicate a response time for the positioning request (e.g., 200 ms, or any other time interval). The GMLC 2320 may determine a user plane transmission for a positioning of at least one wireless device in the AMF area, for example, based on one or more of the above information.

The GMLC 2320 may receive network status information from a network function (e.g. AMF, OAM, UDM). The GMLC 2320 may receive network status information from the AMF 2316 via the user plane transmission request message. The GMLC 2320 may be locally configured with network status information. The GMLC 2320 may determine a user plane transmission for a positioning of at least one wireless device, for example, based on network status information and/or local configuration. The GMLC 2320 may determine the user plane transmission for a specific wireless device. The AMF 2316 may determine the user plane transmission for at least one wireless device within a coverage of a network. The example coverage of a network may be an area (e.g. a tracking area, a base station area, an AMF area, a PLMN area, etc.). The example network may be a PLMN, a base station, an AMF, etc. The network status information may comprise at least one of: a parameter indicating that the network is overloaded; a parameter indicating that the network has low performance (e.g. may not meet QoS requirement); a parameter indicating that the network has limited resources, etc. The GMLC 2320 may determine the user plane transmission for ongoing positioning procedure(s). The ongoing positioning procedure(s) may comprise positioning measurement for a positioning of the wireless device 2304 being performed by the network and/or the wireless device 2304. The GMLC 2320 may determine the user plane transmission for subsequent (e.g., future) positioning procedure(s). The determined user plane transmission may be used at a later time at which a positioning procedure is performed.

The GMLC may send a message (e.g. positioning information request message 2344) to the wireless device 2304. The wireless device 2304 may receive (e.g., step 2604) the positioning information request message 2344. The positioning information request message 2344 may indicate a request for a user plane transmission for a positioning of the wireless device 2304. The positioning information request message 2344 may comprise at least one of: the wireless device identity/indicator of the wireless device 2304, a user plane transmission indication, assistance data for the positioning of the wireless device, the required QoS (e.g., indicating requested positioning accuracy), the positioning report cycle, and/or the LCS client type. The assistance data may be used by the wireless device 2304 and/or base station(s) to perform positioning measurements corresponding to the wireless device 2304. The GMLC 2304 may send the positioning information request message 2344 via an application level message/signaling (e.g. SIP, SMS, etc.).

The LMC/LMF 2312 may send a message, to the wireless device 2304, indicating positioning capability 2328 of at least one base station (e.g. (R)AN 2308). The LMC/LMF 2312 may send an LPP message, to the wireless device 2304, indicating positioning capability 2328 of the at least one base station. The LPP message may comprise at least one parameter indicating positioning capability 2328 of the at least one base station.

The (R)AN 2308 may send a message, to the wireless device 2304, indicating positioning capability 2336 of the (R)AN 2308. The (R)AN 2308 may send an RRC message to the wireless device 2304 indicating positioning capability 2336 of the (R)AN 2308. The RRC message may comprise at least one parameter indicating positioning capability 2336 of the (R)AN 2308. The RRC message sent from the (R)AN 2308 to the wireless device 2304 may be an MIB message, an SIB message, an RRC setup message, a RRC reconfiguration message, and/or other RRC messages sent from the base station/(R)AN 2308 to the wireless device 2304. The (R)AN 2308 may send an SIB message to the wireless device 2304. The SIB message may comprise at least one parameter indicating positioning capability 2336 of the (R)AN 2308.

The positioning capability 2328 of the (R)AN 2308 (from the LMC/LMF 2312) or the positioning capability 2336 of the (R)AN 2308 (from the (R)AN 2308) may comprise/indicate at least one of: support for enhanced cell identity (ECID) positioning method; support for OTDOA positioning method; support for uplink relative time of arrival positioning method; support for uplink reference signal received power measurements; support for uplink angle of arrival (UL AoA) measurements; support for multiple round trip time (RTT) positioning method; support for base station receive-transmit (RX-TX) time difference measurements; support for one or more other positioning methods; and/or no support for a wireless device positioning.

FIG. 24 shows an example SIB message body. The SIB message body may comprise one or more information elements indicating the positioning capability of the (R)AN. The SIB message body may comprise one or more of: otdoa-ProvideCapabilities and/or nr-UL-TDOA-ProvideCapabilities (e.g., indicating that the (R)AN 2308 supports OTDOA positioning method); ecid-ProvideCapabilities and/or nr-ECID-ProvideCapabilities (e.g., indicating that the (R)AN 2308 supports ECID positioning method); nr-Multi-RTT-ProvideCapabilities (e.g., indicating that the (R)AN 2308 supports multiple RTT positioning method); nr-UL-AoD-ProvideCapabilities (e.g., indicating that the (R)AN supports angle of departure positioning method); no-Support-Capability (e.g., indicating that the (R)AN does not support a positioning method).

The wireless device 2304 may perform one or more operations based on receiving the message (e.g., positioning information request 2344) from the GMLC 2320. The wireless device 2304 may determine a positioning method for the positioning of the wireless device 2304. The wireless device 2304 may determine a positioning method for the positioning of the wireless device 2304, for example, based on the positioning information request message 2344, the RRC message and/or a positioning capability of the wireless device. The positioning capability of the wireless device may indicate the positioning method(s)/technology(ies) supported by the wireless device 2304. The positioning capability of the wireless device may comprise/indicate at least one of: a support for ECID positioning method; a support for OTDOA positioning method; support for network-assisted GNSS methods; support for WLAN positioning method;

support for Bluetooth positioning method; support for terrestrial beacon system (TBS) positioning method; support for barometric pressure sensor positioning method; one or more other positioning methods; and/or no support for wireless device positioning.

The wireless device 2304 may determine at least one positioning method. The wireless device 2304 may determine at least one positioning method, for example, based on the user plane transmission indication, the required QoS, the LCS client type, the positioning capability of the wireless device, and/or the positioning capability of the (R)AN 2308. The at least one positioning method determined by the wireless device 2304 may be used by the wireless device 2304 and/or the (R)AN 2308 to measure the positioning of the wireless device 2304. For example, the wireless device 2304 may determine an ECID positioning method and a WLAN positioning method. The ECID positioning method may be used by the wireless device 2304 and/or the (R)AN 2308 to measure/determine the positioning of the wireless device 2304. The WLAN positioning method may be used by the wireless device 2304 to measure/determine the positioning of the wireless device 2304. The positioning information request message 2344 may indicate user plane transmission. The required QoS may indicate a requested horizontal accuracy (e.g., 10 meters, or any other quantity). The positioning capability of the wireless device 2304 may indicate that the wireless device 2304 supports ECID positioning method and/or OTDOA positioning method. The positioning capability of the base station (e.g., the (R)AN 2308) may indicate the (R)AN 2308 supports ECID positioning method and/or OTDOA positioning method. The wireless device 2304 may determine a positioning method for the positioning of the wireless device based on the positioning methods supported by the wireless device 2304 and/or the base station 2308. The wireless device 2304 may determine the use of ECID positioning method for the positioning of the wireless device 2304. The wireless device 2304 may determine the use of ECID positioning method for the positioning of the wireless device 2304, for example, based on both the wireless device 2304 and the (R)AN 2308 supporting ECID positioning method and OTDOA positioning method. The positioning information request message 2344 may indicate user plane transmission. The required QoS may indicate a requested vertical accuracy (e.g., 3 meters or any other quantity). The positioning capability of the wireless device 2304 may indicate that the the wireless device 2304 supports ECID positioning method and OTDOA positioning method. The positioning capability of the base station (e.g., (R)AN 2308) may indicate that the (R)AN 2308 supports OTDOA positioning method. The wireless device 2304 may determine OTDOA as a positioning method for the positioning of the wireless device 2304, for example, based on the wireless device 2304 supporting ECID positioning method and OTDOA positioning method, and the (R)AN 2308 supporting OTDOA positioning method. The at least one positioning method may comprise at least one of: ECID positioning method; OTDOA positioning method; WLAN positioning method; Bluetooth positioning method; Terrestrial Beacon System (TBS) positioning method; barometric pressure sensor positioning method; and/or one or more other positioning methods.

The wireless device 2304 may determine which one (or both) of the base station 2308 and/or the wireless device are to perform positioning measurement for the positioning of the wireless device 2304. The wireless device 2304 may determine which one (or both) of the base station and/or the wireless device 2304 are to perform positioning measurement for the positioning of the wireless device 2304, for example, based on the user plane transmission indication 2344, the required QoS, the LCS client type, the positioning capability of the wireless device 2304, and/or the positioning capability of the (R)AN 2308. The wireless device 2304 may determine that the wireless device 2304 may perform a positioning measurement for the positioning of the wireless device 2304 (e.g. the wireless device 2304 may execute a positioning method). The wireless device 2304 may determine (e.g., step 2348) that the base station may perform a positioning measurement for the positioning of the wireless device 2304 (e.g. the base station/(R)AN 2308 may execute a positioning method). The wireless device 2304 may determine that both the wireless device 2304 and the base station may perform positioning measurements for the positioning of the wireless device 2304 (e.g. both the wireless device 2304 and the base station/(R)AN 2308 may execute positioning method(s)).

The wireless device 2304 may perform a positioning measurement (e.g., step 2364). The wireless device 2304 may perform the positioning measurement based on a positioning method supported by the wireless device 2304 (e.g., the positioning capability of the wireless device). The wireless device 2304 may perform ECID positioning measurement (e.g. downlink ECID measurement based on the ECID positioning method). The wireless device 2304 may perform OTDOA positioning measurement (e.g. downlink OTDOA measurement based on the OTDOA positioning method). The wireless device 2304 may perform WLAN positioning measurement (e.g., based on the WLAN positioning method).

The wireless device 2304 may send a message 2352 (e.g., step 2608) to the at least one base station (e.g. (R)AN 2308). The message 2352 may be for requesting a positioning measurement for the positioning of the wireless device 2304. The wireless device 2304 may send a message 2352, for example, based on determining that the at least one base station may perform a positioning measurement. The wireless device 2304 may send, to the (R)AN 2308, an RRC message (e.g., message 2352) indicating/requesting a positioning measurement for the positioning of the wireless device 2304. The RRC message may comprise at least one of: the wireless device identity/indicator of the wireless device 2304, a requested positioning measurement indication, the user plane transmission indication, the positioning method, assistance data for the positioning of the wireless device 2304, the required QoS (e.g., indicating requested positioning accuracy), and/or the positioning report cycle. The requested positioning measurement indication may indicate a request for the (R)AN 2308 to perform positioning measurement for the positioning of the wireless device 2304, (e.g. for the user plane transmission). The assistance data and/or the required QoS may be used by the (R)AN 2308 to perform the positioning measurement. The positioning report cycle may indicate a triggered (e.g. one-time) positioning measurement report or a periodic positioning measurement report.

The RRC message sent from the wireless device 2304 to the (R)AN 2308 may be an RRCSetupRequest message, an RRCSetupComplete message, an RRCResumeComplete message, and/or other RRC messages sent from the wireless device 2304 to the base station 2308. The at least one base station ((R)AN 2308) may receive (e.g., step 2704) the message 2352 from the wireless device 2304.

FIG. 25 shows an example of an RRC message body of an RRC message from a wireless device (e.g., the wireless device 2304) to a base station (e.g., (R)AN 2308). The RRC message may correspond to an RRCSetupRequest message. An IE (e.g., PositionMeasure IE) may comprise one or more parameters indicating a requested positioning measurement for the positioning of the wireless device 2308.

The at least one base station (e.g. the (R)AN 2308) may perform one or more operations based on receiving the message from the wireless device 2304. The (R)AN 2308 may perform a positioning measurement (e.g., step 2356, step 2708) based on the information elements/parameters received from the wireless device 2304 (e.g., via message 2352). The (R)AN 2308 may perform positioning measurement based on the positioning method indicated in the message 2352. The (R)AN 2308 may perform uplink ECID positioning measurement for the positioning of the wireless device 2304 (e.g., based on the ECID positioning method). The (R)AN 2308 may perform uplink OTDOA positioning measurement for the positioning of the wireless device 2304 (e.g., based on the OTDOA positioning method). The (R)AN 2308 may perform multiple RTT positioning measurement for the positioning of the wireless device 2304 (e.g., based on the multiple-RTT positioning method). The (R)AN 2308 may send (e.g., step 2712), to the wireless device 2304, a message 2360 indicating positioning measurement for the positioning of the wireless device 2304. The wireless device 2304 may receive (e.g., step 2612) the message 2360 indicating the positioning measurement. The (R)AN 2308 may send an RRC message to the wireless device 2304 reporting the positioning measurement. The RRC message sent by the (R)AN 2308 to the wireless device 2304 may comprise a positioning measurement report. The positioning measurement report may comprise at least one of: an ECID positioning measurement report, an OTDOA positioning measurement report, a relative time of arrival report, an uplink reference signal received power measurements report, an uplink AoA measurements report, a multiple RTT positioning measurement report, a base station RX-TX time difference measurements report, and/or any other positioning measurement report. The RRC message sent by the (R)AN 2308 to the wireless device 2304 may be an RRCSetup message, a RRCReconfiguration message, a RRCResume message and/or any other RRC message.

The wireless device 2304 may perform one or more operations based on the positioning measurement report(s) received from the at least one base station (e.g. the (R)AN 2308) and/or the positioning measurement performed by the wireless device 2304. The wireless device 2304 may perform the one or more operations based on receiving the message 2360 from the at least one base station (e.g. the (R)AN 2308). The wireless device 2304 may determine (e.g., step 2368) the position of the wireless device 2304, for example, based on the positioning measurement report(s) received from the at least one base station and/or the positioning measurement performed by the wireless device 2304. The wireless device 2304 may determine the position of the wireless device 2304, for example, based on the ECID positioning measurement report (e.g. uplink ECID measurement) from the (R)AN 2308 and/or the ECID positioning measurement (e.g. downlink ECID measurement) performed by the wireless device 2308. The wireless device 2304 may determine the position of the wireless device 2304, for example, based on the OTDOA positioning measurement report (e.g. uplink OTDOA measurement) from the (R)AN 2308, the OTDOA positioning measurement (e.g. downlink OTDOA measurement) performed by the wireless device 2304, and/or Bluetooth positioning measurement performed by the wireless device 2304.

The wireless device 2304 may send the determined position of the wireless device 2304 to the GMLC 2320 via user plane (e.g., step 2372, step 2616). The wireless device 2304 may send the position of the wireless device 2304 via an existing user plane session (e.g. a user plane of a PDU session). The wireless device 2304 establish a new user plane session (e.g. a user plane of a PDU session) and send the position of the wireless device 2304 via the new user plane session. The wireless device 2304 may send the position of the wireless device 2304 via an SUPL session.

The GMLC 2320 may send a response message (e.g. positioning information response message 2376) to the network function 2324 (e.g., LCS client), for example, based on receiving the positioning from the wireless device 2304, and/or based on the position information request 2340. The positioning information response message 2376 may comprise the positioning of the wireless device 2304. The GMLC 2320 may send the positioning of the wireless device 2304 to the network function 2324 periodically, for example, if the GMLC 2320 receives the positioning of the wireless device 2304 periodically from the wireless device 2304.

Figure 28:
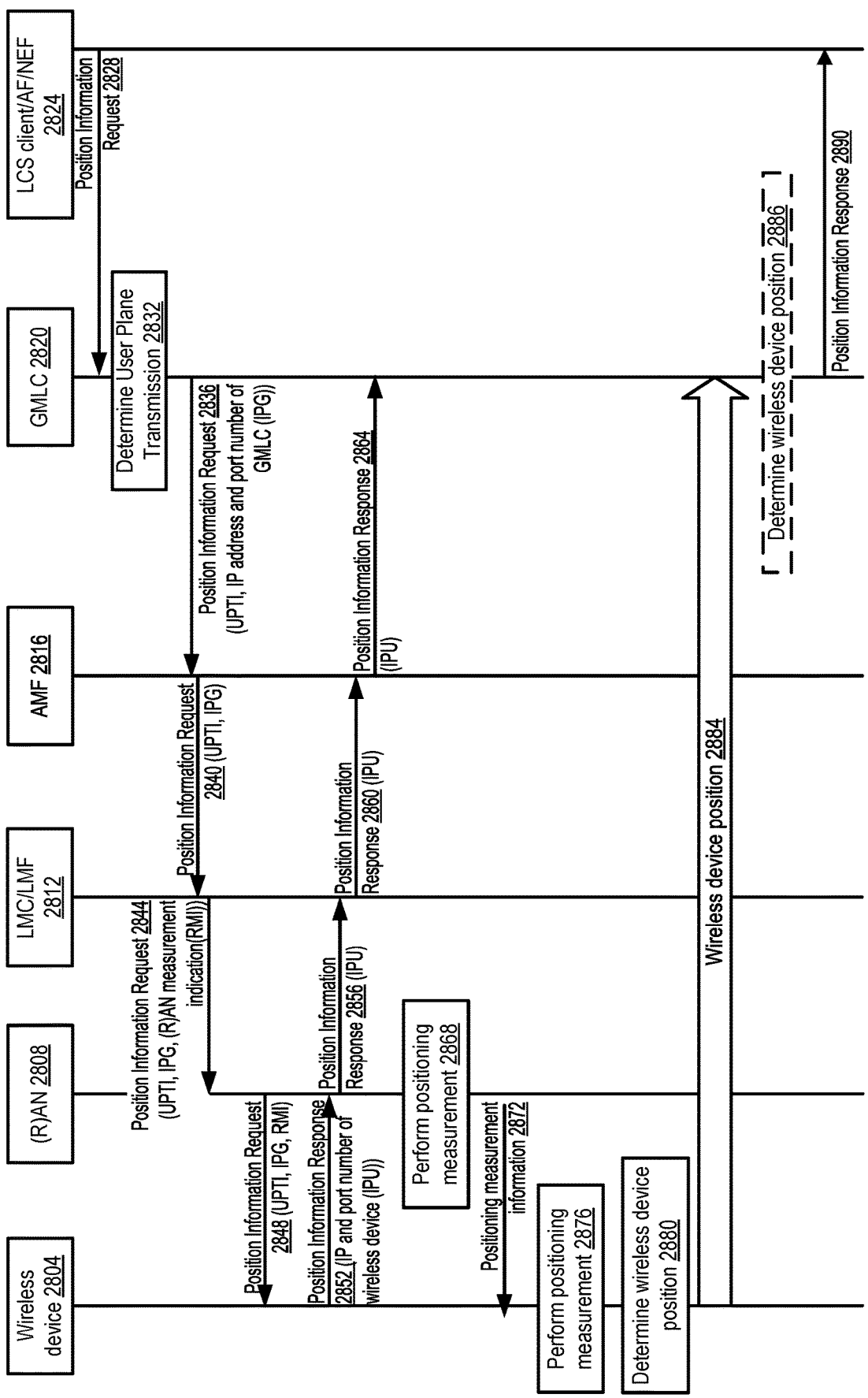
FIG. 28 shows an example communication for determination of a wireless device location.

FIG. 28 shows an example communication for determination of a wireless device location (e.g., wireless device positioning). A positioning information request, for determination of wireless device positioning, may be sent by a GMLC 2820 via an AMF 2316. A (R)AN 2808 and/or a wireless device 2804 may perform positioning measurements for determining the wireless device position.

A GMLC 2820 may receive a message (e.g. a positioning information request message 2828) from a network function 2824 and/or a wireless device 2804. The network function 2824 may be an LCS client, an NEF, an AF, and/or a (R)AN (e.g., the (R)AN 2808). The positioning information request message 2828 may indicate a request/query for positioning information of the wireless device 2804. The positioning information request message 2828 may comprise one or more information elements/parameters. The positioning information request message 2828 may comprise one or more positioning information request parameters. The one or more positioning information request parameters may comprise/indicate one or more of: a wireless device identity/indicator of the wireless device 2804 for which position information is requested (e.g. GPSI and/or SUPI), a parameter indicating whether the request is assured, a parameter (e.g. a required QoS) indicating requested positioning accuracy (e.g. horizontal positioning accuracy, and/or vertical positioning accuracy), a positioning report cycle indicating a request for a triggered positioning report (e.g. one-time positioning report) or a periodic positioning report, supported GAD shapes, and/or an LCS client type. The requested parameters (e.g. required QoS) in the message may be guaranteed, for example, if the request is assured. The GMLC 2820 may reject the request if the GMLC 2820 is unable to guarantee the request. The requested parameters (e.g. requested QoS) in the message need not be guaranteed, for example, if the request is not assured. The GMLC 2820 may provide different parameters compare to the requested parameters, for example, if the request is not assured. The required QoS may comprise/indicate at least one of: accuracy of the positioning determination, response time for the positioning request, LCS QoS class, etc. The LCS client type may comprise at least one of: emergency services, value added services, PLMN operator services, and/or lawful intercept services.

The GMLC 2820 may perform one or more operations, for example, based on the position information request message 2828. The GMLC 2820 may send a message (e.g.

a network status request) to an AMF 2816, a UDM, and/or OAM. The AMF, the UDM, and/or the OAM may be serving the wireless device 2804. The network status request message may indicate a request for network status information. The network status request message may comprise a parameter indicating a request for network status information.

The AMF 2816 may send a response message (e.g. a network status response) to the GMLC 2820, for example, based on receiving the message from the GMLC 2820. The network status response may comprise network status information. The definition, scope, and/or usage of the network status information may be similar to the definition, scope, and/or usage of the network status information described with respect to FIG. 23.

The GMLC 2820 may determine (e.g., step 2832) a user plane transmission for a positioning of at least one wireless device, for example, based on the positioning information request message 2828 and/or the network status response message received from the AMF 2816. The GMLC 2820 may determine a user plane transmission for a positioning of at least one wireless device, for example, based on the one or more positioning information request parameters and/or network status information. The positioning information request message 2828 may indicate requesting for a periodic positioning report. The LCS client type may indicate a value added service. The network status information may indicate that an AMF area is overloaded. The required QoS may indicate a response time for the positioning request (e.g., 200 ms, or any other time interval). The GMLC 2820 may determine a user plane transmission for a positioning of at least one wireless device in the AMF area based on the information in the positioning information request message 2828.

The GMLC 2820 may be locally configured with network status information. The GMLC 2820 may determine a user plane transmission for a positioning of at least one wireless device, for example, based on network status information and/or local configuration. The GMLC 2820 may determine the user plane transmission for a specific wireless device. The AMF 2816 may determine the user plane transmission for at least one wireless device within a coverage of a network. The coverage of a network may be an area (e.g. a tracking area, a base station area, an AMF area, a PLMN area, etc.). The example network may be a PLMN, a base station, an AMF, etc. The network status information may comprise at least one of: a parameter indicating that the network is overloaded; a parameter indicating that the network has low performance (e.g. may not meet QoS requirement); and/or a parameter indicating that the network has limited resources. The GMLC 2820 may determine the user plane transmission for ongoing positioning procedure(s). The ongoing positioning procedure(s) may correspond to positioning measurements being currently performed by the network and/or the wireless device 2804 for a positioning of the wireless device 2804. The GMLC 2820 may determine the user plane transmission for subsequent/future positioning procedure(s). The determined user plane transmission may be used at a later time at which the positioning procedure is performed.

The GMLC may send a message (e.g. positioning information request message 2836) to the AMF 2816. The positioning information request message 2836 may indicate a request for user plane transmission for a positioning of the wireless device 2804. The positioning information request message 2836 may comprise at least one of: the wireless device identity/indicator of the wireless device 2804, the user plane transmission indication, a user plane address of the GMLC 2820 (e.g. an IP address and/or TCP/UDP port number), the required QoS (e.g., indicating requested positioning accuracy), the positioning report cycle, and/or the LCS client type. The user plane transmission indication may indicate a request for user plane transmission for a positioning of the wireless device 2804. The user plane address of the GMLC 2820 may be used for the user plane transmission for the positioning of the wireless device 2804. The wireless device 2804 may send/indicate the positioning of the wireless device 2804 to the user plane address of the GMLC 2820, as further described herein.

The AMF 2816 may send a message (e.g. a positioning information request message 2840) to an LMC/LMF 2812. The positioning information request message 2840 may indicate a request for user plane transmission for the positioning of the wireless device 2804. The LMC/LMF 2812 may be serving the wireless device 2804. The positioning information request message 2840 may comprise one or more information elements/parameters (e.g. the user plane transmission indication) received from the GMLC 2820.

The LMC/LMF 2812 may perform one or more operations, for example, based on the positioning information request message 2840. The LMC/LMF 2812 may determine a positioning method for the positioning of the wireless device, for example, based on the one or more information elements/parameters (e.g. the user plane transmission indication) received from the AMF 2816, the positioning capability of the wireless device 2804, and/or the positioning capability of the (R)AN 2808. The determination of the positioning method may be in a manner similar to the determination of the positioning method as described with respect to FIG. 23.

The LMC/LMF 2812 may send, to the wireless device 2804, a message (e.g. an LPP message, a positioning information request message). The positioning information request message may indicate a request for user plane transmission for the positioning of the wireless device 2804. The positioning information request message sent to the wireless device 2804 may comprise one or more information elements/parameters (e.g. the user plane transmission indication) received from the AMF 2816. The positioning information request message sent to the wireless device 2804 may comprise/indicate the positioning method. The positioning information request message sent to the wireless device 2804 may comprise assistance data for the positioning of the wireless device 2804.

The LMC/LMF 2812 may send, to the (R)AN 2808, a message (e.g. a positioning information request message 2844). The positioning information request message 2844 may indicate a request for user plane transmission for the positioning of the wireless device 2804. The positioning information request message 2844 may comprise/indicate one or more information elements/parameters (e.g. the user plane transmission indication) received from the AMF 2816. The positioning information request message 2844 may indicate the positioning method. The positioning information request message 2844 may comprise assistance data for the positioning of the wireless device 2804.

The (R)AN 2808 may send, to the wireless device 2804, a message (e.g. a positioning information request 2848, an RRC message), for example, based on the message received from the LMC/LMF 2812. The message may indicate a request for user plane transmission for the positioning of the wireless device 2804. The RRC message sent, to the wireless device 2804, may comprise one or more information elements/parameters (e.g. the user plane transmission indication, positioning method) received from the LMC/LMF

2812. The RRC message, sent to the wireless device 2804, may comprise assistance data for the positioning of the wireless device 2804. The RRC message sent to the wireless device 2804 may indicate the positioning method. The RRC message, sent from the (R)AN 2808 to the wireless device 2804, may be an RRCSetup message, a RRCReconfiguration message and/or any other RRC message.

The wireless device 2804 may perform one or more operations, for example, based on (e.g., in response to) the message received from the LMC/LMF 2812, and/or based on the message received from the (R)AN 2808. The wireless device 2804 may send a response message (e.g. an RRC message, a positioning information response 2852) to the (R)AN 2808. The RRC message may comprise at least one of: the wireless device identity/indicator of the wireless device 2804, a user plane transmission confirmation indication, and/or a user plane address of the wireless device 2804 (e.g. an IP address and/or TCP/UDP port number). The user plane transmission confirmation indication may indicate that the wireless device 2804 has accepted the request to send positioning of the wireless device 2804 via user plane. The user plane address of the wireless device 2804 may be used for the user plane transmission for the positioning of the wireless device 2804. The wireless device 2804 may use the user plane address of the wireless device 2804 to send/indicate the positioning of the wireless device 2804 to the GMLC 2820. The GMLC may send an acknowledgement data package (e.g. TCP ACK) to the wireless device 2804 based on the user plane address.

The (R)AN 2808 may send a response message (e.g. positioning information response message 2856) to the LMC/LMF 2812. The (R)AN 2808 may send the positioning information response message 2856) to the LMC/LMF 2812, for example, based on (e.g., in response to) receiving the positioning information response message 2852 from the wireless device 2804, and/or the positioning information request message 2844 from the LMC/LMF 2812. The positioning information response message 2856 may comprise one or more information elements/parameters (e.g. the user plane transmission confirmation indication, user plane address of the wireless device 2804) received from the wireless device 2804.

The LMC/LMF 2812 may send a response message (e.g. a positioning information response message 2860) to the AMF 2816. The LMC/LMF 2812 may send the positioning information response message 2860, for example, based on (e.g., in response to) receiving the positioning information response message 2856 from the (R)AN 2808, and/or the positioning information request message 2840 from the AMF 2816. The positioning information response message 2860 send may comprise one or more information elements/parameters (e.g. the user plane transmission confirmation indication, user plane address of the wireless device 2808) received from the (R)AN 2808.

The AMF 2816 may send a response message (e.g. a positioning information response 2864) to the GMLC 2820. The AMF 2816 may send the positioning information response 2864), for example, based on (e.g., in response to) the receiving the positioning information response message 2860 from the LMC/LMF 2812, and/or the positioning information request message 2836 from the GMLC 2820. The positioning information response message 2864 may comprise one or more information elements/parameters (e.g. the user plane transmission confirmation indication, user plane address of the wireless device 2804) received from the LMC/LMF 2812.

The (R)AN 2808 may perform (e.g., step 2868) a positioning measurement based on the positioning method. The (R)AN 2808 may perform an uplink ECID positioning measurement for the positioning of the wireless device 2804. The (R)AN 2808 may perform an uplink OTDOA positioning measurement for the positioning of the wireless device 2804. The (R)AN 2808 may perform multiple RTT positioning measurement for the positioning of the wireless device 2804. The (R)AN 2808 may send, to the wireless device 2804, a message indicating positioning measurement (e.g., positioning measurement information 2872) for the positioning of the wireless device 2804. The (R)AN 2808 may send an RRC message to the wireless device 2804 reporting the positioning measurement. The RRC message, sent by the (R)AN 2808 to the wireless device 2804, may comprise a positioning measurement report (e.g., indicating the positioning measurement information 2872). The positioning measurement report may comprise at least one of: an ECID positioning measurement report, an OTDOA positioning measurement report, a relative time of arrival report, an uplink reference signal received power measurements report, an uplink angle of arrival (UL AoA) measurements report, a multiple RTT positioning measurement report, a base station RX-TX time difference measurements report, and/or any other type of positioning measurement report. The RRC message, sent by the (R)AN 2808 to the wireless device 2804, may be an RRCSetup message, a RRCReconfiguration, a RRCResume and/or any other RRC message.

The wireless device 2804 may perform (e.g., step 2876) a positioning measurement. The wireless device 2804 may perform the positioning measurement in a manner similar to as described with respect to FIG. 23 (e.g., step 2364).

The wireless device 2804 may perform one or more operations, for example, based on (e.g., in response to) receiving the message from the (R)AN 2808. The wireless device 2804 may (e.g., step 2880) determine a position of the wireless device 2804, for example, based on the positioning measurement report received from the (R)AN 2808 and/or the positioning measurement performed by the wireless device 2804. The wireless device 2804 may determine the position of the wireless device 2804, for example, based on the ECID positioning measurement report (e.g. uplink ECID measurement) from the (R)AN 2808 and/or the ECID positioning measurement (e.g. downlink ECID measurement) performed by the wireless device 2804. The wireless device 2804 may determine the position of the wireless device 2804, for example, based on the OTDOA positioning measurement report (e.g. uplink OTDOA measurement) from the (R)AN 2808, the OTDOA positioning measurement (e.g. downlink OTDOA measurement) performed by the wireless device 2804, and/or Bluetooth positioning measurement performed by the wireless device 2804.

The wireless device 2804 may send/indicate (e.g., step 2884) the position of the wireless device 2804 to the GMLC 2820 via the user plane. The wireless device 2804 may send/indicate the position of the wireless device 2804 via an existing user plane session (e.g. a user plane of a PDU session). The wireless device 2804 establish a new user plane session (e.g. a user plane of a PDU session) and send/indicate the position of the wireless device 2804 via the new user plane session. The wireless device 2804 may send/indicate the position of the wireless device 2804 via an SUPL session. The wireless device 2804 may send a TCP/IP data packet to the GMLC 2820. The payload of the TCP/IP data packet may comprise/indicate the position of the wireless device 2804. The source IP address of the TCP/IP data packet may be the user plane address (e.g. user plane IP address) of the wireless device 2804. The source port number of the TCP/IP data pack may be the port number of the user plane address of the wireless device 2804. The destination IP address of the TCP/IP data packet may be the IP address of the user plane address of the GMLC 2820. The destination port number of the TCP/IP data pack may be the port number of the user plane address of the GMLC 2820.

The GMLC 2820 may send a response message (e.g. positioning information response message 2890) to the network function 2824 (e.g., LCS client). The GMLC 2820 may send the positioning information response message 2890 to the network function 2824, for example, based on (e.g., in response to) receiving a message from the wireless device 2804 (e.g. positioning as received at step 2884), and/or the positioning information request message 2828. The positioning information response message 2890 may comprise/indicate the positioning of the wireless device 2804. The GMLC 2820 may send/indicate the position of the wireless device 2804 to the network function 2824 periodically, for example, if the GMLC 2820 receives the position of the wireless device 2804 periodically from the wireless device 2804.

The wireless device 2804 may send a positioning report to the GMLC 2820 via user plane. The positioning report may comprise/indicate the positioning measurement performed by the wireless device 2804 (e.g., step 2876) and/or the positioning measurement performed by the (R)AN 2808 (e.g., step 2868). The GMLC 2820 may determine (e.g., step 2886) the position of the wireless device 2886, for example, based on the positioning report. The GMLC 2820 may send a response message (e.g. a positioning information response message 2890) to the network function 2824, for example, based on (e.g., in response to) determining the position of the wireless device 2804 and/or receiving the positioning information request message 2828. The positioning information response message 2890 may comprise/indicate the position of the wireless device 2804.

Figure 29:
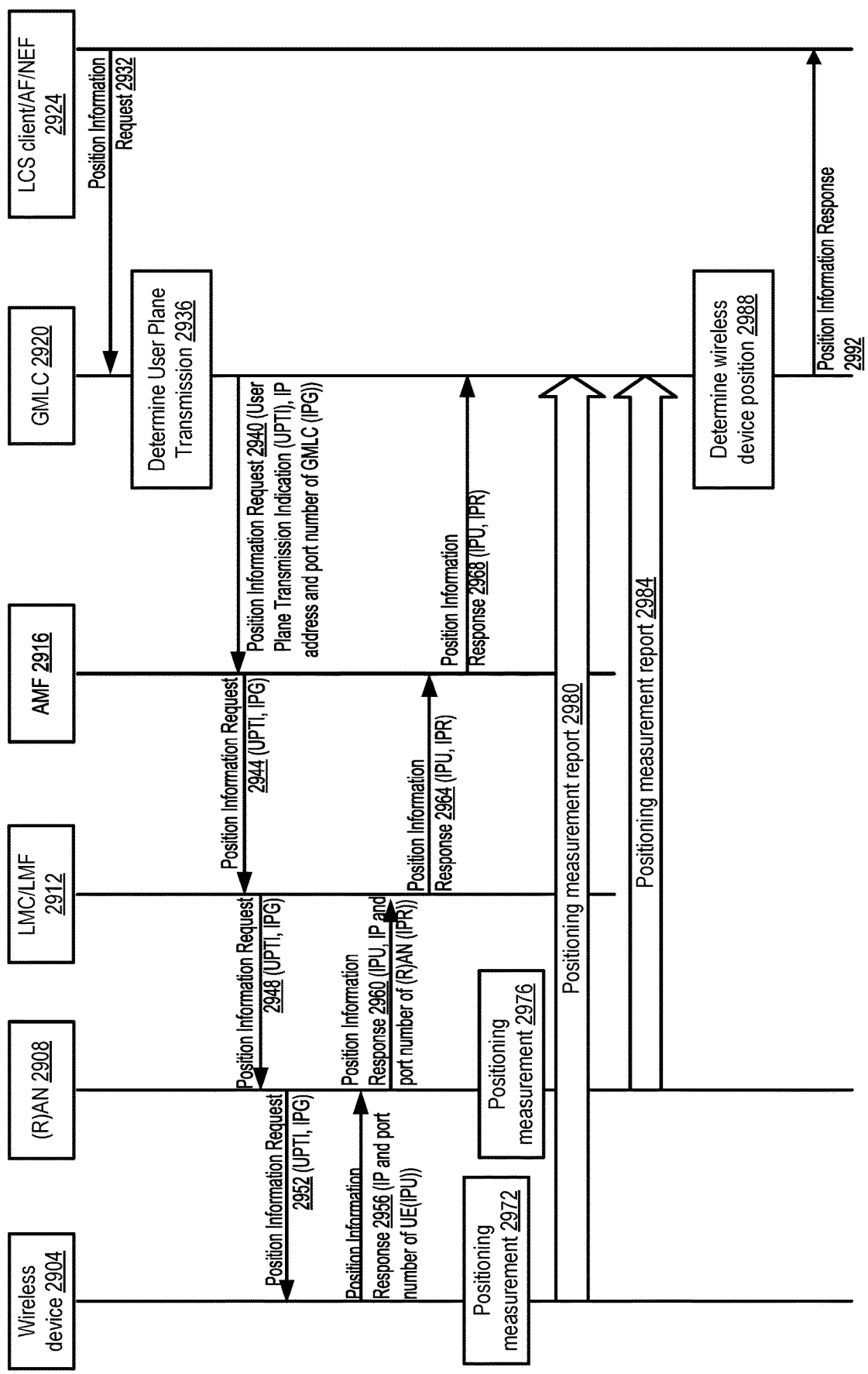
FIG. 29 shows an example communication for determination of a wireless device location.

FIG. 29 shows an example communication for determination of a wireless device location (e.g., wireless device positioning). A wireless device 2904 and a (R)AN 2908 (e.g., a base station) may send/indicate respective positioning measurements to an GMLC 2920. The GMLC 2920 may determine a wireless device position based on the positioning measurements.

The GMLC 2920 may receive a message (e.g. a positioning information request message 2932) from a network function 2924 and/or a wireless device (e.g., the wireless device 2904). The network function 2924 may be an LCS client, an NEF, an AF, and/or a (R)AN (e.g., the (R)AN 2908). The positioning information request message 2932 may indicate a request/query for positioning information of the wireless device 2904. The positioning information request message 2932 may comprise one or more information elements/parameters. The positioning information request message 2932 may comprise one or more positioning information request parameters indicating one or more of the following: a wireless device identity/indicator (e.g. GPSI and/or SUPI) of the wireless device 2904 for which positioning information is requested, a parameter indicating whether the request is assured, a parameter (e.g. a required QoS) indicating a requested positioning accuracy (e.g. horizontal positioning accuracy, and/or vertical positioning accuracy), a positioning report cycle indicating a request for a triggered positioning report (e.g. a one-time positioning report) or a periodic positioning report, supported GAD shapes, and/or an LCS client type. The requested parameters (e.g. required QoS) in the message may be guaranteed, for example, if the request is assured. The GMLC 2920 may reject the request, for example, if the GMLC cannot guarantee the request. The requested parameters (e.g. requested QoS) in the message may not be guaranteed, for example, if the request is not assured. The GMLC 2920 may provide different parameters compared to the requested parameters, for example, if the request is not assured. The required QoS may comprise/indicate at least one of: an accuracy of the positioning, a response time for the positioning request, an LCS QoS class, etc. The LCS client type may comprise/indicate at least one of: emergency services, value added services, PLMN operator services, lawful intercept services, etc.

The GMLC 2920 may perform one or more operations, for example, based on (e.g., in response to) receiving the message received from the network function 2924 and/or a wireless device. The GMLC 2920 may send a message (e.g. a network status request) to an AMF 2916, a UDM, and/or OAM. The AMF, the UDM, and/or the OAM may be serving the wireless device 2904. The network status request message may indicate a request for network status information. The network status request message may comprise a parameter indicating a request for network status information.

The AMF 2916 may send a response message (e.g. a network status response) to the GMLC 2920, for example, based on receiving the message. The network status response may comprise network status information. The definition, scope, and/or usage of the network status information may be similar to the definition, scope, and/or usage of the network status information described above with respect to FIG. 23.

The GMLC 2920 may determine (e.g., step 2936) a user plane transmission for a positioning of at least one wireless device, for example, based on receiving the positioning information request message 2932 from the network function 2924 and/or the network status response message from the AMF 2916. The GMLC 2920 may determine (e.g., step 2936) a user plane transmission for a positioning of at least one wireless device, for example, based on the one or more positioning information request parameters and/or network status information. The positioning information request message 2932 may indicate request for a periodic positioning report. The LCS client type may indicate value added services. The network status information may indicate that an AMF area is overloaded. The required QoS may indicate a response time for the positioning request (e.g., 200 ms, or any other time interval). The GMLC 2920 may determine a user plane transmission for a positioning of at least one wireless device in the AMF area, for example, based on the above information.

The GMLC 2920 may be locally configured with network status information. The GMLC 2920 may determine a user plane transmission for a positioning of at least one wireless device, for example, based on network status information and/or local configuration. The GMLC 2920 may determine the user plane transmission for a specific wireless device. The AMF 2916 may determine the user plane transmission for at least one wireless device within a coverage of a network. The example coverage of a network may be an area (e.g. tracking area, a base station area, an AMF area, a PLMN area, etc.). The example network may be a PLMN, a base station, an AMF, etc. The network status information may comprise at least one of: a parameter indicating that the network is overloaded; a parameter indicating that the network has low performance (e.g. may not meet QoS requirement); a parameter indicating that the network has limited resource(s), etc. The GMLC 2920 may determine the user plane transmission for ongoing positioning procedure(s). The ongoing positioning procedure(s) may correspond to positioning measurements being currently performed by the network and/or the wireless device 2904 for a positioning of the wireless device 2904. The GMLC 2920 may determine the user plane transmission for subsequent/future positioning procedure(s). The determined user plane transmission may be used at a later time at which a positioning procedure may be performed.

The GMLC 2920 may send a message (e.g. a positioning information request message 2940) to the AMF 2916. The positioning information request message 2940 may indicate a request for user plane transmission for a positioning of the wireless device 2904. The positioning information request message 2940 may comprise at least one of: the wireless device identity/indicator, the user plane transmission indication, user plane address of the GMLC 2920 (e.g. an IP address and/or TCP/UDP port number), the required QoS indicating requested positioning accuracy, the positioning report cycle, and/or the LCS client type. The user plane transmission indication may indicate a request for user plane transmission for a positioning of the wireless device 2904. The user plane address of the GMLC may be used for the user plane transmission for the positioning of the wireless device 2904. The wireless device 2904 may send/indicate the positioning of the wireless device 2904 to the user plane address of the GMLC 2920.

The AMF 2916 may send a message (e.g. a positioning information request message 2944) to an LMC/LMF 2912. The positioning information request message 2944 may request a user plane transmission for the positioning of the wireless device 2904. The LMC/LMF 2912 may be serving the wireless device 2904. The positioning information request message 2944 may comprise one or more information elements/parameters (e.g. the user plane transmission indication) received from the GMLC 2920.

The LMC/LMF 2912 may perform one or more operations, for example, based on (e.g., in response to) the positioning information request message 2944. The LMC/LMF 2912 may determine a positioning method for the positioning of the wireless device 2904, for example, based on the one or more information elements/parameters (e.g. the user plane transmission indication) received from the AMF 2916, based on the positioning capability of the wireless device 2904, and/or based on the positioning capability of the (R)AN 2908. The determination of the positioning method may be similar to the determination of the positioning method as described above with respect to FIG. 23.

The LMC/LMF 2912 may send to the wireless device 2904 a message (e.g. an LPP message, a positioning information request message). The positioning information request message may indicate a request for user plane transmission for the positioning of the wireless device 2904. The positioning information request message sent to the wireless device 2904 may comprise one or more information elements/parameters (e.g. the user plane transmission indication) received from the AMF 2916. The positioning information request message sent to the wireless device 2904 may indicate the positioning method. The positioning information request message sent to the wireless device 2904 may comprise assistance data for the positioning of the wireless device 2904.

The LMC/LMF 2912 may send, to the (R)AN 2908, a message (e.g. a positioning information request message 2948). The positioning information request message 2948 may indicate a request for user plane transmission for the positioning of the wireless device 2904. The positioning information request message 2948 may comprise one or more information elements/parameters (e.g. the user plane transmission indication) received from the AMF 2916. The positioning information request message 2948 may comprise/indicate the positioning method. The positioning information request message 2948 may comprise assistance data for the positioning of the wireless device 2904.

The (R)AN 2908 may send, to the wireless device 2904, a message (e.g. a positioning information request message 2952, an RRC message). The RRC message may indicate a request for user plane transmission for the positioning of the wireless device 2904. The RRC message sent to the wireless device 2904 may comprise one or more information elements/parameters (e.g. the user plane transmission indication, positioning method) received from the LMC/LMF 2912. The RRC message sent to the wireless device 2904 may comprise assistance data for the positioning of the wireless device 2904. The RRC message sent to the wireless device 2904 may comprise/indicate the positioning method. The RRC message sent from the (R)AN 2908 to the wireless device 2904 may be an RRCSetup message, an RRCReconfiguration message, and/or any other RRC message.

The wireless device 2904 may perform one or more operations, for example, based on (e.g., in response to) receiving the message from the LMC/LMF 2912, and/or the message from the (R)AN 2908. The wireless device 2904 may send a response message (e.g. a position information response message 2956, an RRC message) to the (R)AN 2908. The RRC message may comprise at least one of: the wireless device identity/indicator, a wireless device user plane transmission confirmation indication, and/or user plane address of the wireless device 2904 (e.g. an IP address and/or TCP/UDP port number). The wireless device user plane transmission confirmation indication may indicate that the wireless device 2904 has accepted the request to send positioning of the wireless device 2904 via user plane. The user plane address of the wireless device 2904 may be used for the user plane transmission for the positioning of the wireless device 2904. The wireless device 2904 may use the user plane address of the wireless device 2904 to send the positioning of the wireless device 2904 to the GMLC 2920. The GMLC 2920 may send acknowledgement data package (e.g. TCP ACK) to the user plane address of the wireless device 2904.

The (R)AN 2908 may send a response message (e.g. a positioning information response message 2960) to the LMC/LMF 2912. The (R)AN 2908 may send the positioning information response message 2960 to the LMC/LMF 2912, for example, based on (e.g., in response to) the message (e.g. the position information response message 2956) received from the wireless device 2904, and/or in response to the message (e.g. the position information request message 2948) received from the LMC/LMF 2912. The positioning information response message 2960 sent to the LMC/LMF 2912 may comprise one or more information elements/parameters (e.g. the wireless device user plane transmission confirmation indication, user plane address of the wireless device 2904) received from the wireless device 2904. The wireless device user plane transmission confirmation indication may indicate both the wireless device 2904 and/or the (R)AN 2908 has (have) accepted the request to send the positioning of the wireless device 2904 via user plane. The positioning information response message 2960 may comprise a (R)AN user plane transmission confirmation indication and/or user plane address of the (R)AN 2908. The (R)AN user plane transmission confirmation indication may indicate that the (R)AN 2908 has accepted the request to send the positioning of the wireless device 2904 via user plane. The user plane address of the (R)AN 2908 may be used for the user plane transmission for the positioning of the wireless device 2904. The (R)AN 2908 may use the user plane address of the (R)AN 2908 to send/indicate the positioning of the wireless device 2904 to the GMLC 2920. The GMLC 2920 may send an acknowledgement data package (e.g. TCP ACK) to the user plane address of the (R)AN 2908.

The LMC/LMF 2912 may send a response message (e.g. a positioning information response message 2964) to the AMF 2916, for example, based on (e.g., in response to) receiving the message (e.g., the positioning information response message 2960) from the (R)AN 2908, and/or the message (e.g., positioning information request message 2944) from the AMF 2916. The positioning information response message 2964 may comprise one or more information elements/parameters (e.g. the wireless device user plane transmission confirmation indication, user plane address of the wireless device 2904, the (R)AN user plane transmission confirmation indication, user plane address of the (R)AN) 2908 received from the (R)AN 2908).

The AMF may send a response message (e.g. a positioning information response message 2968) to the GMLC 2920, for example, based on (e.g., in response to) receiving the message (e.g. the positioning information response message 2964) from the LMC/LMF 2912, and/or the message (e.g., the positioning information request message 2940) from the GMLC 2920. The positioning information response message 2968 may comprise one or more information elements/ parameters (e.g. the wireless device user plane transmission confirmation indication, user plane address of the wireless device 2904, the (R)AN user plane transmission confirmation indication, user plane address of the (R)AN) 2908 received from the LMC/LMF 2912).

The (R)AN 2908 may perform/determine a positioning measurement (e.g., step 2976) based on the positioning method. The (R)AN 2908 may perform an uplink ECID positioning measurement for the positioning of the wireless device 2904. The (R)AN 2908 may perform an uplink OTDOA positioning measurement for the positioning of the wireless device 2904. The (R)AN 2908 may perform a multiple RTT positioning measurement for the positioning of the wireless device 2904. The (R)AN 2908 may send (e.g., step 2984), to the GMLC 2920, a message (e.g. (R)AN positioning measurement report) via user plane. The (R)AN positioning measurement report may indicate/be based on the positioning measurement for the positioning of the wireless device 2904. The ((R)AN positioning measurement report may comprise at least one of: an ECID positioning measurement report, an OTDOA positioning measurement report, a relative time of arrival report, an uplink reference signal received power measurements report, an uplink AoA measurements report, a multiple RTT positioning measurement report, a base station RX-TX time difference measurements report, and/or any other type of positioning measurement report. The (R)AN 2908 may establish a user plane session with the GMLC 2920 and send the (R)AN positioning measurement report via the user plane session. The (R)AN 2908 may send the (R)AN positioning measurement report via a TCP/IP data packet. The (R)AN 2908 may send the (R)AN positioning measurement report via a UDP/IP data packet. The (R)AN 2908 may send a UDP/IP data packet to the GMLC 2920. The payload of the UDP/IP data packet may comprise the (R)AN positioning measurement report. A source IP address of the UDP/IP data packet may be the IP address of the user plane address of the (R)AN 2908. A source port number of the UDP/IP data packet may be the port number of the user plane address of the (R)AN 2908. The destination IP address of the UDP/IP data packet may be the IP address of the user plane address of the GMLC 2920. The destination port number of the UDP/IP data packet may be the port number of the user plane address of the GMLC 2920.

The wireless device 2904 may perform/determine a positioning measurement (e.g., step 2972), for example, based on the positioning method. The wireless device 2904 may perform a downlink ECID positioning measurement for the positioning of the wireless device 2904. The wireless device 2904 may perform downlink OTDOA positioning measurement for the positioning of the wireless device 2904. The wireless device 2904 may perform a GNSS positioning measurement for the positioning of the wireless device 2904.

The wireless device 2904 may send (e.g., step 2980) a wireless device positioning measurement report to the GMLC 2920 via user plane. The wireless device positioning measurement report may comprise/be based on the positioning measurement determined by the wireless device 2904. The wireless device positioning measurement report may comprise at least one of: an ECID positioning measurement report, an OTDOA positioning measurement report, a (network-assisted) GNSS positioning measurement report, a WLAN positioning measurement report, a Bluetooth positioning measurement report, a TBS positioning measurement report, a barometric pressure sensor positioning measurement report, and/or any other type of positioning measurement report. The wireless device 2904 may send the wireless device positioning measurement report via an existing user plane session (e.g. a user plane of a PDU session). The wireless device 2904 establish a new user plane session (e.g. a user plane of a PDU session) and send the wireless device positioning measurement report via the new user plane session. The wireless device 2904 may send the wireless device positioning measurement report via an SUPL session. The wireless device 2904 may send a UDP/IP data packet to the GMLC. The payload of the UDP/IP data packet may comprise the wireless device positioning measurement report. The source IP address of the UDP/IP data packet may be the IP address of the user plane address of the wireless device 2904. A source port number of the UDP/IP data packet may be port number of the user plane address of the wireless device 2904. The destination IP address of the UDP/IP data packet may be the IP address of the user plane address of the GMLC 2920. The destination port number of the UDP/IP data packet may be the port number of the user plane address of the GMLC 2920.

The GMLC 2920 may perform one or more operations, for example, based on (e.g., in response to) receiving the message (e.g., wireless device positioning measurement report) from the wireless device 2904, the message (e.g., (R)AN positioning measurement report) from the (R)AN 2908, and/or the message (e.g., positioning information request 2932) from the network function 2924 (e.g., LCS client). The GMLC 2920 may determine/calculate the position of the wireless device 2904 (e.g., step 2988), for example, based on the wireless device positioning measurement report and/or the (R)AN positioning measurement report. The GMLC 2920 may determine the position of the wireless device 2904, for example, based on the ECID positioning measurement report (e.g. uplink ECID measurement) from the (R)AN 2908 and/or the ECID positioning measurement report (e.g. downlink ECID measurement)

from the wireless device 2904. The GMLC 2920 may determine the position of the wireless device 2904, for example, based on the OTDOA positioning measurement report (e.g. uplink OTDOA measurement) from the (R)AN 2908, the OTDOA positioning measurement report (e.g. downlink OTDOA measurement) from the wireless device 2904, and/or the GNSS positioning measurement report from by the wireless device 2904.

The GMLC 2920 may send a response message (e.g. a positioning information response message 2988) to the network function 2924 (e.g., the LCS client). The GMLC 2920 may send the response message (e.g. the positioning information response message 2988) to the network function 2924 (e.g., the LCS client), for example, based on determining the position of the wireless device 2904. The positioning information response message 2988 may comprise/indicate the position of the wireless device 2904.

Figure 30:
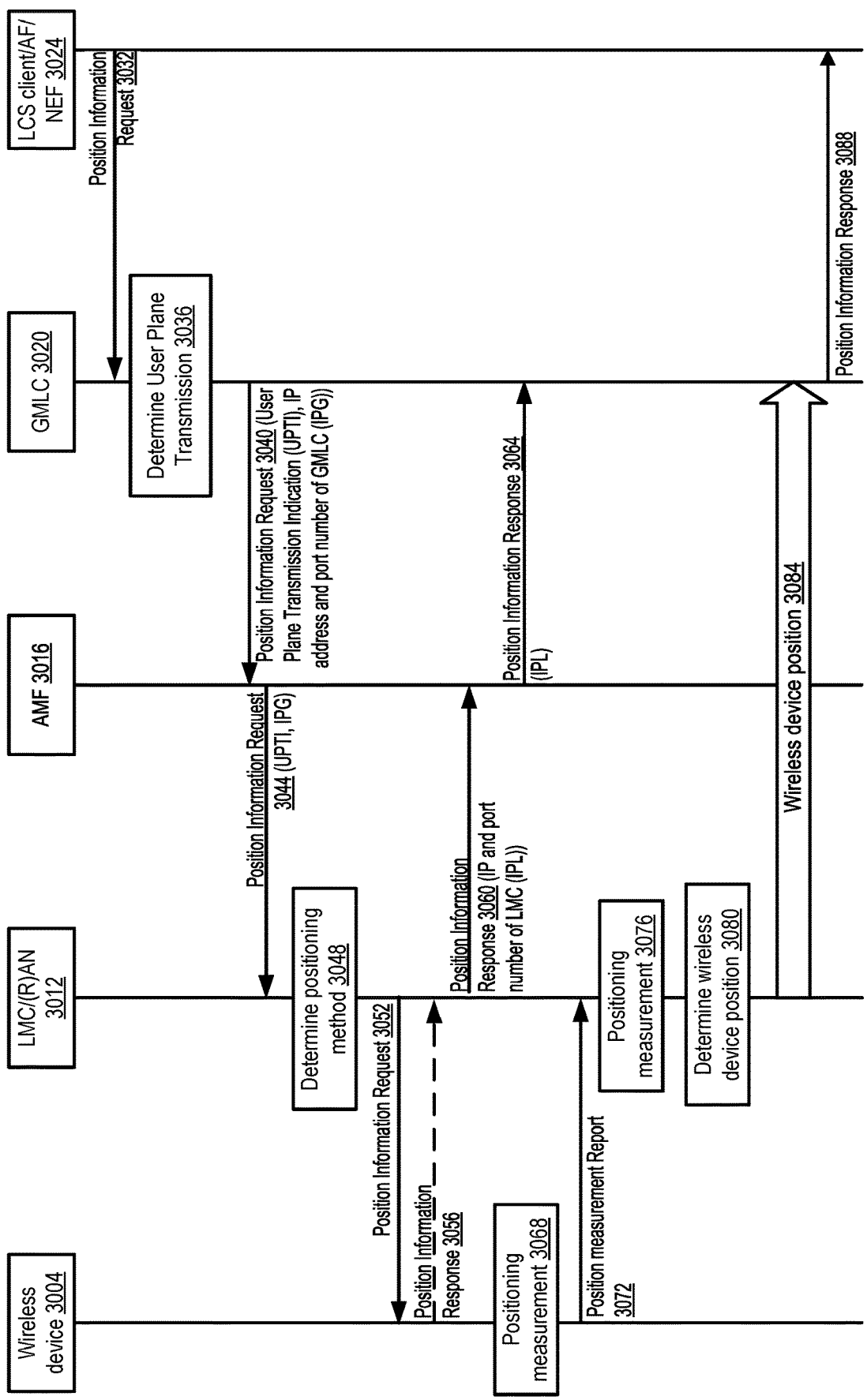
FIG. 30 shows an example communication for determination of a wireless device location.

FIG. 30 shows an example communication for determination of a wireless device location (e.g., wireless device positioning). A wireless device 3004 may send/indicate a positioning measurement to an LMC/(R)AN 3012. The LMC/(R)AN 3012 may determine a positioning measurement. The LMC/(R)AN 3012 may determine a wireless device position based on positioning measurements of the wireless device 3004 and the LMC/(R)AN 2012.

A GMLC 3020 may receive a message (e.g. a positioning information request message 3032) from a network function 3024 and/or a wireless device (e.g., the wireless device 3004). The network function 3024 may be an LCS client, an NEF, an AF, and/or a (R)AN (e.g., (R)AN/LMC 3012). The positioning information request message 3032 may indicate a request/query for positioning information of the wireless device 3004. The positioning information request message 3032 may comprise one or more information elements/parameters. The positioning information request message 3032 may comprise one or more positioning information request parameters indicating one or more of the following: a wireless device identity/indicator (e.g. GPSI and/or SUPI) of the wireless device 3004 for which positioning information is requested, a parameter indicating whether the request is assured, a parameter (e.g. a required QoS) indicating a requested positioning accuracy (e.g. horizontal positioning accuracy, and/or vertical positioning accuracy), a positioning report cycle indicating a request for a triggered positioning report (e.g. a one-time positioning report) or a periodic positioning report, supported GAD shapes, and/or an LCS client type. The requested parameters (e.g. required QoS) in the message may be guaranteed, for example, if the request is assured. The GMLC 3020 may reject the request, for example, if the GMLC cannot guarantee the request. The requested parameters (e.g. requested QoS) in the message may not be guaranteed, for example, if the request is not assured. The GMLC 3020 may provide different parameters compared to the requested parameters, for example, if the request is not assured. The required QoS may comprise/indicate at least one of: an accuracy of the positioning, a response time for the positioning request, an LCS QoS class, etc. The LCS client type may comprise/indicate at least one of: emergency services, value added services, PLMN operator services, lawful intercept services, etc.

The GMLC 3020 may perform one or more operations, for example, based on (e.g., in response to) receiving the message received from the network function 3024 and/or a wireless device. The GMLC 3020 may send a message (e.g. a network status request) to an AMF 3016, a UDM, and/or OAM. The AMF 3016, the UDM, and/or the OAM may be serving the wireless device 3004. The network status request message may indicate a request for network status information. The network status request message may comprise a parameter indicating a request for network status information.

The AMF 3016 may send a response message (e.g. a network status response) to the GMLC 3020, for example, based on receiving the message. The network status response may comprise network status information. The definition, scope, and/or usage of the network status information may be similar to the definition, scope, and/or usage of the network status information described above with respect to FIG. 23.

The GMLC 3020 may determine a user plane transmission (e.g., step 3036) for a positioning of at least one wireless device, for example, based on receiving the positioning information request message 3032 from the network function 3024 and/or the network status response message from the AMF 3016. The GMLC 3020 may determine (e.g., step 3036) a user plane transmission for a positioning of at least one wireless device, for example, based on the one or more positioning information request parameters and/or network status information. The positioning information request message 3032 may indicate request for a periodic positioning report. The LCS client type may indicate value added services. The network status information may indicate that an AMF area is overloaded. The required QoS may indicate a response time for the positioning request (e.g., 200 ms, or any other time interval). The GMLC 3020 may determine a user plane transmission for a positioning of at least one wireless device in the AMF area, for example, based on the above information.

The GMLC 3020 may be locally configured with network status information. The GMLC 3020 may determine a user plane transmission for a positioning of at least one wireless device, for example, based on network status information and/or local configuration. The GMLC 3020 may determine the user plane transmission for a specific wireless device. The AMF 3016 may determine the user plane transmission for at least one wireless device within a coverage of a network. The example coverage of a network may be an area (e.g. tracking area, a base station area, an AMF area, a PLMN area, etc.). The example network may be a PLMN, a base station, an AMF, etc. The network status information may comprise at least one of: a parameter indicating that the network is overloaded; a parameter indicating that the network has low performance (e.g. may not meet QoS requirement); a parameter indicating that the network has limited resource(s), etc. The GMLC 3020 may determine the user plane transmission for ongoing positioning procedure(s). The ongoing positioning procedure(s) may correspond to positioning measurements being currently performed by the network and/or the wireless device 3004 for a positioning of the wireless device 3004. The GMLC 3020 may determine the user plane transmission for subsequent/future positioning procedure(s). The determined user plane transmission may be used at a later time at which a positioning procedure may be performed.

The GMLC 3020 may send a message (e.g. a positioning information request message 3040) to the AMF 3016. The positioning information request message 3040 may indicate a request for user plane transmission for a positioning of the wireless device 3004. The positioning information request message 3040 may comprise at least one of: the wireless device identity/indicator, the user plane transmission indication, user plane address of the GMLC 3020 (e.g. an IP address and/or TCP/UDP port number), the required QoS indicating requested positioning accuracy, the positioning report cycle, and/or the LCS client type. The user plane transmission indication may indicate a request for user plane transmission for a positioning of the wireless device 3004. The user plane address of the GMLC may be used for the user plane transmission for the positioning of the wireless device 3004. The wireless device 3004 may send/indicate the positioning of the wireless device 3004 to the user plane address of the GMLC 3020.

The AMF 3016 may send a message (e.g. a positioning information request message 3044) to an LMC. The positioning information request message 3044 may request a user plane transmission for the positioning of the wireless device 3004. The LMC may be serving the wireless device 3004. The LMC may be located in a base station (e.g. (R)AN) serving the wireless device 3004 (e.g., shown as LMC/(R)AN 3012). The positioning information request message 3044 sent to the LMC/(R)AN 3012 may comprise one or more information elements/parameters (e.g. the user plane transmission indication) received from the GMLC 3020.

The LMC/(R)AN 3012 may perform one or more operations, for example, based on (e.g., in response to) the positioning information request message 3044. The LMC/(R)AN 3012 may determine (e.g., step 3048) a positioning method for the positioning of the wireless device 3004, for example, based on the one or more information elements/parameters (e.g. the user plane transmission indication) received from the AMF 3016, based on the positioning capability of the wireless device 3004, and/or based on the positioning capability of the (R)AN. The determination of the positioning method may be similar to the determination of the positioning method as described above with respect to FIG. 23.

The LMC/(R)AN 3012 may send to the wireless device 3004 a message (e.g. an LPP message, a positioning information request message 3052). The positioning information request message 3052 may indicate a request for the positioning of the wireless device 3004. The positioning information request message 3052 sent to the wireless device 3004 may comprise one or more information elements/parameters received from the AMF 3016. The positioning information request message 3052 sent to the wireless device 3004 may indicate the positioning method. The positioning information request message 3052 sent to the wireless device 3004 may comprise assistance data for the positioning of the wireless device 3004.

The wireless device 3004 may perform one or more operations, for example, based on (e.g., in response to) the positioning information request message 3052 received from the LMC/(R)AN 3012. The wireless device 3004 may send a response message (e.g. an RRC message, positioning information response message 3056) to the LMC/(R)AN 3012. The LMC/(R)AN 3012 may send a response message (e.g. a positioning information response message 3060) to the AMF 3016, for example, based on (e.g., in response to) receiving the message from the wireless device 3004 (the positioning information response message 3056), and/or the message from the AMF 3016 (e.g., the positioning information request message 3044). The positioning information response message 3060 may comprise at least one of: a user plane transmission confirmation indication, and/or user plane address of the LMC/(R)AN 3012. The user plane transmission confirmation indication may indicate that LMC/(R)AN 3012 has (have) accepted to send/indicate positioning of the wireless device 3004 via user plane. The user plane address of the LMC/(R)AN 3012 may be used for the user plane transmission for the positioning of the wireless device 3004. The LMC/(R)AN 3012 may use the user plane address of the LMC/(R)AN 3012 to send/indicate the positioning of the wireless device 3004 to the GMLC 3020. The GMLC 3020 may send an acknowledgement data package (e.g. TCP ACK) to the user plane address of the LMC/(R)AN 3012.

The AMF 3016 may send a response message (e.g. a positioning information response message 3064) to the GMLC 3020. The AMF 3016 may send the positioning information response message 3064 to the GMLC 3020, for example, based on (e.g., in response to) receiving the message from the LMC/(R)AN 3012 (e.g., the positioning information response message 3060), and/or the message from the GMLC 3020 (e.g., the positioning information request message 3040). The positioning information response message 3064 may comprise one or more information elements/parameters (e.g. the user plane transmission confirmation indication, and/or user plane address of the LMC/(R)AN 3012) received from the LMC/(R)AN 3012.

The wireless device 3004 may determine/perform a positioning measurement (e.g., step 3068), for example, based on the positioning method. The wireless device 3004 may perform a downlink ECID positioning measurement for the positioning of the wireless device 3004. The wireless device 3004 may perform downlink an OTDOA positioning measurement for the positioning of the wireless device 3004. The wireless device 3004 may perform a GNSS positioning measurement for the positioning of the wireless device 3004. The wireless device 3004 may perform any other type of positioning measurement.

The wireless device 3004 may send a wireless device positioning measurement report 3072 to the LMC/(R)AN 3012. The wireless device positioning measurement report 3072 may be based on the positioning measurement performed by the wireless device 3004. The wireless device positioning measurement report 3072 may comprise at least one of: an ECID positioning measurement report, an OTDOA positioning measurement report, a (network-assisted) GNSS positioning measurement report, a WLAN positioning measurement report, a Bluetooth positioning measurement report, a TBS positioning measurement report, a barometric pressure sensor positioning measurement report and/or any other type of positioning measurement report.

The LMC/(R)AN 3012 may determine/perform a positioning measurement (e.g., step 3076) based on the positioning method. The LMC/(R)AN 3012 may perform an uplink ECID positioning measurement for the positioning of the wireless device 3004. The LMC/(R)AN 3012 may perform an uplink OTDOA positioning measurement for the positioning of the wireless device 3004. The LMC/(R)AN 3012 may perform multiple RTT positioning measurement for the positioning of the wireless device 3004. The LMC/(R)AN 3012 may perform any other type of positioning measurement.

The LMC/(R)AN 3012 may determine/calculate the position of the wireless device 3004 (e.g., step 3080). The LMC/(R)AN 3012 may determine/calculate the position of the wireless device 3004, for example, based on the wireless device positioning measurement report 3072 and/or the positioning measurement performed by the LMC/(R)AN 3012. The LMC/(R)AN 3012 may determine the position of the wireless device 3004, for example, based on the uplink ECID positioning measurement performed by the LMC/(R)AN 3012 and/or the ECID positioning measurement report (e.g. downlink ECID measurement) from the wireless device 3004. The LMC/(R)AN 3012 may determine the position of the wireless device 3004, for example, based on the uplink OTDOA positioning measurement performed by the LMC/(R)AN 3012, the OTDOA positioning measurement report (e.g. the downlink OTDOA measurement) from the wireless device 3004, and/or GNSS positioning measurement report from by the wireless device 3004.

The LMC/(R)AN 3012 may send (e.g., step 3084), to the GMLC 3020, a message (e.g. a positioning report) via user plane. The message may indicate the position of the wireless device 3004. The LMC/(R)AN 30121 may establish a user plane session with the GMLC 3020, and send/indicate the position of the wireless device 3004 via the user plane session. The LMC/(R)AN 3012 may send the position of the wireless device 3004 via a TCP/IP data packet. The LMC/(R)AN 3012 may send/indicate the position of the wireless device 3004 via a UDP/IP data packet. The LMC/(R)AN 3012 may send a UDP/IP data packet to the GMLC 3020. The payload of the UDP/IP data packet may comprise an indication of the position of the wireless device 3004. A source IP address of the UDP/IP data packet may be the IP address of the user plane address of the LMC/(R)AN 3012. The source port number of the UDP/IP data packet may be the port number of the user plane address of the LMC/(R)AN 3012. A destination IP address of the UDP/IP data packet may be the IP address of the user plane address of the GMLC 3020. The destination port number of the UDP/IP data packet may be the port number of the user plane address of the GMLC 3020.

The GMLC 3020 may send a response message (e.g. a positioning information response message 3088) to the network function 3024 (e.g., LCS client). The GMLC 3020 may send the positioning information response message 3088, for example, based on (e.g., in response to) receiving the message (e.g., the positioning report) from the LMC/(R)AN 3012, and/or the message (e.g., positioning information request 3032) from the network function 3024. The positioning information response message 3088 may comprise/indicate the positioning of the wireless device 3004.

A wireless device may receive, from a GMLC, a first message. The first message may indicate a request for user plane transmission for a positioning of the wireless device. The first message may comprise/indicate a requested positioning accuracy. The wireless device may send, to a base station, a second message comprising a positioning measurement indication for the positioning of the wireless device, for example, based on the requested positioning accuracy and/or based on receiving the first message. The wireless device may receive from the base station a positioning measurement report. The wireless device may send, to the GMLC, the positioning of the wireless device via user plane. The positioning of the wireless device may be based on the positioning measurement report.

The wireless device may receive, from the base station, an RRC message indicating a positioning capability of the base station. The positioning capability of the base station may comprise at least one of: a an ECID positioning capability; an OTDOA positioning capability; a support for uplink relative time of arrival measurements; a support for uplink reference signal received power measurements; a support for uplink AoA measurements; a support for multiple RTT positioning; a support for base station RX-TX time difference measurements; or no support for positioning measurements. The wireless device may determine a positioning method based on at least one of: the first message; the RRC message; and/or a positioning capability of the wireless device. The positioning capability of the wireless device may comprise at least one of: an ECID positioning capability; an OTDOA positioning capability; support for network-assisted GNSS methods; support for WLAN positioning; support for Bluetooth positioning; support for terrestrial beacon system (TBS) positioning; support for barometric pressure sensor positioning; or no support for positioning measurements.

The RRC message may comprise an SIB message. The first message further may comprise a user plane transmission indication. The wireless device may determine a positioning method based on at least one of: the user plane transmission indication; a positioning capability of the wireless device; and/or a positioning capability of the base station. The wireless device may determine which one (or both) of the base station or the wireless device is/are to perform positioning measurements for the positioning of the wireless device, based on at least one of: the user plane transmission indication; the positioning capability of the wireless device; and/or the positioning capability of the base station. The wireless device may determine that the base station or the wireless device execute/perform the positioning method for the positioning of the wireless device, based on at least one of: the user plane transmission indication; the positioning capability of the wireless device; and/or the positioning capability of the base station. The second message may comprise/indicate a positioning method. The positioning method may comprise at least one of: ECID positioning method; OTDOA positioning method; WLAN positioning method; Bluetooth positioning method; TBS positioning method; barometric pressure sensor positioning method; and/or an accuracy of positioning. The second message may further comprise at least one of: a wireless device identity/indicator; a requested positioning measurement indication; a user plane transmission indication; a positioning method; assistance data for the positioning of the wireless device; required QoS; or positioning report cycle.

The positioning measurement report may comprise at least one of: an ECID positioning measurement report; an OTDOA positioning measurement report; a relative time of arrival report; an uplink reference signal received power measurements report; an uplink AoA measurements report; a multiple RTT positioning measurement report; or a base station RX-TX time difference measurements report. An AMF may determine a user plane transmission based on a network status. The network status may comprise at least one of: a parameter indicating that the network is overloaded; a parameter indicating that the network has low performance; and/or a parameter indicating that the network has limited resources. The wireless device may establish a user plane session to the GMLC. The requested positioning accuracy may comprise at least one of: a horizontal accuracy; and/or a vertical accuracy. The determination may further be based on at least one of: a positioning capability of the wireless device; and/or a positioning capability of the base station. The positioning method may comprise at least one of: an ECID positioning method; an OTDOA positioning method; a network-assisted GNSS positioning method; a WLAN positioning method; a Bluetooth positioning method; a TBS positioning method; and/or a barometric pressure sensor positioning method. The wireless device may determine the positioning of the wireless device based on at least one of: the positioning measurement report; or positioning measurement performed by the wireless device.

A wireless device may receive, from a GMLC, a first message indicating user plane transmission for a positioning of the wireless device. The first message may comprise/indicate a requested positioning accuracy. The wireless device may receive, from a base station, an RRC message indicating a positioning capability of the base station. The wireless device may determine a positioning method based on the first message and the RRC message. The wireless device may send to a base station, a second message comprising/indicating: the positioning method; and a requested positioning measurement indication for the positioning of the wireless device. The wireless device may receive, from the base station, a positioning measurement report. The wireless device may send, to the GMLC, the positioning of the wireless device via user plane. The positioning of the wireless device may be based on the positioning measurement report. The positioning capability of the base station may comprise at least one of: an ECID positioning capability; an OTDOA positioning capability; an uplink relative time of arrival positioning capability; support for uplink reference signal received power measurements; support for uplink AoA measurements; support for multiple RTT positioning; support for base station RX-TX time difference measurements; or no support of positioning measurements (E.g., no positioning capability).

A base station may receive, from a wireless device, a first message. the first message may comprise/indicate: a base station positioning method; and a requested positioning measurement indication for a positioning of the wireless device. The base station may perform a positioning measurement for the positioning of the wireless device, for example, based on the first message. The base station may send the positioning measurement to the wireless device. A GMLC may receive, from a network function, a first message comprising network status information. The GMLC may receive, from an LCS client, a second message requesting positioning of a wireless device. The second message may comprise a required QoS; and indicate a periodic positioning report. The GMLC may determine user plane transmission for the positioning of the wireless device, for example, based on the first message and the second message. The GMLC may send a user plane transmission indication to the wireless device. An AMF may receive from a network function, a first message comprising network status information. The AMF may determine user plane transmission for a positioning of at least one wireless device, for example, based on the first message. The AMF may send, to the GMLC, a user plane transmission indication for the positioning of the at least one wireless device.

A wireless device may receive, from a network function, a first message. The first message may indicate user plane transmission for a positioning of the wireless device. The wireless device may send, to the network function, a response message to the first message. The response message may comprise: a user plane transmission confirmation indication, and user plane address of the wireless device. The wireless device may receive a positioning measurement report from the base station. The wireless device may determine the positioning of the wireless device, for example, based on the positioning measurement report. The wireless device may send, to the GMLC, the positioning of the wireless device via a user plane. The network function may comprise at least one of: the base station; an LMC; an LMF; and/or an AMF. The first message may further comprise/indicate a positioning method. The determining may be further based on positioning measurement information performed by the wireless device.

A base station may receive from a network function, a first message. The first message may indicate user plane transmission for a positioning of the wireless device. The first message may comprise/indicate: a positioning method; a user plane transmission indication; and a (R)AN positioning measurement indication indicating positioning measurement by the base station. The base station may perform a positioning measurement for the positioning of the wireless device, for example, based on the first message. The base station may send/indicate to the wireless device the positioning measurement. The network function may comprise at least one of: an LMC; an LMF; and/or an AMF.

A GMLC may receive, from an LCS client, a first message indicating a request for positioning of a wireless device. The GMLC may receive from a network function, a second message comprising network status information. The GMLC may determine a user plane transmission for the positioning of the wireless device, for example, based on the first message and the second message. The GMLC may send to an AMF a third message comprising: a user plane transmission indication; and/or an IP address and a port number of the GMLC for the user plane transmission. The GMLC may receive from the wireless device, via a user plane, a first positioning measurement report for the positioning of the wireless device. The GMLC may receive, via a user plane, from a base station serving for the wireless device, a second positioning measurement report for the positioning of the wireless device. The GMLC may determine the positioning of the wireless device, for example, based on the first positioning measurement report and the second positioning measurement report. The GMLC may send to the LCS client the determined positioning of the wireless device. The network status may comprise at least one of: a parameter indicating that the network is overloaded; a parameter indicating that the network has low performance; and/or a parameter indicating that the network has limited resources. The network function may comprise at least one of: an OAM; a UDM; and/or an AMF.

An LMC may receive, from an AMF, a first message indicating user plane transmission for a positioning of the wireless device. The first message may comprise/indicate: a positioning accuracy; a user plane transmission indication; and/or a user plane address of a GMLC. The LMC may send, to the AMF, a response message to the first message. The response message may comprise a user plane address of the LMC. The LMC may receive from the wireless device, a positioning measurement report for the positioning of the wireless device. The LMC may determine the positioning of the wireless device, for example, based on the positioning measurement report. The LMC may send, to the GMLC via a user plane, the positioning of the wireless device.

A wireless device may perform a method comprising multiple operations. The wireless device may receive a first message comprising a request for an indication, via a user plane, of a position of the wireless device. The wireless device may send, to a base station, a second message comprising a request for a positioning measurement associated with the wireless device. The wireless device may receive, from the base station, an indication of the positioning measurement. The wireless device may send, via the user plane, information indicating a position of the wireless device. The information indicating the position of the wireless device may be based on the positioning measurement. The wireless device may also perform one or more additional operations. The wireless device may determine a second positioning measurement. The information indicating the position of the wireless device may be further based on the second positioning measurement. The sending the information indicating the position of the wireless device may comprise sending the information to a gateway mobile location center (GMLC). The wireless device may receive, from the base station, a third message indicating a positioning capability of the base station. The third message may comprise at least one of: a system information block (SIB) message; a master information block (MIB) message; a radio resource configuration (RRC) setup message; or an RRC reconfiguration message. The positioning capability of the base station may comprise at least one of: support for enhanced cell identity (ECID) positioning method; support for observed time difference of arrival (OTDOA) positioning method; support for uplink relative time of arrival positioning method; support for uplink reference signal received power measurements; support for uplink angle of arrival (UL AoA) measurements; support for multiple round trip time (RTT) positioning method; support for base station receive-transmit (RX-TX) time difference measurements; or no support for wireless device positioning. The wireless device may determine a positioning method based on at least one of: the first message; a positioning capability of the wireless device; or the positioning capability of the base station. The second message may comprise an indication of the positioning method. The positioning method may be used by the base station to determine the positioning measurement and by the wireless device to determine the second positioning measurement. The wireless device may determine that the base station is to perform the positioning measurement associated with the wireless device. The determining that the base station is to perform the positioning measurement may be based on at least one of: the first message; the positioning capability of the wireless device; or the positioning capability of the base station. The sending the second message may be based on the determining that the base station is to perform the positioning measurement. The positioning capability of the wireless device may comprise at least one of: support for enhanced cell identity (ECID) positioning method; support for observed time difference of arrival (OTDOA) positioning method; support for network-assisted global navigation satellite system (GNSS) positioning method; support for wireless local area network (WLAN) positioning method; support for Bluetooth positioning method; support for terrestrial beacon system (TBS) positioning method; support for barometric pressure sensor positioning method; or no support for wireless device positioning. The second message may further comprise at least one of: an indication of the wireless device; a requested positioning measurement indication; a user plane transmission indication; an indication of a positioning method; assistance data for the positioning of the wireless device; an indication of a required quality of service (QoS); or an indication of a positioning report cycle. The user plane may comprise at least one of a base station or a user plane function (UPF). The wireless device may receive, from a location management function (LMF), a message indicating a positioning capability of the base station. The wireless device may determine, based on the positioning measurement, the information indicating the position of the wireless device. The indication of the positioning measurement may indicate at least one of: an enhanced cell identity (ECID) positioning measurement report; an observed time difference of arrival (OTDOA) positioning measurement report; a relative time of arrival report; an uplink reference signal received power measurement report; an uplink angle of arrival measurement report; a multiple round trip time (RTT) positioning measurement report; or a base station receive-transmit (RX-TX) time difference measurement report. The sending the indication of the positioning of the wireless device may comprise sending the indication of the positioning of the wireless device via at least one of: an existing user plane session; or a new user plance session. The first message may further comprise a requested positioning accuracy. The requested positioning accuracy may comprise at least one of: a horizontal accuracy; or a vertical accuracy. The first message may further comprise a user plane transmission indication. The sending the second message may be based on receiving the first message. The second message may comprise at least one of: a radio resource configuration (RRC) setup request message; an RRC setup complete message; or an RRC resume complete message. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the indication of the positioning measurement. A computer-readable medium may store instructions that, when executed, cause performance of the described method, additional operations and/or include the additional elements.

A wireless device may perform a method comprising multiple operations. The wireless device may receive, from a gateway mobile location center (GMLC), a first message comprising a request for a user plane transmission for a positioning of the wireless device. The wireless device may send, to a base station, a second message comprising a request for a positioning measurement associated with the wireless device. The wireless device may receive, from the base station, an indication of the positioning measurement. The wireless device may send, to the GMLC and via a user plane, the indication of the positioning measurement. The wireless device may also perform one or more additional operations. The wireless device may determine a second positioning measurement. The wireless device may send, to the GMLC and via the user plane, an indication of the second positioning measurement. The wireless device may receive, from the base station, a third message indicating a positioning capability of the base station. The wireless device may determine a positioning method based on at least one of: the first message; a positioning capability of the wireless device; or a positioning capability of the base station. The second message may comprise an indication of the positioning method. The wireless device may determine that the base station is to perform the positioning measurement associated with the wireless device. The determining that the base station is to perform the positioning measurement may be based on at least one of: the first message; a positioning capability of the wireless device; or a positioning capability of the base station. The sending the second message may be based on the determining that the base station is to perform the positioning measurement. The wireless device may receive, from a location management function (LMF), a message indicating a positioning capability of the base station. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the indication of the positioning measurement. A computer-readable medium may store instructions that, when executed, cause performance of the described method, additional operations and/or include the additional elements.

A base station may perform a method comprising multiple operations. The base station may receive, from a wireless device, a first message comprising: an indication of a positioning method of a plurality of positioning methods; and a request for a positioning measurement associated with the wireless device. The base station may perform, based on the indicated positioning method, a positioning measurement associated with the wireless device. The base station may send, to the wireless device, an indication of the positioning measurement. The base station may also perform one or more additional operations. The base station may send, to the wireless device, a second message indicating a positioning capability of the base station. The first message may further comprise at least one of: an indication of the wireless device; a user plane transmission indication; assistance data for the positioning measurement associated with the wireless device; an indication of a required quality of service (QoS); or an indication of a positioning report cycle. The positioning method may comprise at least one of: an enhanced cell identity (ECID) positioning method; an observed time difference of arrival (OTDOA) positioning method; a wireless local area network (WLAN) positioning method; a Bluetooth positioning method; a terrestrial beacon system (TBS) positioning method; or a barometric pressure sensor positioning method. The sending the indication of the positioning measurement may comprise sending a positioning measurement report. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to send the first message. A computer-readable medium may store instructions that, when executed, cause performance of the described method, additional operations and/or include the additional elements.

A wireless device may perform a method comprising multiple operations. The wireless device may receive, from a gateway mobile location center (GMLC), a first message indicating user plane transmission for a positioning of the wireless device. The first message may indicate a requested positioning accuracy. The wireless device may receive, from a base station, a radio resource configuration (RRC) message comprising positioning capability of the base station. The wireless device may determine a positioning method based on the first message and the RRC message. The wireless device may send, to a base station, a second message indicating: the positioning method; and a request for a positioning measurement report. The wireless device may receive, from the base station, a positioning measurement report. The wireless device may send, to the GMLC via a user plane, an indication of a positioning of the wireless device. The positioning of the wireless device may be based on the positioning measurement report. The wireless device may also perform one or more additional operations. The positioning capability of the base station may comprise at least one of: support for enhanced cell identity (ECID) positioning method; support for observed time difference of arrival (OTDOA) positioning method; support for uplink relative time of arrival positioning method; support for uplink reference signal received power measurements; support for uplink angle of arrival (UL AoA) measurements; support for multiple round trip time (RTT) positioning method; support for base station receive-transmit (RX-TX) time difference measurements; or no support for wireless device positioning. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the positioning measurement report. A computer-readable medium may store instructions that, when executed, cause performance of the described method, additional operations and/or include the additional elements.

A gateway mobile location center (GMLC) may perform a method comprising multiple operations. The GMLC may receive, from a network function, a first message comprising network status information. The GMLC may receive, from a location services (LCS) client, a second message requesting a positioning of a wireless device. The second message may comprise: a required quality of service (QoS); and a periodic positioning report. The GMLC may determine, based on the first message and the second message, transmission of the positioning of the wireless device via a user plane. The GMLC may send, to the wireless device, a user plane transmission indication indicating the transmission of the positioning of the wireless device via the user plane. The GMLC may also perform one or more additional operations. The network function may comprise at least one of: an access and mobility management function (AMF); an operation administration and maintenance (OAM) function; or a unified data management (UDM) function. The network status information may comprise at least one of: a parameter indicating that a network is overloaded; a parameter indicating that the network has low performance; or a parameter indicating that the network has limited resources. The GMLC may receive, from a second network function, the second message. The second network function may comprise at least one of: a network exposure function (NEF); an application function (AF); or a base station. The GMLC may receive, from the wireless device, the second message requesting the positioning of the wireless device. The GMLC may comprise one or more processors; and memory storing instructions that, when executed by the one or more processors, cause the GMLC to perform the described method, additional operations and/or include the additional elements. A system may comprise the GMLC configured to perform the described method, additional operations and/or include the additional elements; and an LCS client configured to send the second message. A computer-readable medium may store instructions that, when executed, cause performance of the described method, additional operations and/or include the additional elements.

An access and mobility management function (AMF) may perform a method comprising multiple operations. The AMF may receive, from a network function, a first message comprising network status information. The AMF may determine, based on the first message, transmission of a positioning of at least one wireless device via a user plane. The AMF may send, to a gateway mobile location center (GMLC), a user plane transmission indication for the positioning of the at least one wireless device. The AMF may also perform one or more additional operations. The network function may comprise at least one of: at least one base station; an operation administration and maintenance (OAM) function; or a unified data management (UDM) function. The network status information may comprise at least one of: a parameter indicating that a network is overloaded; a parameter indicating that the network has low performance; or a parameter indicating that the network has limited resources. The user plane transmission indication may indicate transmission of the positioning of the at least one wireless device via a user plane. The AMF may comprise one or more processors; and memory storing instructions that, when executed by the one or more processors, cause the wireless device to perform the described method, additional operations and/or include the additional elements. A system may comprise the AMF configured to perform the described method, additional operations and/or include the additional elements; and a network function configured to send the first message. A computer-readable medium may store instructions that, when executed, cause performance of the described method, additional operations and/or include the additional elements.

A wireless device may perform a method comprising multiple operations. The wireless device may receive, from a network function, a first message requesting a transmission of a positioning of the wireless device via a user plane. The wireless device may send, to the network function, a response message to the first message. The response message may comprise: a user plane transmission confirmation indication, and user plane address of the wireless device. The wireless device may receive a positioning measurement report from the base station. The wireless device may determine, based on the positioning measurement report, the positioning of the wireless device. The wireless device may send, to the gateway mobile location center (GMLC) and via a user plane, the positioning of the wireless device. The wireless device may also perform one or more additional operations. The network function may comprise at least one of: the base station; a location management component (LMC); a location management function (LMF); or an access and mobility management function (AMF). The first message may further comprise a positioning method. The determining may be further based on positioning measurement performed by the wireless device. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the positioning measurement report. A computer-readable medium may store instructions that, when executed, cause performance of the described method, additional operations and/or include the additional elements.

A base station may perform a method comprising multiple operations. The base station may receive, from a network function, a first message indicating user plane transmission for a positioning of the wireless device. The first message may comprise: an indication of a positioning method; a user plane transmission indication; and a positioning measurement indication indicating positioning measurement by the base station. The base station may perform, based on the first message, a positioning measurement for the positioning of the wireless device. The base station may send, to the wireless device, the positioning measurement. The base station may also perform one or more additional operations. The network function may comprise at least one of: a location management component (LMC); a location management function (LMF); or an access and mobility management function (AMF). The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a network function configured to send the first message. A computer-readable medium may store instructions that, when executed, cause performance of the described method, additional operations and/or include the additional elements.

A gateway mobile location center (GMLC) may perform a method comprising multiple operations. The GMLC may receive, from a location services (LCS) client, a first message requesting positioning of a wireless device. The GMLC may receive, from a network function, a second message comprising network status information. The GMLC may determine, based on the first message and the second message, a user plane transmission for the positioning of the wireless device. The GMLC may send, to an access and mobility management function (AMF), a third message comprising at least one of: a user plane transmission indication; or internet protocol (IP) address and a port number of the GMLC for the user plane transmission. The GMLC may receive, from the wireless device, a first positioning measurement report for the positioning of the wireless device via user plane. The GMLC may receive, from a base station serving for the wireless device, a second positioning measurement report for the positioning of the wireless device via a user plane. The GMLC may calculate, based on the first positioning measurement report and the second positioning measurement report, the positioning of the wireless device. The GMLC may send, to the LCS client, the positioning of the wireless device. The GMLC may also perform one or more additional operations. The network status may comprise at least one of: a parameter indicating that the network is overloaded; a parameter indicating that the network has low performance; or a parameter indicating that the network has limited resources. The network function may comprise at least one of: an operations administration and maintenance (OAM); a unified data management (UDM); or an access and mobility management function (AMF). The GMLC may may comprise one or more processors; and memory storing instructions that, when executed by the one or more processors, cause the GMLC to perform the described method, additional operations and/or include the additional elements. A system may comprise the GMLC configured to perform the described method, additional operations and/or include the additional elements; and a location services (LCS) client configured to send the first message. A computer-readable medium may store instructions that, when executed, cause performance of the described method, additional operations and/or include the additional elements.

A location management component (LMC) may perform a method comprising multiple operations. The LMC may receiving, from an access and mobility management function (AMF), a first message indicating user plane transmission for a positioning of the wireless device. The first message may comprise: an indication of a positioning accuracy; a user plane transmission indication; and a user plane address of a gateway mobile location center (GMLC). The LMC may send, to the AMF, a response message to the first message, the response message comprising a user plane address of the LMC. The LMC may receive, from the wireless device, a positioning measurement report for the positioning of the wireless device. The LMC may calculate, based on the positioning measurement report, the positioning of the wireless device. The LMC may send, to the GMLC, the positioning of the wireless device via a user plane. The LMC may also perform one or more additional operations. The LMC may comprise one or more processors; and memory storing instructions that, when executed by the one or more processors, cause the LMC to perform the described method, additional operations and/or include the additional elements. A system may comprise the LMC configured to perform the described method, additional operations and/or include the additional elements; and the AMF configured to send the first message. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, a first message comprising a request for an indication, via a user plane, of a position of the wireless device;
   sending, to a base station, a second message comprising a request for a positioning measurement associated with the wireless device;
   receiving, from the base station, a positioning measurement report; and
   sending, via the user plane, information indicating a position of the wireless device, wherein the information indicating the position of the wireless device is based on the positioning measurement report.

2. The method of claim 1, further comprising:
   determining, by the wireless device, a second positioning measurement;
   wherein the information indicating the position of the wireless device is further based on the second positioning measurement.

3. The method of claim 1, further comprising receiving, from the base station, a third message indicating a positioning capability of the base station.

4. The method of claim 1, further comprising determining a positioning method based on at least one of:
   the first message;
   a positioning capability of the wireless device; or
   a positioning capability of the base station, wherein the second message comprises an indication of the positioning method.

5. The method of claim 1, further comprising determining that the base station is to perform the positioning measurement associated with the wireless device, wherein the determining that the base station is to perform the positioning measurement is based on at least one of:
   the first message;
   a positioning capability of the wireless device; or
   a positioning capability of the base station, wherein the sending the second message is based on the determining that the base station is to perform the positioning measurement.

6. The method of claim 1, wherein the second message further comprises at least one of:
   an indication of the wireless device;
   a requested positioning measurement indication;
   a user plane transmission indication;
   an indication of a positioning method;
   assistance data for the positioning of the wireless device;
   an indication of a required quality of service (QoS); or
   an indication of a positioning report cycle.

7. The method of claim 1, wherein:
   the user plane comprises at least one of a base station or a user plane function (UPF), and
   the sending the information indicating the position of the wireless device comprises sending the information to a gateway mobile location center (GMLC).

8. The method of claim 1, further comprising receiving, from a location management function (LMF), a message indicating a positioning capability of the base station.

9. The method of claim 1, further comprising determining, by the wireless device and based on the positioning measurement report, the information indicating the position of the wireless device.

10. A method comprising:
    receiving, by a wireless device from a gateway mobile location center (GMLC), a first message comprising a request for a user plane transmission for a positioning of the wireless device;
    sending, to a base station, a second message comprising a request for a positioning measurement associated with the wireless device;
    receiving, from the base station, a positioning measurement report; and
    sending, to the GMLC and via a user plane, the positioning measurement report.

11. The method of claim 10, further comprising:
    determining, by the wireless device, a second positioning measurement;
    sending, to the GMLC and via the user plane, the second positioning measurement.

12. The method of claim 10, further comprising receiving, from the base station, a third message indicating a positioning capability of the base station.

13. The method of claim 10, further comprising determining a positioning method based on at least one of:
    the first message;
    a positioning capability of the wireless device; or
    a positioning capability of the base station, wherein the second message comprises an indication of the positioning method.

14. The method of claim 10, further comprising determining that the base station is to perform the positioning measurement associated with the wireless device, wherein the determining that the base station is to perform the positioning measurement is based on at least one of:
    the first message;
    a positioning capability of the wireless device; or
    a positioning capability of the base station, wherein the sending the second message is based on the determining that the base station is to perform the positioning measurement.

15. The method of claim 10, further comprising receiving, from a location management function (LMF), a message indicating a positioning capability of the base station.

16. A method comprising:
    receiving, by a base station from a wireless device, a first message comprising:
       an indication of a positioning method of a plurality of positioning methods; and
       a request for a positioning measurement associated with the wireless device;
    performing, based on the indicated positioning method, the positioning measurement associated with the wireless device; and
    sending, to the wireless device and based on the positioning measurement, a positioning measurement report.

17. The method of claim 16, further comprising sending, to the wireless device, a second message indicating a positioning capability of the base station.

18. The method of claim 16, wherein the first message further comprises at least one of:
an indication of the wireless device;
a user plane transmission indication;
assistance data for the positioning measurement associated with the wireless device;
an indication of a required quality of service (QoS); or
an indication of a positioning report cycle.

19. The method of claim 16, wherein the positioning method comprises at least one of:
an enhanced cell identity (ECID) positioning method;
an observed time difference of arrival (OTDOA) positioning method;
a wireless local area network (WLAN) positioning method;
a Bluetooth positioning method;
a terrestrial beacon system (TBS) positioning method; or
a barometric pressure sensor positioning method.

20. The method of claim 16, further comprising sending, to a gateway mobile location center (GMLC), the positioning measurement report.

\* \* \* \* \*